United States Patent
Yuuki et al.

(10) Patent No.: US 9,900,588 B2
(45) Date of Patent: Feb. 20, 2018

(54) STEREOSCOPIC IMAGE DISPLAY APPARATUS, AND DRIVE METHOD THEREFOR

(71) Applicant: Mitsubishi Electric Corporation, Chiyoda-ku (JP)

(72) Inventors: Akimasa Yuuki, Tokyo (JP); Tetsuya Satake, Tokyo (JP); Yasunori Niwano, Tokyo (JP); Toshiaki Fujino, Tokyo (JP); Shuichi Kira, Tokyo (JP); Kazunori Okumoto, Tokyo (JP); Shingo Nagano, Tokyo (JP); Yoshimitsu Ishikawa, Tokyo (JP); Kazuhiro Ishiguchi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 198 days.

(21) Appl. No.: 14/911,391

(22) PCT Filed: Aug. 28, 2014

(86) PCT No.: PCT/JP2014/004414
§ 371 (c)(1),
(2) Date: Feb. 10, 2016

(87) PCT Pub. No.: WO2015/029433
PCT Pub. Date: Mar. 5, 2015

(65) Prior Publication Data
US 2016/0198149 A1    Jul. 7, 2016

(30) Foreign Application Priority Data
Aug. 28, 2013    (JP) ................................. 2013-176953

(51) Int. Cl.
*H04N 13/04* (2006.01)
*H04N 13/00* (2006.01)
*G02B 27/22* (2018.01)

(52) U.S. Cl.
CPC ......... *H04N 13/0413* (2013.01); *G02B 27/22* (2013.01); *H04N 13/0409* (2013.01);
(Continued)

(58) Field of Classification Search
CPC ........... H04N 13/0409; H04N 13/0475; H04N 13/0477; H04N 13/0413; H04N 2213/001; G02B 27/22
(Continued)

(56) References Cited

U.S. PATENT DOCUMENTS 9,451,246 B2    9/2016 Koyama et al.
9,698,347 B2 *  7/2017 Matsushima ....... H01L 51/0005
(Continued)

FOREIGN PATENT DOCUMENTS

JP    3 119889    5/1991
JP    2857429 B2   2/1999
(Continued)

OTHER PUBLICATIONS

International Preliminary Report on Patentability dated Mar. 10, 2016 in PCT/JP2014/004414 (with English translation).
(Continued)

*Primary Examiner* — Robert Chevalier
(74) *Attorney, Agent, or Firm* — Oblon, McClelland, Maier & Neustadt, L.L.P.

(57) ABSTRACT

A display panel includes sub-pixel pairs arranged laterally at a predetermined pitch, the sub-pixel pair including two sub pixels displaying images for right and left eyes respectively. A parallax-barrier shutter panel includes sub apertures switching light-transmitting and light-blocking states by
(Continued)

driving a liquid crystal layer held between two transparent substrates with transparent electrodes extending vertically. The sub apertures are arranged laterally at a pitch obtained by dividing a reference parallax-barrier pitch by N (N being an even number equal to or greater than four), the reference parallax-barrier pitch being determined on the basis of a predetermined design observation distance and the pitch of the sub-pixel pairs. The parallax-barrier shutter panel includes common driving areas obtained by dividing a display area laterally. (N·M+N/2) pieces of the transparent electrodes (M being a positive integer) arranged in the common driving are connected with every N-th one of the transparent electrodes.

5 Claims, 39 Drawing Sheets

(52) U.S. Cl.
CPC ..... *H04N 13/0475* (2013.01); *H04N 13/0477* (2013.01); *H04N 2213/001* (2013.01)

(58) Field of Classification Search
USPC ............. 348/56, 51, 54, 55, 42, 43; 386/200
See application file for complete search history.

(56) References Cited

U.S. PATENT DOCUMENTS

2006/0227208 A1* 10/2006 Saishu ............... H04N 13/0409
348/51

| | | |
|---|---|---|
| 2011/0051239 A1 | 3/2011 | Daiku |
| 2013/0021239 A1 | 1/2013 | Koyama et al. |

FOREIGN PATENT DOCUMENTS

| | | |
|---|---|---|
| JP | 2001 166259 | 6/2001 |
| JP | 2002 182153 | 6/2002 |
| JP | 2004 294914 | 10/2004 |
| JP | 2005-164916 A | 6/2005 |
| JP | 2011 053277 | 3/2011 |
| JP | 2013 024957 | 2/2013 |
| JP | 2013-41263 A | 2/2013 |

OTHER PUBLICATIONS

Combined Chinese Office Action and Search Report dated Apr. 28, 2017 in Patent Application No. 201480047287.1 (with English language translation).
International Search Report dated Nov. 18, 2014, in PCT/JP2014/004414 Filed Aug. 28, 2014.
Office Action dated Jun. 27, 2017 in Japanese Patent Application No. 2016-184122 with partial English translation.
Office Action dated Jul. 26, 2016 in Japanese Patent Application No. 2015-533997 (with partial English language translation).
Chinese Second Office Action dated Oct. 26, 2017 in Application No. 201480047287 with English translation, 10 pages.
Chinese Second Office Action dated Oct. 26, 2017 in Application No. 201480047287.1 with English translation, 10 pages.
Patent Office of the People's Republic of China Search Report for Application No. 2014800472871, 1 page.

* cited by examiner

F I G . 1
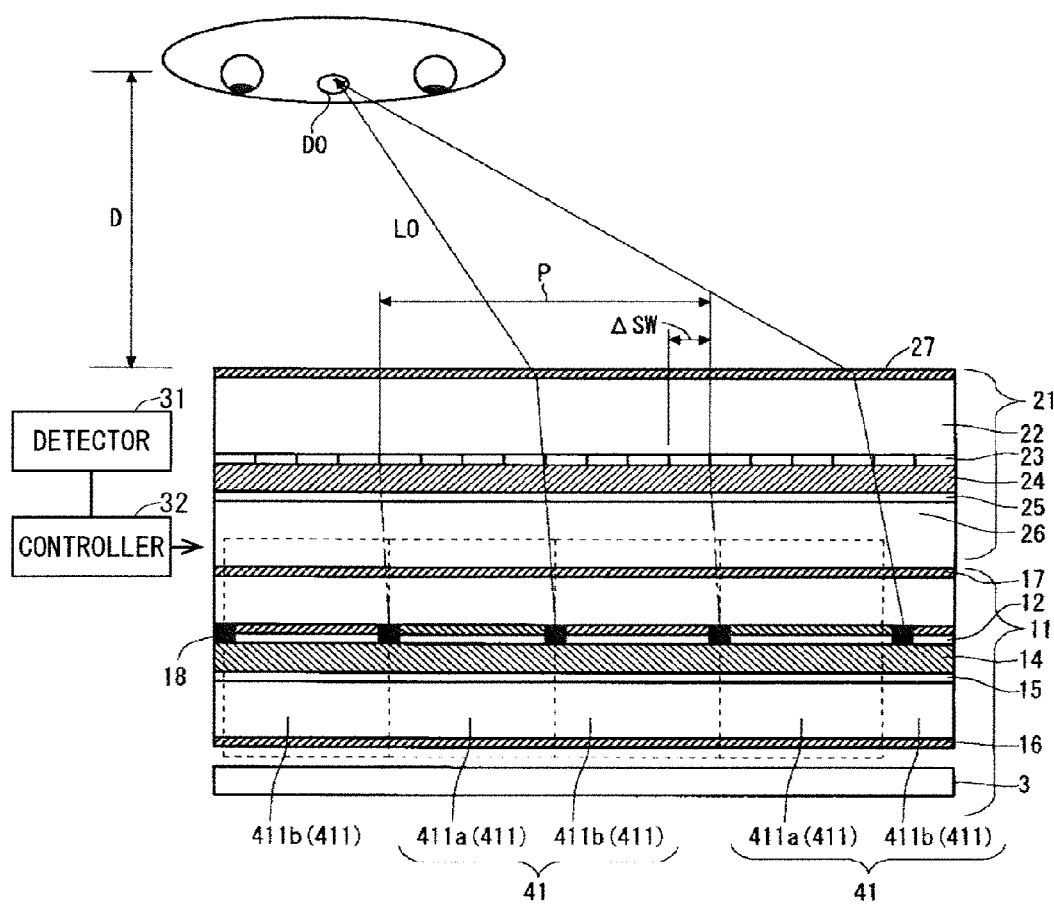

F I G . 4
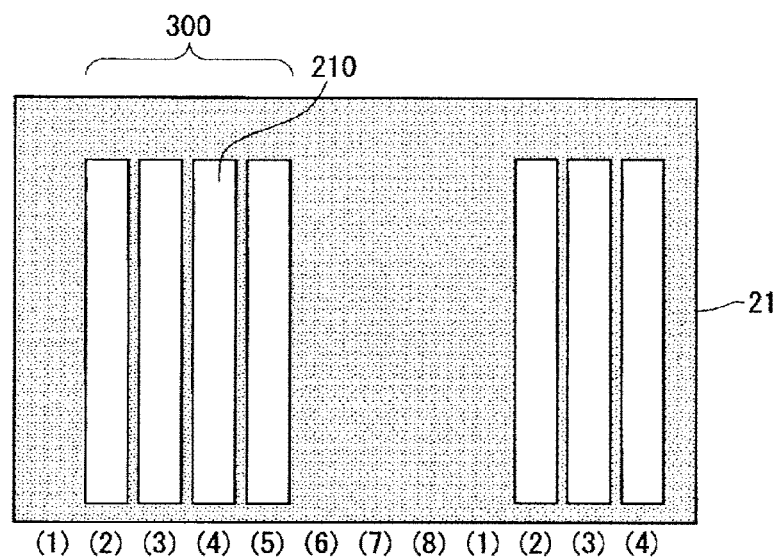
F I G . 5
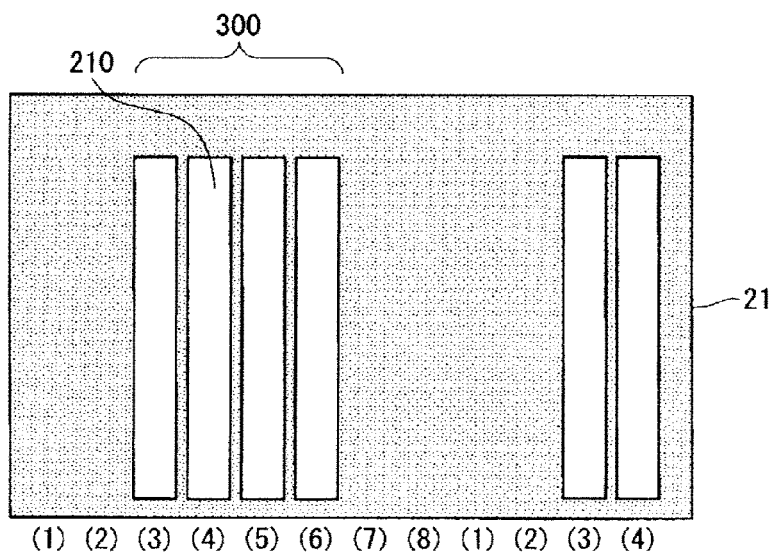

F I G . 6
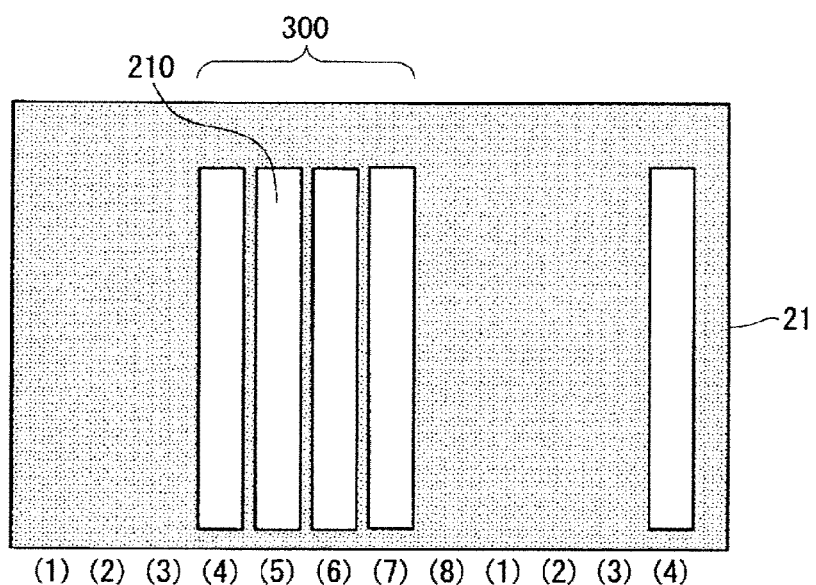
F I G . 7
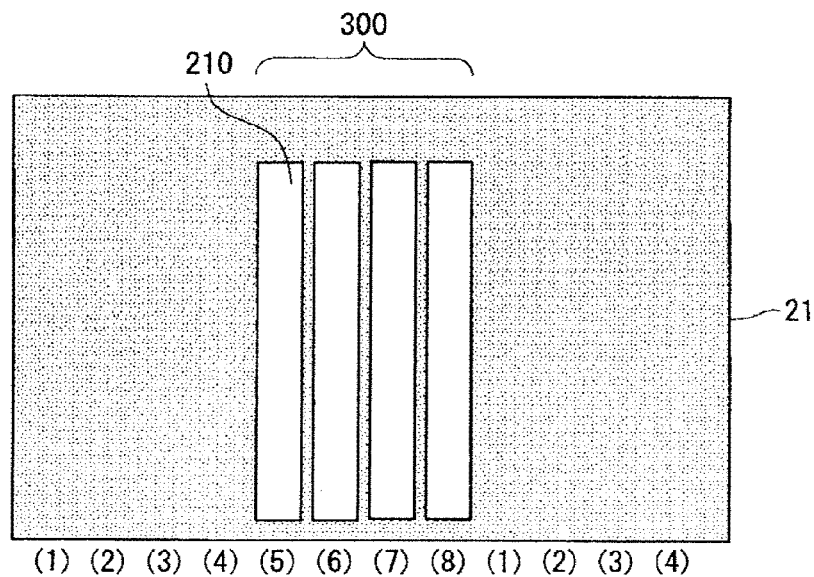

F I G . 8
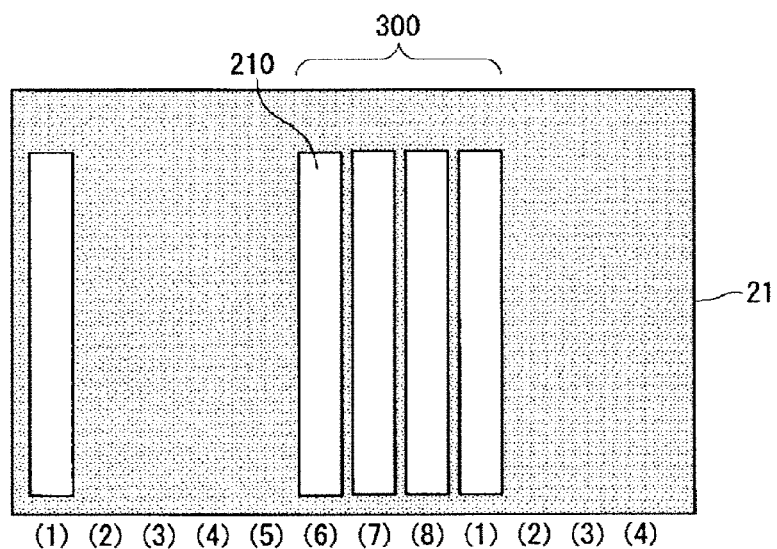
F I G . 9
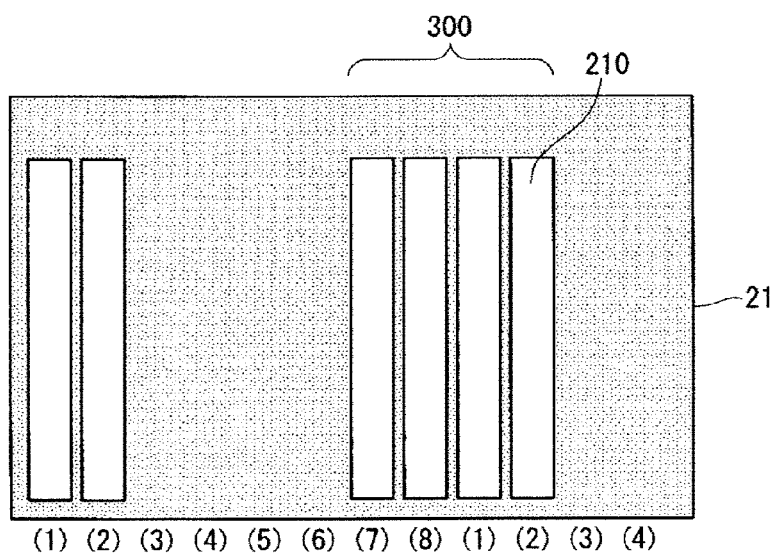

F I G . 1 0
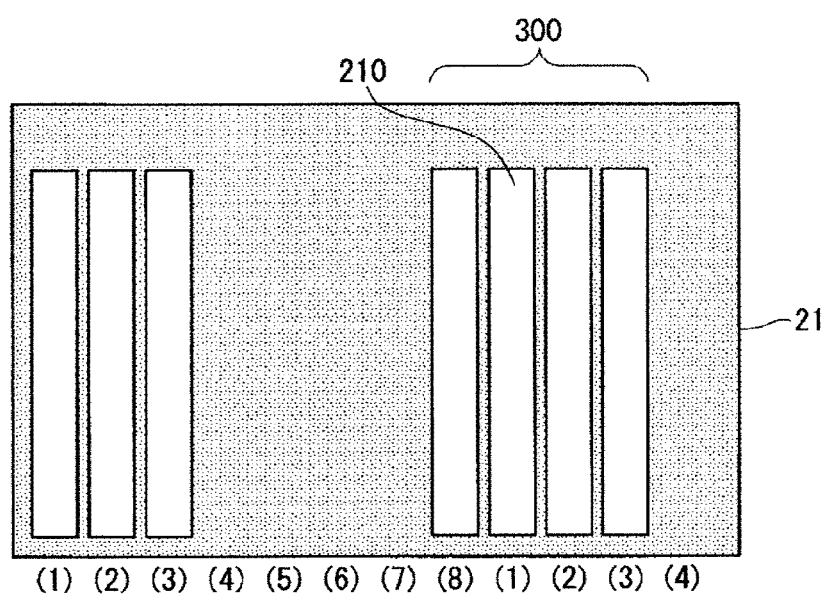

F I G . 1 2
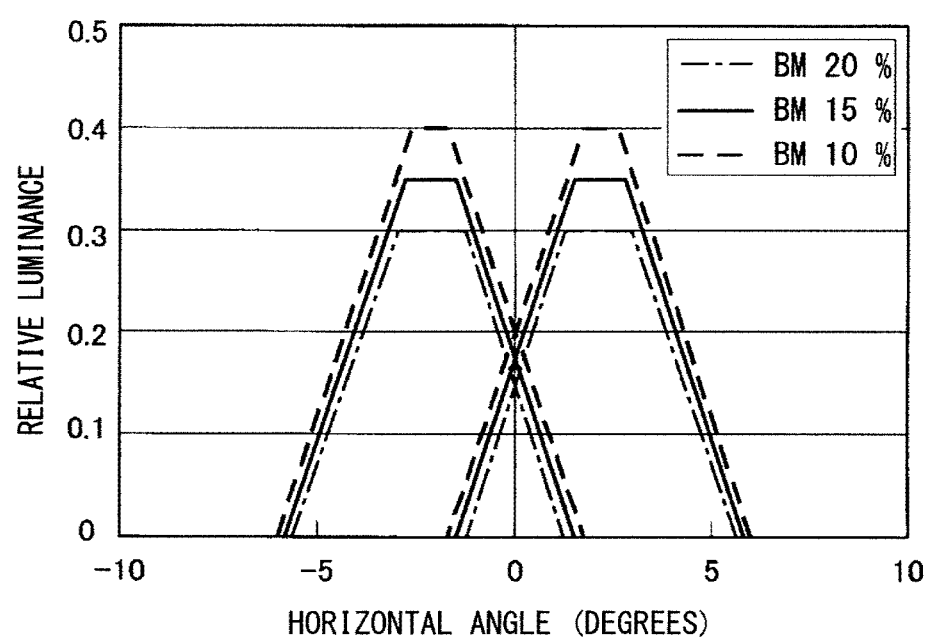

F I G. 1 3

| | CONDITION 1 | CONDITION 2 | CONDITION 3 | CONDITION 4 | CONDITION 5 | CONDITION 6 |
|---|---|---|---|---|---|---|
| REFERENCE PARALLAX-BARRIER PITCH P (mm) | 0.100 | 0.100 | 0.100 | 0.100 | 0.100 | 0.100 |
| SUB-PIXEL WIDTH GW (mm) | 0.030 | 0.035 | 0.040 | 0.040 | 0.045 | 0.050 |
| GW/P (%) | 30% | 35% | 40% | 40% | 45% | 50% |
| INTEGRATED APERTURE WIDTH SW (mm) | 0.050 | 0.050 | 0.050 | 0.020 | 0.025 | 0.030 |
| SW/P (%) | 50% | 50% | 50% | 20% | 25% | 30% |
| WIDTH DIFFERENCE \|GW−SW\| (mm) | 0.020 | 0.015 | 0.010 | 0.020 | 0.020 | 0.020 |
| \|GW−SW\|/P (%) | 20% | 15% | 10% | 20% | 20% | 20% |
| ANGULAR WIDTH OF LUMINANCE LEVELED REGION (DEGREES) | 2 | 1.5 | 1 | 2 | 2 | 2 |
| RELATIVE PEAK LUMINANCE | 0.030 | 0.035 | 0.040 | 0.020 | 0.025 | 0.030 |
| INTEGRATED LIGHT-BLOCKING PORTION WIDTH SBW (mm) | 0.050 | 0.050 | 0.050 | 0.080 | 0.075 | 0.070 |
| SBW/P (%) | 50% | 50% | 50% | 80% | 75% | 70% |
| WIDTH DIFFERENCE \|GW−SBW\| (mm) | 0.020 | 0.015 | 0.010 | 0.040 | 0.030 | 0.020 |
| \|GW−SBW\|/P (%) | 20% | 15% | 10% | 40% | 30% | 20% |
| COMPLETE LIGHT-BLOCKING ANGULAR WIDTH (DEGREES) | 2 | 1.5 | 1 | 4 | 3 | 2 |

F I G . 1 6
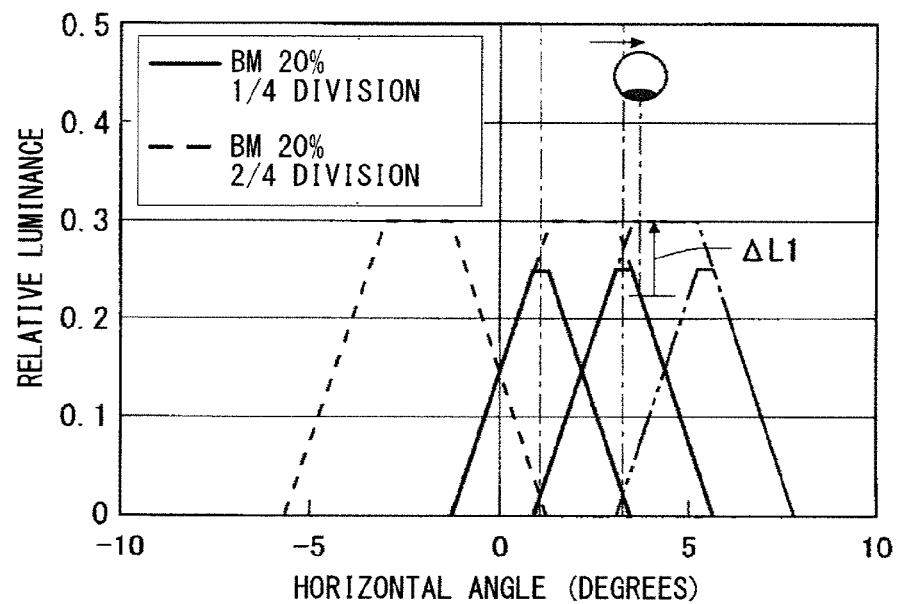
F I G . 1 7
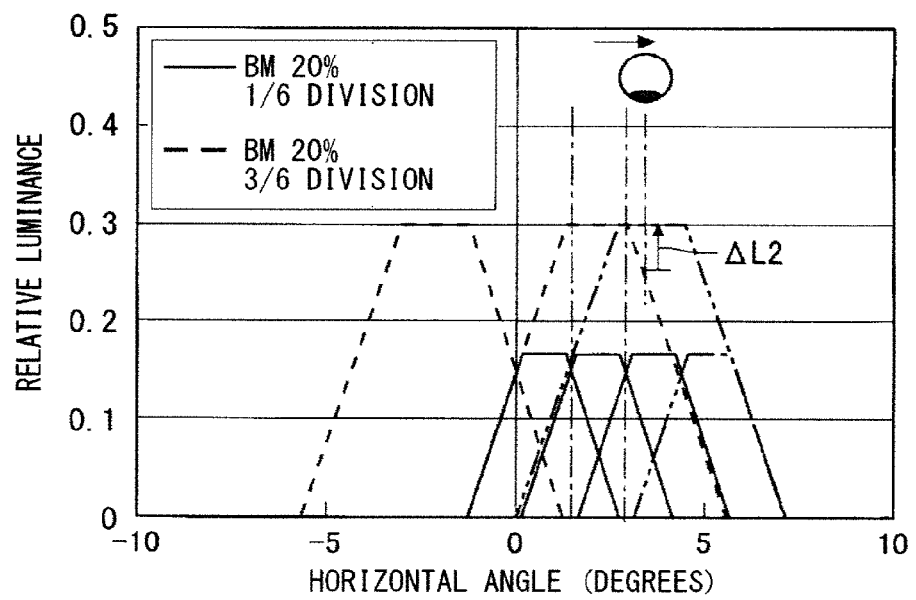

F I G . 1 8
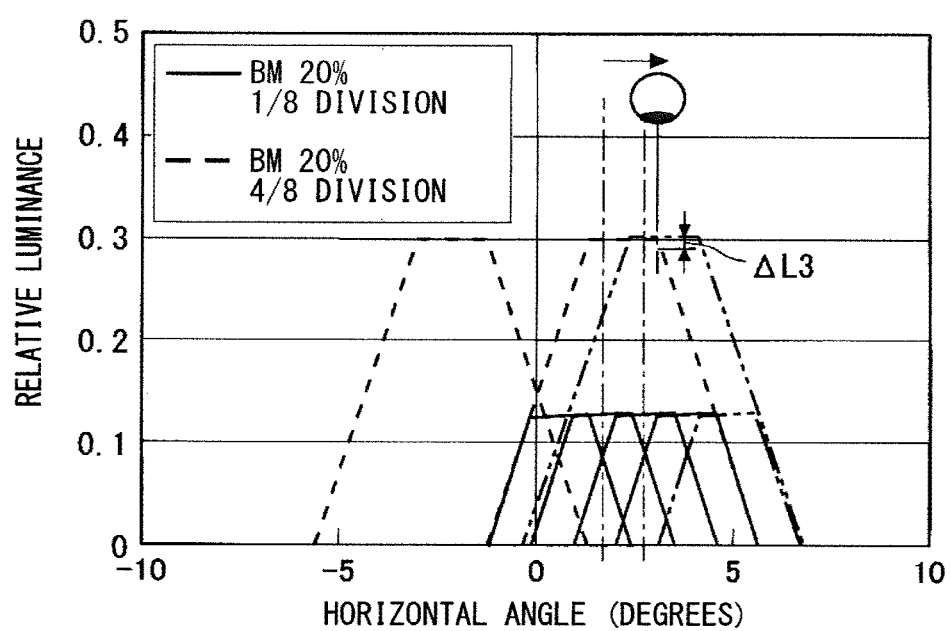

FIG. 19

| | CONDITION 1-1 | CONDITION 1-2 | CONDITION 1-3 | CONDITION 3-1 | CONDITION 3-2 | CONDITION 3-3 |
|---|---|---|---|---|---|---|
| REFERENCE PARALLAX-BARRIER PITCH P (mm) | 0.100 | 0.100 | 0.100 | 0.100 | 0.100 | 0.100 |
| SUB-PIXEL WIDTH GW (mm) | 0.030 | 0.030 | 0.030 | 0.040 | 0.040 | 0.040 |
| GW/P (%) | 30% | 30% | 30% | 40% | 40% | 40% |
| INTEGRATED APERTURE WIDTH SW (mm) | 0.050 | 0.050 | 0.050 | 0.0550 | 0.050 | 0.050 |
| SW/P (%) | 50% | 50% | 50% | 50% | 50% | 50% |
| WIDTH DIFFERENCE \|GW-SW\| (mm) | 0.020 | 0.020 | 0.020 | 0.010 | 0.010 | 0.010 |
| \|GW-SW\|/P (%) | 20% | 20% | 20% | 10% | 10% | 10% |
| BARRIER DIVISION NUMBER N | 4 | 6 | 8 | 6 | 8 | 10 |
| SUB-APERTURE PITCH ΔSW (mm) | 0.025 | 0.017 | 0.0125 | 0.017 | 0.0125 | 0.0100 |
| ΔSW/P (%) | 25% | 17% | 12.5% | 17% | 12.5% | 10% |
| PRESENCE OR ABSENCE OF LEVELED PORTION | × | ○ | ◎ | × | × | ○ |

FIG. 20

| | | CONDITION 7-1 | CONDITION 7-2 | CONDITION 7-3 | CONDITION 7-4 | CONDITION 7-5 | CONDITION 7-6 | CONDITION 7-7 |
|---|---|---|---|---|---|---|---|---|
| | REFERENCE PARALLAX-BARRIER PITCH P (mm) | 0.100 | 0.100 | 0.100 | 0.100 | 0.100 | 0.100 | 0.100 |
| DESIGN OF LUMINANCE ANGULAR DISTRIBUTION | SUB-PIXEL WIDTH GW (mm) | 0.025 | 0.033 | 0.037 | 0.040 | 0.043 | 0.044 | 0.045 |
| | GW/P (%) | 25% | 33% | 37% | 40% | 43% | 44% | 45% |
| | INTEGRATED APERTURE WIDTH SW (mm) | 0.05 | 0.05 | 0.05 | 0.05 | 0.05 | 0.05 | 0.05 |
| | SW/P (%) | 50% | 50% | 50% | 50% | 50% | 50% | 50% |
| | RELATIVE PEAK LUMINANCE | 25% | 33% | 38% | 40% | 43% | 44% | 45% |
| | WIDTH DIFFERENCE \|GW−SW\| (mm) | 0.025 | 0.017 | 0.013 | 0.010 | 0.007 | 0.006 | 0.005 |
| | \|GW−SW\|/P | 25.0% | 16.7% | 12.5% | 10.0% | 7.1% | 5.6% | 5.0% |
| DESIGN OF PARALLAX BARRIER DIVISION | BARRIER DIVISION NUMBER N | 4 | 6 | 8 | 10 | 14 | 18 | 20 |
| | SUB-APERTURE PITCH ΔSW (mm) | 0.025 | 0.017 | 0.013 | 0.010 | 0.007 | 0.006 | 0.005 |
| | ΔSW/P | 25.0% | 16.7% | 12.5% | 10.0% | 7.1% | 5.6% | 5.0% |
| | PRESENCE OR ABSENCE OF LEVELED PORTION | ○ | ○ | ○ | ○ | ○ | ○ | ○ |
| | NUMBER OF BOUNDARIES IN BARRIER INTEGRATED APERTURE | 1 | 2 | 3 | 4 | 6 | 8 | 9 |
| | AREA RATIO OF BOUNDARY LIGHT-BLOCKING PORTION IN INTEGRATED APERTURE WIDTH OF BOUNDARY LIGHT-BLOCKING PORTION 0.002mm | 4% | 8% | 12% | 16% | 24% | 32% | 36% |
| | (RATIO OF) INTEGRATED RELATIVE PEAK LUMINANCE (TO LUMINANCE OF PIXEL LIGHT-EMITTING PORTION) | 24.0% | 30.7% | 33.0% | 33.6% | 32.6% | 30.2% | 28.8% |

FIG. 22

F I G . 2 5
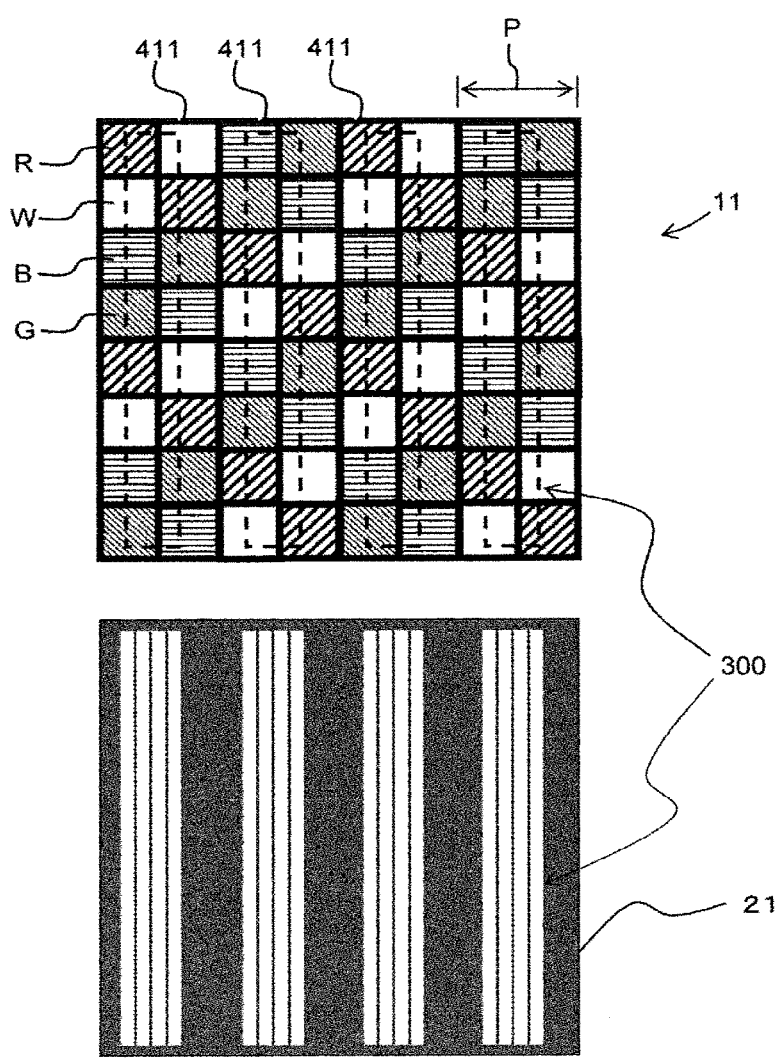

F I G . 3 3
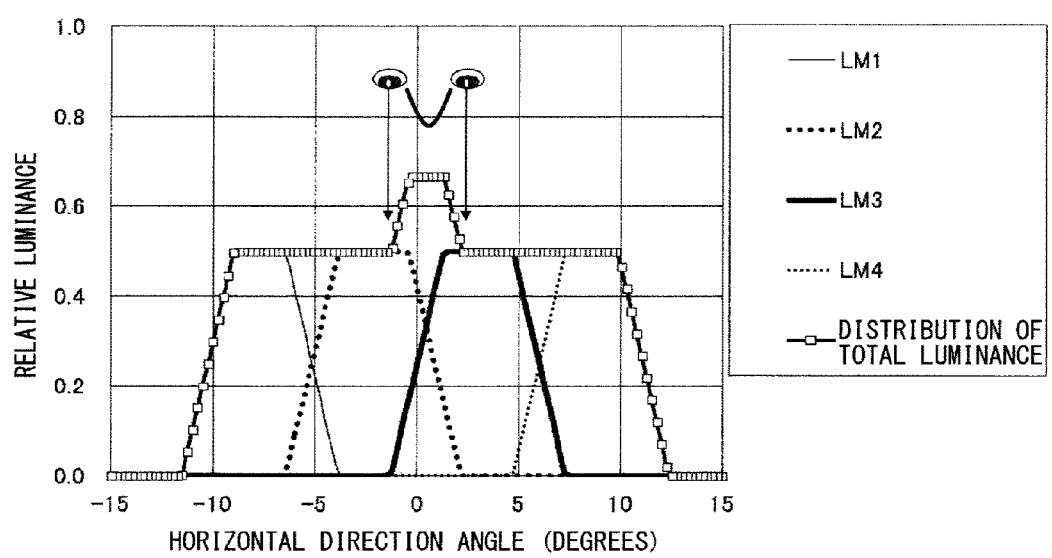

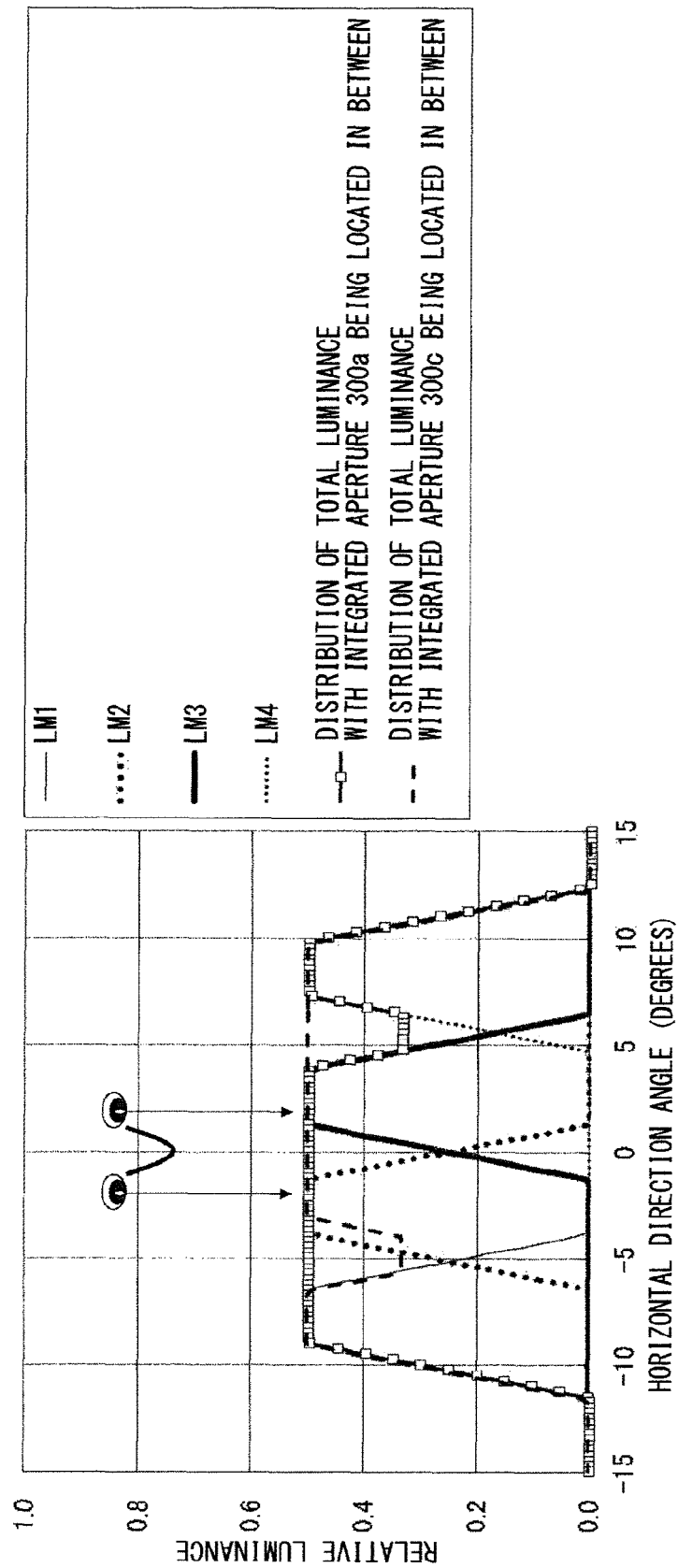

F I G . 4 1
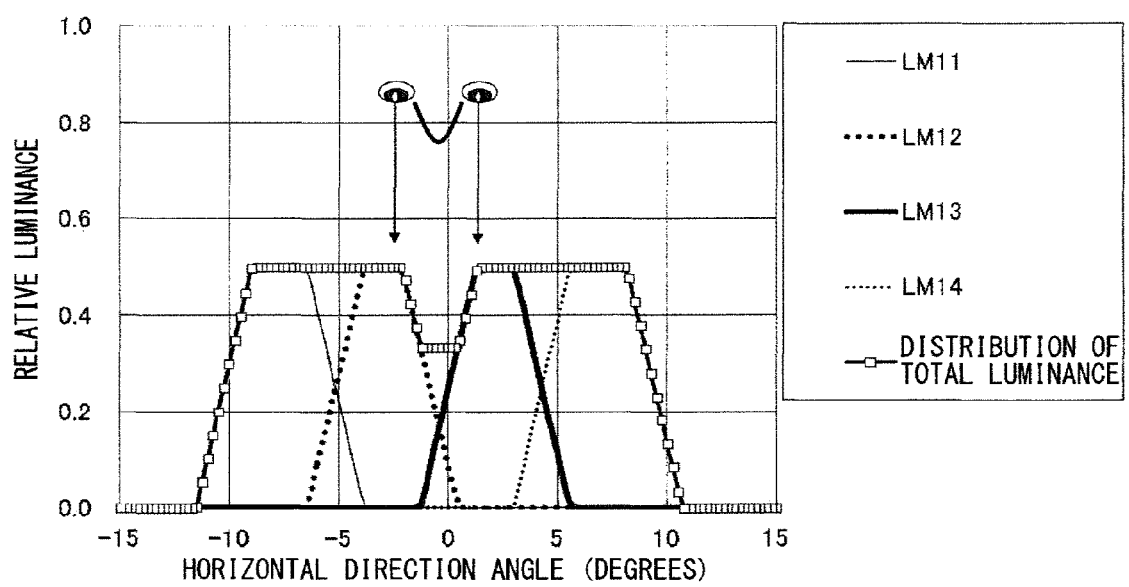

F I G . 4 3
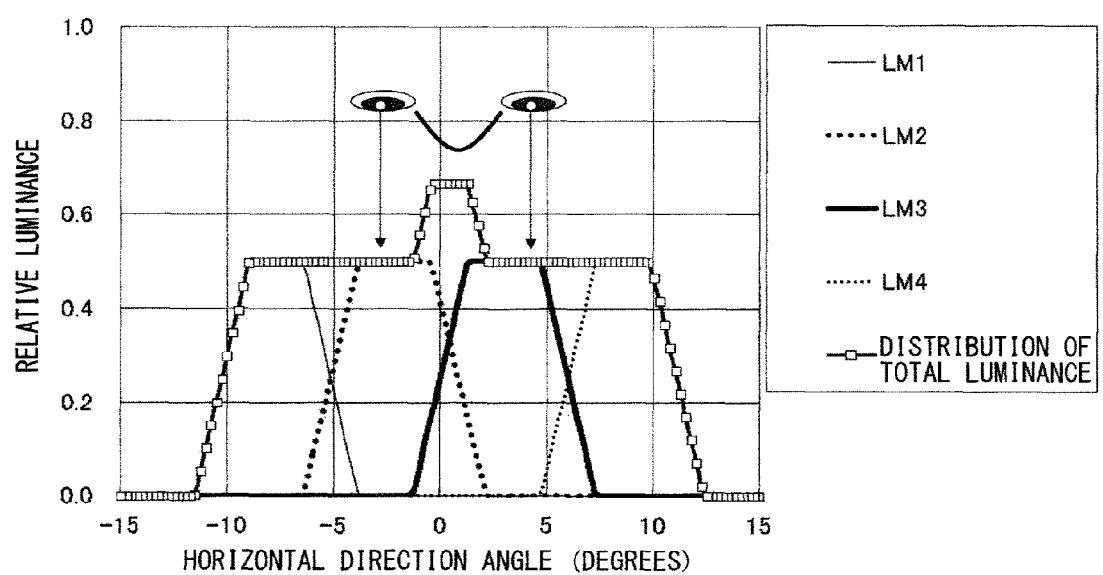

STEREOSCOPIC IMAGE DISPLAY APPARATUS, AND DRIVE METHOD THEREFOR

TECHNICAL FIELD

The present invention relates to a display apparatus, and more particularly relates to a naked-eye stereoscopic image display apparatus including an optical deflection member employing, for example, the parallax barrier system or the lenticular lens system.

BACKGROUND ART

Naked-eye stereoscopic image display apparatuses have traditionally been proposed which can provide a stereoscopic view without the need for special eyeglasses.

For example, in Patent Document 1, the stereoscopic image display apparatus is disclosed which includes a barrier generating means and an image display means. The barrier generating means generates, under electronic control, parallax barrier stripes through the use of transmission display elements. With the display screen being disposed at a predetermined distance behind the position in which the parallax barrier stripes are generated, the image display means can output and display a multidirectional image on the display screen during the stereoscopic image displaying. The multidirectional image includes strips of a left image and strips of a right image that are arranged in alternate order correspondently to the parallax barrier stripes.

Such stereoscopic image display apparatus is configured to generate barrier stripes electronically and to freely control and vary, for example, the shape (the number of the stripes, the width of the stripes, and intervals between the stripes), the position (phase), and the density of the generated barrier stripes. Thus, the stereoscopic image display apparatus is capable of serving as a two-dimensional image display apparatus and a stereoscopic image display apparatus, providing a compatible image display apparatus.

In Patent Document 2, the naked-eye stereoscopic image display apparatus is disclosed which includes an image display means, a light-blocking means, a sensor, and a region division movement control means. The image display means displays the striped left-eye image and the striped right-eye image in an alternate manner. The light-blocking means is configured to move the position of the light-blocking portion generating a binocular parallax effect with a pitch equal to a quarter of the pitch of the light-blocking portion. The sensor detects the movement of the observer's head in a horizontal direction and also detects whether the position of the observer's head is out of the preferred viewing range in an anterior-posterior direction. With the light-blocking means being subjected to the division into regions in the horizontal direction, when the position of the observer's head is out of the preferred viewing range in an anterior-posterior direction, the region division movement control means controls whether to move the position of the light-blocking portion of the light-blocking means for each region division obtained through the division into regions.

Even if the head of the observer's head moves to a position out of the preferred viewing position, the stereoscopic image display apparatus according to Patent Document 2 is capable of supplying the right-eye image to the right eye of the observer and supplying the left-eye image to the left eye of the observer by performing the movement control over the light-blocking portion and the display control over the image display means. This allows the observer to recognize a stereoscopic image.

PRIOR ART DOCUMENTS

Patent Documents

Patent Document 1: Japanese Patent Application Laid-Open No. 03-119889 (1991)
Patent Document 2: Japanese Patent Application Laid-Open No. 2001-166259

SUMMARY OF INVENTION

Problem to be Solved by the Invention

Through the stereoscopic image display apparatuses according to Patent Documents 1 and 2, the observer unfortunately notices changes in luminance during the movement control over the barrier light-blocking portion and the display control over the image display means under electronic control in response to the movement of the observer's head. The observer would feel uncomfortable particularly when the switching is performed frequently in response to a large number of movements of the observer's head.

The present invention therefore has been made to solve the above-mentioned problem, and an object thereof is provide a display apparatus capable of allowing an observer located at any observation distance to visually recognize a stereoscopic image even in the stereoscopic image display mode without local luminance flickers, which are otherwise visually recognized as emission lines and dark lines associated with the movement of the observer.

Means to Solve the Problem

A method for driving a stereoscopic image display apparatus according to the present invention is a method in a stereoscopic image display apparatus including a display panel and a parallax-barrier shutter panel. The display panel includes a plurality of sub-pixel pairs arranged in a lateral direction at a predetermined pitch. Each of the plurality of sub-pixel pairs includes two sub pixels, one of the sub pixels displaying an image for a right eye and the other one of the sub pixels displaying an image for a left eye. The parallax-barrier shutter panel is located between the display panel and a backlight. The backlight is located at one side of the display panel. The one side is opposite to the other side of the display panel, an observer of the display panel being at the other side. The parallax-barrier shutter panel includes a plurality of sub apertures capable of electrically switching a light-transmitting state and a light-blocking state. The plurality of sub apertures are arranged in a lateral direction at a pitch obtained by dividing a reference parallax-barrier pitch by N (N being an even number equal to or greater than four), the reference parallax-barrier pitch being determined on the basis of a predetermined design observation distance and the pitch of the sub-pixel pairs. The method includes: forming an integrated aperture by transforming (N/2) pieces of the sub apertures adjacent to each other into the light-transmitting state and transforming (N/2) pieces of the sub apertures adjacent to each other into the light-blocking state in a case where the observer is located at a distance equal to the design observation distance; providing, in the lateral direction, at least one part in which (N/2+1) pieces of the sub apertures adjacent to each other are transformed into the light-transmitting state and transforming (N/2) pieces of the sub apertures adjacent each other into the light-blocking state in a case where the observer is located at a distance smaller than the design observation distance; and providing, in the lateral direction, at least one part in which (N/2−1) pieces of the sub apertures adjacent to each other are transformed into the light-transmitting state and transforming (N/2) pieces of the sub apertures adjacent to each other into the light-blocking state in a case where the observer is located at a distance greater than the design observation distance.

A stereoscopic image display apparatus according to the present invention includes a display panel and a parallax-barrier shutter panel. The display panel includes a plurality of sub-pixel pairs arranged in a lateral direction at a predetermined pitch. Each of the plurality of sub-pixel pairs includes two sub pixels, one of the sub pixels displaying an image for a right eye and the other one of the sub pixels displaying an image for a left eye. The parallax-barrier shutter panel includes a plurality of sub apertures capable of electrically switching a light-transmitting state and a light-blocking state by driving a liquid crystal layer held between two transparent substrates with transparent electrodes extending in a vertical direction. The plurality of sub apertures are arranged in a lateral direction at a pitch obtained by dividing a reference parallax-barrier pitch by N (N being an even number equal to or greater than four), the reference parallax-barrier pitch being determined on the basis of a predetermined design observation distance and the pitch of the sub-pixel pairs. The parallax-barrier shutter panel includes a plurality of common driving areas obtained by dividing a display area in the lateral direction. (N·M+N/2) pieces of the transparent electrodes (M being a positive integer) arranged in each of the common driving areas are electrically connected with every N-th one of the transparent electrodes.

Effects of the Invention

The present invention allows, through the above configuration, the observer at an observation distance that is different from the design observation distance to visually recognize a stereoscopic image without being aware of changes in luminance even in a case where he or she moves in a horizontal direction.

BRIEF DESCRIPTION OF DRAWINGS

FIG. 1 A cross-sectional view illustrating a configuration of a display apparatus according to an underlying technique.

FIG. 4 A view illustrating integrated apertures according to the underlying technique.

FIG. 5 A view illustrating integrated apertures according to the underlying technique.

FIG. 6 A view illustrating integrated apertures according to the underlying technique.

FIG. 7 A view illustrating integrated apertures according to the underlying technique.

FIG. 8 A view illustrating integrated apertures according to the underlying technique.

FIG. 9 A view illustrating integrated apertures according to the underlying technique.

FIG. 10 A view illustrating integrated apertures according to the underlying technique.

FIG. 12 A view illustrating calculation results associated with the configuration of the display apparatus.

FIG. 13 A view illustrating calculation results associated with the configuration of the display apparatus.

FIG. 16 A view illustrating calculation results associated with the configuration of the display apparatus.

FIG. 17 A view illustrating calculation results associated with the configuration of the display apparatus.

FIG. 18 A view illustrating calculation results associated with the configuration of the display apparatus.

FIG. 19 A view illustrating calculation results associated with the configuration of the display apparatus.

FIG. 20 A view illustrating calculation results associated with the configuration of the display apparatus.

FIG. 22 A view illustrating the operation of the display apparatus according to the first embodiment.

FIG. 25 A view illustrating the operation of the display apparatus according to the first embodiment.

FIG. 33 A view illustrating calculation results associated with the display apparatus according to the first embodiment.

FIG. 34 A view illustrating calculation results associated with the display apparatus according to the first embodiment.

FIG. 41 A view illustrating calculation results associated with the display apparatus according to the second embodiment.

FIG. 43 A view illustrating calculation results associated with the display apparatus according to the second embodiment.

DESCRIPTION OF EMBODIMENTS

Figure 2:
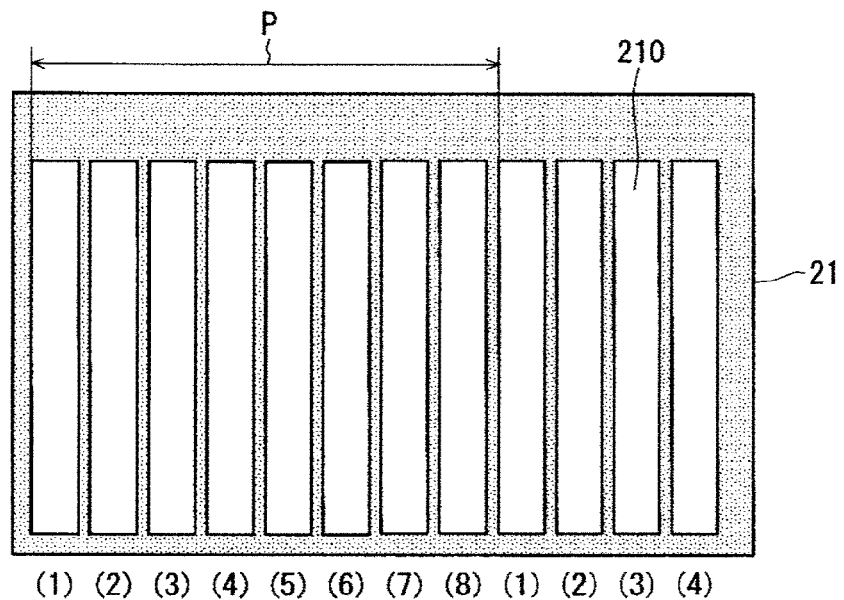
FIG. 2 A view illustrating a parallax-barrier shutter panel according to the underlying technique.

Embodiments of the present invention are described below with reference to the drawings.

<Underlying Technique>

Firstly, the technique underlying the present invention is described. FIG. 1 is a cross-sectional view illustrating a configuration of a display apparatus according to the technique underlying the present invention. The display apparatus is capable of concurrently displaying two images including a right image (a parallax image for the right eye or an image for a first observation direction) and a left image (a parallax image for the left eye and being slightly different from the parallax image for the right eye or an image for a second observation direction). This display apparatus allows visually recognizing a stereoscopic image through naked eyes without the use of special eyeglasses or displaying different images in different observation directions. The following particularly describes the display apparatus displaying parallax images for the right and left eyes.

The display apparatus includes: a naked-eye stereoscopic image display apparatus described later, a detector 31 that detects the position (movement) of, for example, the observer's head; and a controller 32 that exercises centralized control over the naked-eye stereoscopic image display apparatus and the detector on the basis of the detection results obtained by the detector 31, image signals, and the like. In the following description, the superior-inferior direction in FIG. 1 is referred to as an anterior-posterior direction, the horizontal direction in FIG. 1 is referred to as a lateral direction, and the depth direction in FIG. 1 is referred to as a vertical direction.

FIG. 1 illustrates a cross-sectional configuration of a naked-eye stereoscopic image display apparatus. As illustrated in FIG. 1, the naked-eye stereoscopic image display apparatus includes a display panel 11 and a parallax-barrier shutter panel 21 (an optical guidance member) located anterior to the display panel 11 (on the upper side in FIG. 1).

The display panel 11 is a matrix display panel. For example, an organic electroluminescent (EL) panel, a plasma display apparatus, or a liquid crystal display is applicable. Although not shown in the drawing, in the application of a liquid crystal display as display panel 11, the parallax-barrier shutter panel 21 may be located posterior to the display panel 11. In the example shown in FIG. 1, the liquid crystal display is applied as the display panel 11. The display panel 11 includes liquid crystals 14, a sub-pixel transparent electrode 12 and a counter transparent electrode 15 that sandwich and drive the liquid crystals 14, an intermediate polarizing plate 17 located on the transparent substrate of the sub-pixel transparent electrode 12, and a rear-surface polarizing plate 16 located on the transparent substrate of the counter transparent electrode 15, and a backlight 3 located posterior to the rear-surface polarizing plate 16 (on the lower side in FIG. 1).

In the display panel 11, sub pixels 411a (411) that display the above-mentioned right image and sub pixels 411b (411) that display the above-mentioned left image are alternately arranged in the lateral direction while each of the sub pixels is sandwiched between light-blocking walls 18.

The breadth of the sub pixel 411a and the breadth of the sub pixel 411b are equal or substantially equal to each other. The sub pixel 411a and the sub pixel 411b adjacent to each other constitute a sub-pixel pair 41 that displays two different images in the right and the left (the parallax images in the right and the left or the images for the first and second observation directions). The sub-pixel pairs 41 having the above configuration are arranged in the display panel 11 at a predetermined uniform pitch in the lateral direction. In this naked-eye stereoscopic image display apparatus, the sub-pixel pairs 41 are arranged not only in the lateral direction but also in the vertical direction.

In this naked-eye stereoscopic image display apparatus, a reference parallax-barrier pitch P is defined, being the reference pitch in the lateral direction that corresponds to the breadth of the sub-pixel pair 41. The reference parallax-barrier pitch P is set such that virtual rays LO each emitted from the center of the light-blocking wall 18 located in between the sub pixel 411a and the sub pixel 411b constituting the sub-pixel pair 41 and each passing through the midpoint of the corresponding one of the reference parallax-barrier pitches P converge a designed visual recognition point DO at a design observation distance D anterior to the naked-eye stereoscopic image display apparatus.

The parallax-barrier shutter panel 21 includes two transparent substrates (a first transparent substrate 22 and a second transparent substrate 26), a liquid crystal layer 24 held between these transparent substrates, first transparent electrodes 23, second transparent electrodes 25, a display-surface polarizing plate 27 located on the surface of the first transparent substrate 22 opposite to the liquid crystal layer 24, and a polarizing plate located on the second transparent substrate 26 facing the display panel 11. The intermediate polarizing plate 17 of the display panel 11 doubles as the relevant polarizing plate.

The available modes of liquid crystals include the twisted nematic (TN) mode, the super twisted nematic (STN) mode, the in-plane switching mode, and the optically compensated bend (OCB) mode. The examples of employing some of these modes will be described later.

The plurality of first transparent electrodes 23 extending in the vertical direction (in the depth direction in FIG. 1) are formed on the surface of the first transparent substrate 22 facing the liquid crystal layer 24. The plurality of second transparent electrodes 25 extending in the lateral direction (in the horizontal direction in FIG. 1) are formed in the surface of the second transparent substrate 26 facing the liquid crystal layer 24. The plurality of first transparent electrodes 23 and the plurality of second transparent electrodes 25 drive the liquid crystals in the liquid crystal layer 24 by applying an electric field to the liquid crystal layer 24.

The first transparent electrodes 23 are equivalent to individual electrodes obtained by dividing one transparent electrode into an even number of electrodes (eight electrodes in this example) in the region of the reference parallax-barrier pitch P. That is, the naked-eye stereoscopic image display apparatus includes an even number of first transparent electrodes 23 (eight first transparent electrode 23) arranged in the region of the reference parallax-barrier pitch P of the individual pixel pair 41 in the lateral direction. Except when specified otherwise, the plurality of first transparent electrodes 23 are insulated from one another.

Meanwhile, the plurality of second transparent electrodes 25 are arranged in the vertical direction (in the depth direction in FIG. 1) at a vertical pitch of the sub-pixel pairs 41.

A voltage is selectively applied to the plurality of first and second transparent electrodes 23 and 25 mentioned above. In the parallax-barrier shutter panel 21, the light-transmitting state and the light-blocking state can be switched by the width of the first transparent electrode 23 and the width of the second transparent electrode 25. Thus, in the following description, the optical apertures of the parallax-barrier shutter panel 21 capable of switching the light-transmitting state and the light-blocking state through electronical control by the width of the first transparent electrode 23 are referred to as sub apertures 210.

As mentioned above, in the naked-eye stereoscopic image display apparatus, the plurality of first transparent electrodes 23 are laterally arranged in the parallax-barrier shutter panel 21, and accordingly, the plurality of sub apertures 210 are laterally arranged in the parallax-barrier shutter panel 21. As mentioned above, an even number of first transparent electrodes 23 (eight first transparent electrodes 23 in this example) are arranged in the region of the reference parallax-barrier pitch P in the parallax-barrier shutter panel 21, and accordingly, the same number of sub apertures 210 (eight sub apertures 210 in this example) are included in the region of the reference parallax-barrier pitch P in the parallax-barrier shutter panel 21.

FIGS. 2 to 10 illustrate the parallax-barrier shutter panel 21. As in the above description, eight first transparent electrodes 23 correspond to each of the sub-pixel pairs 41. As illustrated in FIG. 2, eight sub apertures 210 denoted by (1) to (8) are included in the region of the individual reference parallax-barrier pitch P. As illustrated in FIGS. 3 to 10, among the even number of sub apertures 210 (eight sub apertures 210) in the region of the individual reference parallax-barrier pitch P, half of the even number of sub apertures 210 (four sub apertures) adjacent to each other are in the light-transmitting state and the remaining half of the sub apertures 210 (four sub apertures 210) (the other sub apertures 210) are in the light-blocking state. Thus, the above-mentioned given number of sub apertures 210 in the light-transmitting state provide an integrated aperture 300 formed in the parallax-barrier shutter panel 21. The integrated aperture 300 (the sub apertures 210) guides, in different directions, the light emitted from the sub pixel 411$b$ displaying the left image and the light emitted from the sub pixel 411$a$ displaying the right image.

Figure 3:
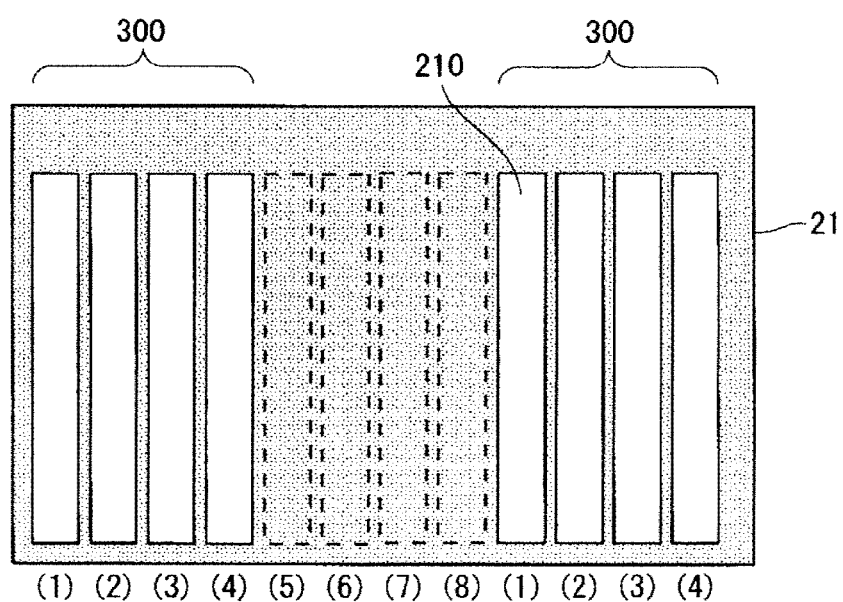
FIG. 3 A view illustrating integrated apertures according to the underlying technique.

According to the pattern 1 illustrated in FIG. 3, in the region of the individual reference parallax-barrier pitch P, the consecutive four sub apertures 210 denoted by (1) to (4) are in the light-transmitting state and the sub apertures 210 (the other sub apertures 210) denoted by (5) to (8) are in the light-blocking state, thus providing one integrated aperture 300 formed of four sub apertures 210 in the light-transmitting state.

In the pattern 1, the sub aperture 210 denoted by (1) is transformed into the light-blocking state and the sub aperture 210 denoted by (5) is transformed into the light-transmitting state, whereby the state equal to a pattern 2 is provided.

In the transition from the pattern 1 to the pattern 2, the integrated aperture 300 moves rightward in the parallax-barrier shutter panel 21 at the pitch (hereinafter also referred to as a "sub-aperture pitch ΔSW") of the sub aperture 210 in the parallax-barrier shutter panel 21. That is, the sub aperture 210 on one end of the integrated aperture 300 is transformed into the light-blocking state and the sub aperture 210 adjacent to the other end of the integrated aperture 300 is transformed into the light-transmitting state, so that the integrated aperture 300 moves in the direction from the one end toward the other end at the sub-aperture pitch ΔSW.

As described below, the first transparent electrodes 23 are slightly apart from each other, and thus, the boundary portion located therebetween cannot apply an electric field to the liquid crystal layer 24. To be exact, the sub-aperture pitch ΔSW is equal to the sum of the breadth of the sub aperture and the breadth of the boundary portion.

Next, the following briefly describes the operation of the above-mentioned display apparatus. As described above, the detector 31 illustrated in FIG. 1 detects the position (movement) of an observer. The controller 32 exercises centralized control over the display panel 11 and the parallax-barrier shutter panel 21 on the basis of the detection results obtained by the detector 31. In particular, the controller 32 controls the position of the integrated aperture 300 in the parallax-barrier shutter panel in the lateral direction by changing, among the plurality of sub apertures 210, the sub apertures 210 to be transformed into the light-transmitting state on the basis of the detection results obtained by the detector 31. Thus, in a case where the position of the observer moves rightward and leftward, the display apparatus can move the integrated aperture 300 in the lateral direction in accordance with the position of the observer. Consequently, the observer can view a stereoscopic image while he or she is moving.

In a case where the light angular distribution (the light luminance distribution) varies widely and in a case where the integrated aperture 300 does not move properly, the observer who is moving notices luminance variations (flickers) of the stereoscopic image. The following conditions (C1) to (C3) need to be satisfied in order to eliminate or reduce luminance variations of the image. In particular, as the condition (C1), the luminance of the parallax images for the right and left eyes of the observer needs to be leveled (constant) in the observation region in which the sub apertures 210 are not switched between the light-transmitting state and the light-blocking state. As the condition (C2), the region in which the parallax image for one of the eyes is observed needs to include the range in which the parallax image for the other eye is not observed. As the condition (C3), even if the sub apertures 210 are switched between the light-transmitting state and the light-blocking state in accordance with the movement of the integrated apertures 300, the luminance needs to be leveled (constant) on the movement path of the observer. The following describes the configuration for satisfying the above-mentioned three conditions.

<Condition (C1)>

Figure 11:
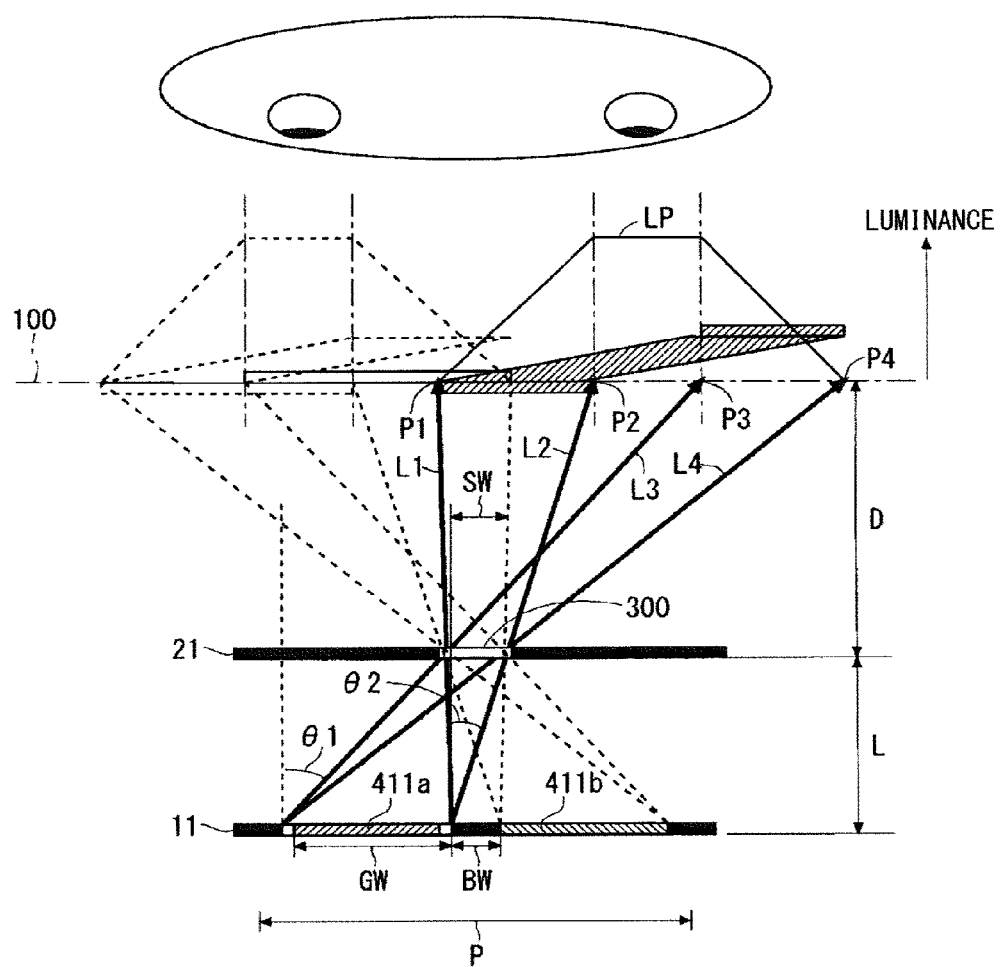
FIG. 11 A view illustrating the configuration of the display apparatus according to the underlying technique.

Firstly, the following describes the configuration for satisfying the condition (C1). With reference to FIG. 11, the following describes the light angular distribution of the light that has been emitted from the sub pixel 411$a$ for displaying the right image and has passed (been transmitted) through the integrated aperture 300 of the parallax-barrier shutter panel 21. The opening breadth of the integrated aperture 300 (hereinafter referred to as an "integrated aperture width") is denoted by SW, the breadth of the light emission region of the sub pixel 411 (hereinafter referred to as an "sub-pixel width") is denoted by GW, and the breadth of the light-blocking wall 18 (hereinafter referred to as a "light-blocking wall width") is denoted by BW.

With reference to FIG. 11, the design observation distance D is, for convenience in illustration, substantially identical to a distance L (a pixel-barrier distance L) between the parallax-barrier shutter panel 21 and the sub pixel 411. In actuality, the design observation distance D is 100 to 1000 times greater than the pixel-barrier distance L. For the brevity of description, it is assumed that the light radiated from the sub pixel 411 is uniform regardless of the position and the radiation angle and is not refracted on the surface of the parallax-barrier shutter panel 21. On this assumption, the apparent angles of the rays illustrated in the drawing have no significance in terms of the luminance of the sub pixel 411. Alternatively, the relative positional relation between the sub pixel 411 and the integrated aperture 300 associated with the rays is significant.

Based on the above-mentioned premise, the following describes the luminance distribution (illuminance distribution) of the light radiated from the sub pixel 411a for displaying the right image, the luminance distribution being provided on a virtual screen 100 at the observation distance D from the naked-eye stereoscopic image display.

A ray L1 and a ray L2 radiated form one point at the right end of the sub pixel 411a shown in FIG. 11 pass through the integrated aperture 300 and impinge upon the region hatched with oblique lines between a position P1 and a position P2 on the virtual screen 100. A ray L3 and a ray L4 radiated from one point at the left end of the sub pixel 411a pass through the integrated aperture 300 and impinge upon the region between a position P3 and a position P4 on the virtual screen 100. For convenience in illustration, the irradiated region is hatched with oblique lines and displaced slightly on the upper side of the FIG. 11. Similarly, another ray radiated from a given point that is not located at the right end and the left end of the sub pixel 411a passes through the integrated aperture 300 and impinges upon a region having substantially the same area. The irradiated region is illustrated in a continuous manner between the two regions hatched with oblique lines.

The luminance distribution of the sub pixel 411a on the virtual screen 100 is obtained by accumulating overlaps among the above-mentioned regions hatched with oblique lines for each position in the lateral direction. Thus, the light emitted from the sub pixel 411a provides a luminance distribution LP formed on the virtual screen 100 as shown in FIG. 11. With reference to FIG. 11, the line of the luminance distribution LP located on the upper side of the drawing indicates that the luminance at the position is higher. The same holds true for the luminance distribution illustrated in some of the following drawings.

The luminance distribution LP between the position P2 and the position P3 is leveled but the luminance distribution LP between the position P1 and the position P2 and between the position P3 and the position P4 is inclined.

To satisfy the above-mentioned condition (C1), or equivalently, to obtain the luminance that is leveled (constant) as much as possible regardless of the light angular distribution, the distance between the position P2 and the position P3 needs to be increased such that the leveled portion of the luminance distribution LP expands. That is, it is required that a radiation angle θ2 of the ray L2 is not parallel with a radiation angle θ1 of the ray L3 and the difference between these angles is increased as much as possible. In other words, the difference between the integrated aperture width SW and the sub pixel width GW being the breadth of the light emission region in the pixel (the breadth of the sub pixel 411) needs to be increased as much as possible. This can expand the angular range in which the luminance is constant.

FIG. 12 indicates the calculation results associated with the light angular distribution of the light that has been emitted from the sub pixel 411 of the display panel 11 and has passed through the integrated aperture 300 of the parallax-barrier shutter panel 21. The sub-pixel width GW of the display panel 11 is set at 0.050 mm. The reference parallax-barrier pitch P of the parallax-barrier shutter panel 21 is set at 0.100 mm. The pixel-barrier distance L is set at 1.000 mm. The integrated aperture width SW is set at 0.050 mm, which is equal to 50% of the reference parallax-barrier pitch P. The refractive index of the display panel 11 and the refractive index of the parallax-barrier shutter panel 21 are each set at 1.5. On the above-mentioned conditions, FIG. 12 indicates the light angular distribution obtained by changing the light-blocking wall width BW, which is set at 20%, 15%, and 10% of the reference parallax-barrier pitch P.

FIG. 13 indicates the results obtained by investigating various characteristics including the angular width of the luminance leveled region on the wider variety of conditions. As indicated in FIG. 13, the angular width of the luminance leveled region stands at 2 degrees, 1.5 degrees, and 1 degree for the width difference |GW−SW| standing at 0.020 m, 0.015 mm, and 0.010 mm, respectively. This provides the results that agree with the above description stating that the leveled portion of the luminance distribution expands as the width difference increases. Thus, to satisfy the condition (C1), or equivalently, to increase the angular width of the luminance leveled region, it is necessary to increase the difference between the sub-pixel width GW and the integrated aperture width SW.

<Condition (C2)>

Figure 14:
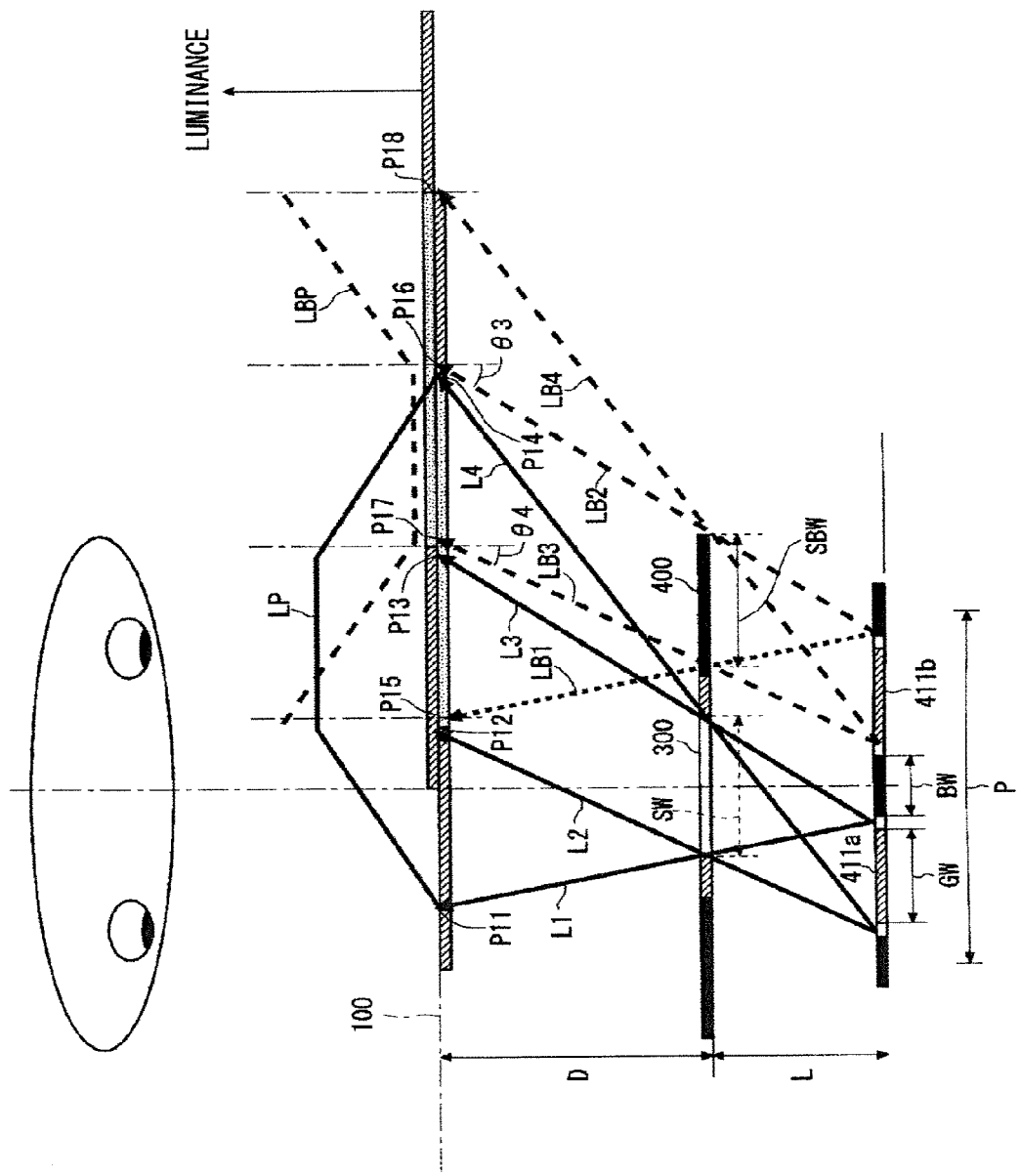
FIG. 14 A view illustrating the configuration of the display apparatus according to the underlying technique.

Next, the following describes the configuration that satisfies the above-mentioned condition (C2), or equivalently, the configuration that allows the region in which the parallax image for one of the eyes to include the range in which the parallax image for the other eye is not observed. With reference to FIG. 14, the following describes the light angular distribution of the excess light that has been emitted from the sub pixel 411b for displaying the left image and has not been blocked by an integrated light-blocking portion 400. The integrated light-blocking portion 400 is the light-blocking portion that is formed in the parallax-barrier shutter panel 21 and provided by the sub apertures 210 in the light-blocking state. The breadth of the integrated light-blocking portion 400 (hereinafter referred to as an "integrated light-blocking portion width") is denoted by SBW.

For convenience in illustration, the design observation distance D in FIG. 14 is substantially identical to the pixel-barrier distance L as in FIG. 11. In actuality, the design observation distance D is 100 to 1000 times greater than the pixel-barrier distance L. For the brevity of description, it is assumed that the light radiated from the sub pixel 411a is uniform regardless of the position and the radiation angle and is not refracted on the surface of the parallax-barrier shutter panel 21. On this assumption, as in FIG. 11, the apparent angle of the individual line indicating the path of the light in the drawing has no significance in terms of the luminance of the sub pixel 411a. Alternatively, the relative positional relation among the sub pixel 411a the integrated aperture 300, and the integrated light-blocking portion 400 associated with the individual line is significant.

Based on the above-mentioned premise, the following describes the luminance distribution of the excess light radiated from the sub pixel 411*b* for displaying the left image, the luminance distribution being provided on the virtual screen 100.

A ray LB1 and a ray LB2 radiated from one point at the right end of the sub pixel 411*b* shown in FIG. 14 and indicated by the broken lines are blocked by the integrated light-blocking portion 400, and accordingly the light does not reach the space between a position P15 and a position P16 on the virtual screen 100. Similarly, a ray LB3 and a ray LB4 radiated from one point at the left end of the sub pixel 411*b* and indicated by the broken lines are blocked by the integrated light-blocking portion 400, and accordingly, the light does not reach the space between a position P17 and a position P18 on the virtual screen 100. Thus, the excessive light emitted from the sub pixel 411*b* provides a luminance distribution LBP formed on the virtual screen 100 as shown in FIG. 14.

As the necessary condition to satisfy the above-mentioned condition (C2), the following describes the condition for providing a complete light-blocking angular range in which no parallax image is observed. To satisfy the condition, the position P17 needs to be located on the left of the position P16. To satisfy the condition in relation to the given design observation distance D, a radiation angle θ3 of the ray LB2 needs to be equal to or greater than a radiation angle θ4 of the ray LB3. That is, the integrated light-blocking portion width SBW needs to be equal to or greater than the sub-pixel width GW. The complete light-blocking angular range expands as the width difference |SBW−GW| increases.

Next, as the necessary condition to satisfy the above-mentioned condition (C2), the following describes the condition for including, within the complete light-blocking angular range, the light emitted from the sub pixel 411*a* for displaying the right image. To satisfy this condition, the integrated light-blocking portion width SBW needs to be equal to or greater than the integrated aperture width SW. To prevent the positional deviation for the case where the integrated light-blocking portion width SBW is equal to the integrated aperture width SW (SBW=SW), the central deviation of the sub pixel 411*a* needs to be equal to the deviation of the center of the integrated aperture 300 and the center of the integrated light-blocking portion 400, in other words, half the reference parallax-barrier pitch P. This means that the light-blocking wall widths BW on the right and the left of the sub pixel 411*a* and the sub pixel 411*b* need to be equal.

In a case where the integrated light-blocking portion width SBW and the integrated aperture width SW are each half the reference parallax-barrier pitch P and are therefore equal to each other and the light-blocking wall width BW of the display panel 11 is uniform, the complete light-blocking angular range of one of the sub pixels 411*a* and 411*b* overlaps the luminance leveled region of the other one of the sub pixels 411*a* and 411*b*.

FIG. 13 described above indicates the results obtained by measuring the angular widths of the luminance leveled region and the complete light-blocking region on various conditions. The reference parallax-barrier pitch P of the parallax-barrier shutter panel 21 is set at 0.100 mm on all of the conditions 1 to 6.

On conditions 1 to 3, the integrated aperture width SW of the parallax-barrier shutter panel 21 is set to be greater than the sub-pixel width GW. The integrated aperture width SW is kept constant at 0.050 mm, which is half the reference parallax-barrier pitch P. The sub-pixel width GW is set at 0.030 mm, 0.035 mm, and 0.040 mm for the conditions 1, 2, and 3, respectively. In this case, the width difference |SW−GW| decreases in the stated order of the conditions 1, 2, and 3, and accordingly, the angular width of the luminance leveled region is narrowed in the stated order as described above.

FIG. 13 also indicates the relative peak luminance. In general, the average luminance corresponding to the relative peak luminance is obtained by multiplying the luminance of the sub pixel 411 of the display panel 11 by the ratio (GW/P) of the sub-pixel width GW to the reference parallax-barrier pitch P or the ratio (SW/P) of the integrated aperture width SW to the reference parallax-barrier pitch P, whichever is smaller. FIG. 13 also indicates these ratios. On the conditions 1 to 3, GW/P is smaller than SW/P. Instead of SW/P, GW/P therefore corresponds to the relative peak luminance.

On the conditions 1 to 3, the integrated light-blocking portion width SBW (=P−SW) stands at 0.050 mm. As in the description of the condition (C2), the complete light-blocking angular range (the complete light-blocking angular width) corresponds to the width difference |SBW−GW|.

Next, the following describes the conditions 4 to 6. Contrary to the sub-pixel width GW on conditions 1 to 3, the sub-pixel width GW on the conditions 4 to 6 is set to be greater than the integrated aperture width SW of the parallax-barrier shutter panel 21. The width difference |SW−GW| is set at 0.02 mm without exception. The sub-pixel width GW is set at 0.040 mm, 0.045 mm, and 0.050 mm on the conditions 4, 5, and 6, respectively. The integrated aperture width SW is set at 0.020 mm, 0.025 mm, and 0.030 on the conditions 4, 5, and 6, respectively. In this case, the width difference |SW−GW| is constant on the conditions 4, 5, and 6, and accordingly, the angular width of the luminance leveled region is also constant.

In relation to the relative peak luminance on the conditions 4 to 6, SW/P is smaller than GW/P. Instead of the ratio GW/P, the ratio SW/P therefore corresponds to the relative peak luminance. The integrated light-blocking portion width SBW (=P−SW) stands at 0.080 mm, 0.075 mm, and 0.070 mm on the conditions 4, 5, and 6, respectively. As in the description of the condition (C2), the complete light-blocking angular range (the complete light-blocking angular width) corresponds to the width difference |SBW−GW|. The complete light-blocking angular width standing at 4 degrees, 3 degrees, and 2 degrees on the conditions 4, 5, and 6 is equal to or greater than 2 degrees being the maximum value of the complete light-blocking angular width on the conditions 1 to 3.

When comparisons are made between the condition 1 and the condition 6, one of the conditions is obtained by transposing the value of the sub-pixel width GW and the value of the integrated aperture width SW on the other condition. Meanwhile, the angular width of the luminance leveled region, the relative peak luminance, and the complete light-blocking angular width on one of the conditions are equal to those on the other condition. Although not shown, on the condition obtained by transposing the value of the sub-pixel width GW and the value of the integrated aperture width SW on, for example, the condition 2, the angular width of the luminance leveled region, the relative peak luminance, and the complete light-blocking angular width that are equal to those on the condition 2 can be provided.

In summary, one of GW/P and SW/P that is greater than the other is preferably set at 40 to 50% in order to achieve higher luminance. If the other one (one of GW/P and SW/P that is smaller) is increased excessively, |GW−SW| would be reduced, and accordingly the angle of the luminance leveled region is narrowed. Conversely, if the other one is reduced excessively, the relative peak luminance would decrease.

Thus, the value is preferably set in an appropriate manner with consideration given to the above.

Due to the presence of the light-blocking walls 18 in the actual liquid crystal display, the sub-pixel width GW is smaller than a half of the reference parallax-barrier pitch P. Thus, for such liquid crystal display, the integrated aperture width SW of the parallax-barrier shutter panel 21 is preferably set to be greater than the sub-pixel width GW, so that the integrated aperture width SW and the sub-pixel width GW can be further increased.

<Condition (C3)>

Figure 15:
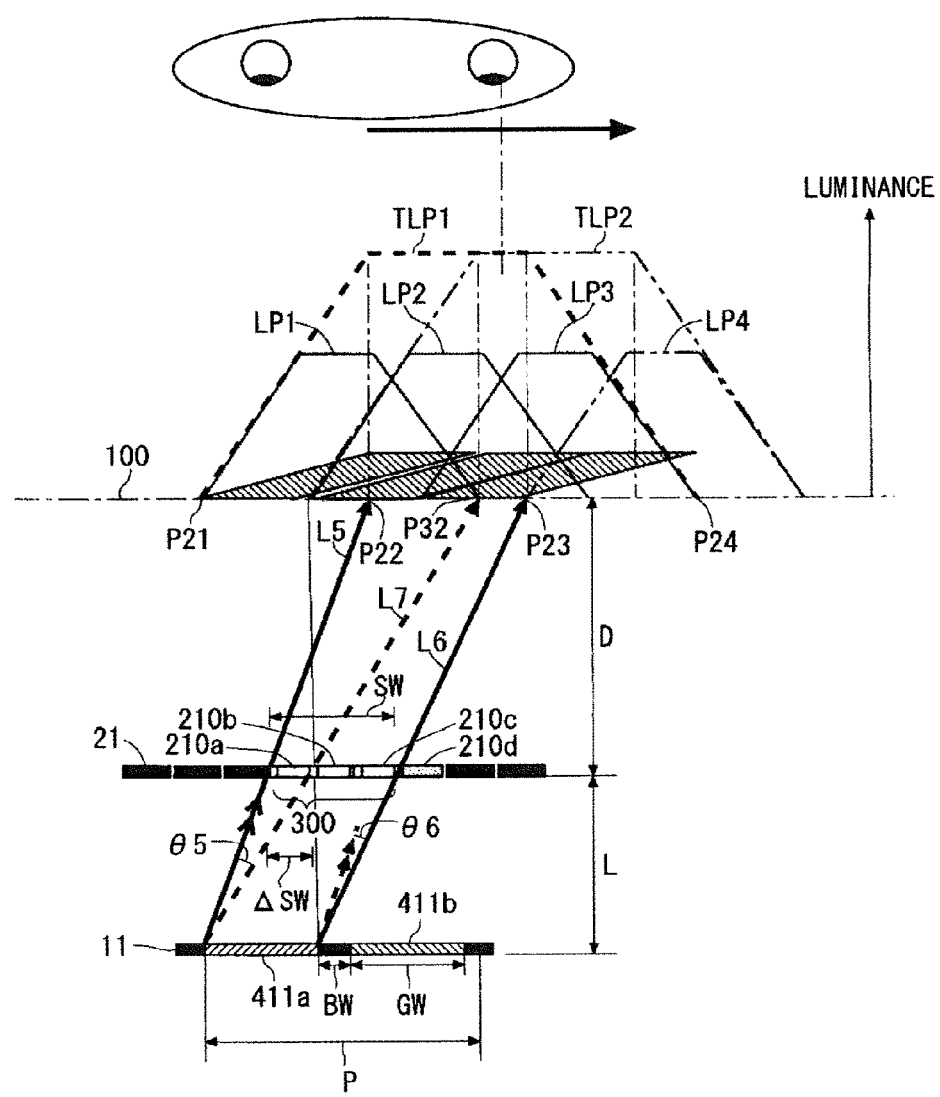
FIG. 15 A view describing the configuration of the display apparatus according to the underlying technique.

Next, the following describes the configuration for satisfying the above-mentioned condition (C3), or equivalently, the configuration in which the luminance can be leveled (constant) on the movement path of the observer even if the sub apertures 210 are switched between the light-transmitting state and the light-blocking state in accordance with the movement of the integrated apertures 300. With reference to FIG. 15, the following describes changes in the light angular distribution of the light emitted from the sub pixel 411a for displaying the right image, the changes being made in accordance with the movement of the integrated aperture 300.

Assume that the premise same as that of FIGS. 11 and 14 is applied to FIG. 15. In consideration of the results associated with the condition (C1), the integrated aperture width SW is set to be greater than the sub-pixel width GW such that the region on the virtual screen 100 in which the luminance is constant is expanded, or equivalently, the leveled portion of the light angular distribution is expanded.

Based on the above-mentioned premise, the following describes the luminance distribution of the light radiated from the sub pixel 411a for displaying the right image, the luminance distribution being provided on the virtual screen 100.

With reference to FIG. 15, the integrated aperture 300 is formed of three sub apertures being sub apertures 210a, 210b, and 210c. The ray radiated from the sub pixel 411a passes through a sub aperture 210a and forms a luminance distribution LP1 on the virtual screen 100. Similarly, the rays radiated from the sub pixel 411a pass through the sub apertures 210b and 210c and form a luminance distribution LP2 and a luminance distribution LP3 on the virtual screen 100. The luminance distributions LP1, LP2, and LP3 are added together, and accordingly, provide an integrated luminance distribution TLP1, which is the actual luminance distribution formed over the virtual screen 100.

A position P22 on the virtual screen 100 corresponding to the left end of the leveled portion of the integrated luminance distribution TLP1 is defined by a ray L5 that is radiated form one point at the left end of the sub pixel 411a and is passing through the left end of the sub aperture 210a being one of the sub apertures. A position P23 on the virtual screen 100 corresponding to the right end of the leveled portion is defined by a ray L6 that is radiated from one point at the right end of the sub pixel 411a and is passing through the right end of the sub aperture 210a.

Next, the following describes the state in which the sub aperture 210a is transformed into the light-blocking state and the sub pixel 210d is transformed into the light-transmitting state, and accordingly, the integrated aperture 300 is formed of three sub apertures being the sub apertures 210b, 210c, and 210d. In other words, the following describes the state in which the integrated aperture 300 in the above-mentioned state is moved rightward at the sub-aperture pitch ΔSW. In this case, the luminance distribution LP1 is not formed. Alternatively, the ray from the sub pixel 411a passes through the sub aperture 210, forming the luminance distribution LP4. The luminance distributions LP2, LP3, and LP4 are added together, and accordingly, provide an integrated luminance distribution TLP2, which is the luminance distribution formed on the virtual screen 100 by the light that has passed through the integrated aperture 300.

A position P32 on the virtual screen 100 corresponding to the left end of the leveled portion of the integrated luminance distribution TLP2 is defined by a ray L7 that is radiated from one point at the left end of the sub pixel 411a and is passing through the left end of the sub pixel 210b. If the position P32 is located on the right of the position P23, a valley would be formed between the leveled portion of the integrated luminance distribution TLP1 and the leveled portion of the integrated luminance distribution TLP2, failing to satisfy the condition (C3).

To satisfy the condition (C3), the position P32 needs to be located on the left of the position P23. Assume that an angle θ5 between the ray L5 and the ray L7 is greater than an angle θ6 between the ray L5 and the ray L6 (as illustrated in FIG. 15). If the design observation distance D is increased, the ray L7 and the ray L6 cross each other, and accordingly, the position P32 is located on the right of the position P23. In particular, with consideration given to that fact that the design distance D is shortened for convenience in illustration in FIG. 15, the above-mentioned phenomenon is likely to occur.

To satisfy the condition (C3) in relation to the given design observation distance D, the angle θ5 between the ray L5 and the ray L7 needs to be equal to or smaller than the angle θ6 between the ray L5 and the ray L6 instead of being in the state illustrated in FIG. 15. If the angle θ5 is approximated by the sub-aperture pitch ΔSW, the angle θ6 can be approximated by the difference between the integrated aperture width SW and the sub-pixel width GW. Thus, the sub-aperture pitch ΔSW needs to be equal to or smaller than the difference between the integrated aperture width SW and the sub pixel width GW.

In a case where the observer moves in the direction (the right direction) indicated by the arrow in FIG. 15, the detector 31 detects the position (movement) of the observer. Then, in a case where the left eye of the observer is located between the position P32 and the position P23, the controller 32 controls, on the basis of the detection results, the sub aperture 210a of the parallax-barrier shutter panel 21 to enter the light-blocking state and controls the sub aperture 210d to enter the light-transmitting state. The display apparatus is configured as described above, and thus, the observer can continue to visually recognize the stereoscopic image without being aware of changes in the luminance of the image even if he or she is moving.

Next, the above description is further described in detail with reference to FIGS. 16 to 19. FIGS. 16 to 19 indicate the calculation results regarding changes in the light angular distribution associated with the switching operation performed on the sub apertures 210. The conditions set for the calculations in FIGS. 16 to 18 are substantially identical to the condition 1 in FIG. 13. The reference parallax-barrier pitch P of the parallax-barrier shutter panel 21 is set at 0.100 mm. The pixel-barrier distance L is set at 1.000 mm. The integrated aperture width SW is set at 0.050, which is half the reference parallax-barrier pitch P. The sub-pixel width GW is set at 0.030 mm. The width difference |GW−SW| is set at 0.020 mm.

FIGS. 16, 17, and 18 indicate the calculation results obtained on the condition 1 in which the sub-aperture pitch ΔSW is set at 1/N (N is an even number equal to or greater than 4) of the reference parallax-barrier pitch P, 1/N specifically being ¼ (N=4), ⅙ (N=6), and ⅛ (N=8). The integrated aperture width SW stands at 0.050 mm, which is half the reference parallax-barrier pitch P, and thus, the integrated aperture 300 is formed of N/2 sub apertures 210.

On the condition (hereinafter referred to as "condition 1-1") that N is equal to 4 in FIG. 16, the sub-aperture pitch ΔSW stands at 0.025 mm (=P/N), which is greater than the width difference |GW−SW|=0.020 mm, failing to satisfy the condition (C3). On the condition (hereinafter referred to as "condition 1-2") that N is equal to 6 in FIG. 17, the sub-aperture pitch ΔSW stands at around 0.017 mm (=P/N), which is smaller than the width difference |GW−SW|=0.020 mm, thus successfully satisfying the condition (C3). On the condition (hereinafter referred to as "condition 1-3") that N is equal to 8 in FIG. 18, the sub-aperture pitch ΔSW stands at around 0.0125 mm (=P/N), which is smaller than the width difference |GW−SW|=0.020 mm, thus successfully satisfying the condition (C3).

With reference to each of FIGS. 16 to 18, the solid lines indicate the luminance distributions associated with the rays that have passed through the individual sub apertures 210 and the broken lines indicate the integrated luminance distributions that are obtained by overlapping the above-mentioned luminance distributions and include leveled portions. With reference to each of FIGS. 16 to 18, the alternate long and two short dashes line indicates, for example, the integrated luminance distribution associated with the light that has passed through the integrated aperture 300 for the case where the integrated aperture 300 has been moved rightward at the sub-aperture pitch ΔSW.

With reference to each of the drawings, the alternate long and short dash lines indicate the switching points for the position of the eye of the hypothetical observer. Assume that the controller 32 controls, in a case where the detector 31 detects that the observer's eye has moved rightward and crossed the switching point, the integrated luminance distribution to move rightward without changing its shape. Based on the above-mentioned premise, the following describes the calculation results obtained on the conditions 1-1 to 1-3.

As illustrated in FIG. 16, on the condition 1-1, in which the condition (C3) is not satisfied, there are slopes between the leveled portion of the integrated distribution obtained before the switching and the leveled portion of the integrated distribution obtained after the switching. Thus, the observer notices changes in luminance even if there is no time lag between the crossing of the switching point by the observer's eye and the completion of the switching performed on the sub apertures 210. If the time lag is extended, the observer would notice a greater luminance change ΔL1.

As illustrated in FIG. 17, on the condition 1-2, in which the condition (C3) is satisfied, meanwhile, the leveled portions of the integrated luminance distributions in the vicinity of the switching points overlap each other with no slopes located therebetween. Thus, if there is no time lag between the crossing of the switching point by the observer's eye and the completion of the switching performed on the sub apertures 210, the observer does not notice changes in luminance. Even if the time lag is extended to some degree, the observer would notice only a relatively small luminance change ΔL2.

Similarly, on the conditions 1-3, in which the condition (C3) is satisfied, the observer does not notice changes in luminance as in the case on the condition 1-2 if there is no time lag associated with the switching that has been performed on the sub apertures 210 to move the integrated aperture 300. Even if the time lag is extended to some degree, the observer would notice only a relatively small luminance change ΔL3. The luminance change ΔL3 on the condition 1-3 is smaller than the luminance change ΔL2 on the condition 1-2. Thus, the sub-aperture pitch ΔSW is preferably minimized to eliminate or reduce changes in luminance as much as possible.

FIG. 19 summarizes the calculation results mentioned above. With reference to the drawing, "x" indicates that the leveled portion of the integrated luminance distribution before the switching and the leveled portion of the integrated luminance distribution after the switching are apart from each other, "○" indicates that there is a narrow overlap between the relevant leveled portions, and a double circle indicates that there is a wide overlap between the relevant leveled portions.

FIG. 19 also indicates the calculation results obtained on the condition 3 in FIG. 13 in which the sub-aperture pitch ΔSW is set at ⅙ (N=6) ⅛ (N=8), and 1/10 (N=10) of the reference parallax-barrier pitch P. On the condition 3-1 (N=6), the sub-aperture pitch ΔSW stands at around 0.017 mm (−P/N), which is greater than the width difference |GW−SW|=0.010 mm, thus providing no overlap between the leveled portions. On the condition 3-2 (N=8), the sub aperture pitch ΔSW stands at 0.0125 mm (=P/N), which is greater than the width difference |GW−SW|=0.010 mm, thus providing no overlap between the leveled portions. On the condition 3-3 (N=10) in FIG. 17, meanwhile, the sub-aperture pitch ΔSW stands at 0.010 mm (=P/N), which is equal to the width difference |GW−SW|=0.010 mm, thus providing overlaps between the leveled portions.

The above description suggests that the sub-aperture pitch ΔSW needs to be reduced in order to satisfy the condition (C3). If the first transparent electrode 23 is divided into sections each having a section width of about 1 μm or below with the capability of the present manufacturing technique, the cost associated with the facility for use in the manufacturing process would increase and insulation fault would occur at a higher frequency. Thus, the sub-aperture pitch ΔSW is desirably equal to or greater than 4 μm.

Assume that the display apparatus is used in a realistic situation. As for the naked-eye stereoscopic image display apparatus in greater need for control over the field of stereoscopic vision in accordance with the observation point for the observer, one observer views a stationary display and the sub-pixel width GW of the medium-sized display that measures 10 to 20 inches diagonally stands at 0.040 to 0.100 mm. If this is the case, the parallax-barrier pitch P stands at 0.080 mm to 0.200 mm.

In a case where the sub-aperture pitch ΔSW is set at 4 μm and the reference parallax-barrier pitch P is set at 0.080 to 0.200 mm as mentioned above, the sub-aperture pitch ΔSW is equivalent to 2% to 5% of the reference parallax-barrier pitch P. Thus, a realistic division number N for achieving the desired sub-aperture pitch ΔSW stands at around 20 to 50 at maximum depending on the value of the reference parallax-barrier pitch P ranging from 0.080 to 0.200 mm.

The sum of the widths of the boundary portions located between the first transparent electrodes 23 of the parallax-barrier shutter panel 21 increases as the division number N increases. The boundary portions cannot apply an electric field to the liquid crystal layer 23. If the boundary portions are designed to be capable of transmitting light, the 3D crosstalk would be exacerbated due to leakage of light. Conversely, if the boundary portions are designed to be capable of blocking light through the use of light absorber, the light transmittance would be reduced.

FIG. 20 indicates the relation of the integrated relative peak luminance (the ratio of the integrated relative peak luminance to the luminance of the pixel light-emitting portion) associated with the division number N. Assume that the boundary portions are formed of the light absorber and the transmittance decreases as the relevant boundary portions (hereinafter referred to as "boundary light-blocking portions") increase.

The section width is set at 1 μm. The width of the boundary light-blocking portion is set at around twice the section width (or is set at 2 μm). The reference parallax-barrier pitch P is kept constant at 0.100 mm and the integrated aperture width SW is kept constant at 0.050 mm (50%). Thus, the difference between the sub-pixel width GW and the integrated aperture width SW is equal to the sub-aperture pitch ΔSW, or equivalently, SW−GW=ΔSW.

As indicated for the cases on the conditions 7-1 to 7-7, the sub-aperture pitch Δ SW decreases as the division number N increases. Given that GW=SW−ΔSW and the integrated aperture width SW is constant, the sub-pixel width GW increases as the division number N increases. The relative peak luminance (the fourth row from the top of the drawing) increases accordingly. As a result, on the conditions 7-1 to 7-4, the integrated relative peak luminance increases as the division number N increases. Meanwhile, the area ratio of the boundary light-blocking portion increases as the division number N increases. Once the division number N is increased to some extent, the decline in the integrated relative peak luminance associated with the increase in the area ratio of the boundary light-blocking portion becomes more noticeable than the increase in the integrated relative peak luminance associated with the increase in the relative peak luminance. Consequently, as indicated for the cases on the conditions 7-4 and 7-7, the integrated relative peak luminance decreases as the division number N increases.

The results indicate that the integrated relative peak luminance is maximized with the division number N=10 and the integrated relative peak luminance exceeds 30% with the division number N=6 to 18. In a case where the reference parallax-barrier pitch P is smaller than 0.100 mm and the width of the boundary light-blocking portion is greater than 2 μm, the division number N obtained at the maximum relative peak luminance is reduced. Conversely, in a case where the reference parallax-barrier pitch P is greater than 0.100 mm and the width of the boundary light-blocking portion is smaller than 2 μm, the division number N obtained at the maximum integrated peak luminance is increased.

SUMMARY

As for the display apparatus described above, the pitch of the sub aperture 210 of the parallax-barrier shutter panel 21 is equal to or smaller than the difference between the breadth of the sub pixel 411 of the display panel 11 and the breadth of the integrated aperture 300 of the parallax-barrier shutter panel 21. This successfully eliminates or reduces valleys that appear between the leveled portion of the luminance distribution before the switching and the leveled portion of the luminance distribution after the switching, and accordingly, prevents the luminance changes of the image that are noticeable to the moving observer, thus eliminating or reducing flickers.

As described above, the ratio (GW/P) of the sub-pixel width GW to the reference parallax-barrier pitch P or the ratio (SW/P) of the integrated aperture width SW to the reference parallax-barrier pitch P, whichever is greater, is desirably set at 40 to 50%. It is appropriate that the sub-aperture pitch ΔSW is obtained by dividing the reference parallax-barrier pitch P into 6 to 18. It is therefore appropriate that the sub-aperture pitch ΔSW is equivalent to about 10% to 25% of the reference parallax-barrier pitch P. In other words, it is appropriate that one of the ratio (GW/P) and the ratio (SW/P) that is smaller than the other is set at the value obtained by reducing the value of the other ratio that is greater by 10% to 25%. The smaller ratio is desirably set at the value obtained by reducing the grater ratio by 10% to 20% in order to prevent the reduction of transmittance by one-half.

The above setting can increase the efficiency in the use of light and prevent the luminance changes of the image associated with the shifting of the integrated aperture 300 through the switching of the light-blocking state and the light-transmitting state performed on the sub aperture 210 located at the end of the integrated aperture in accordance with the position of the observer, whereby flickers become unnoticeable to the observer.

As mentioned above, the detector 31 shown in FIG. 1 detects the position (movement) of the observer.

The controller 32 changes, on the basis of the detection results obtained by the detector 31, the sub apertures 210 to be transformed into the light transmitting state, to thereby control the positions of the integrated apertures 300 in the parallax-barrier shutter panel 21 in the lateral direction. As for this display apparatus, in a case where the position of the observer moves in the horizontal direction, the integrated apertures 300 can be moved in the lateral direction in accordance with the position of the observer. Thus, the observer can view the stereoscopic image while he or she is moving. In some cases, the detector 31 fails to detect the position of the observer because, for example, the observer moves to a position inclined steeply from the front of the display apparatus. In this case, all of the sub apertures 210 of the parallax-barrier shutter panel 21 are transformed into the light-transmitting state, and at the same time, the same image data is displayed on the sub pixels 411a and the sub pixels 411b of the display panel 11, so that a two-dimensional image appears. This configuration allows reliable displaying of image in the event of a malfunction of the detector 31.

At this time, one piece of two-dimensional image data may be displayed through all of the sub pixels 411a and the sub pixels 411b of the display panel 11. In this case, a normal two-dimensional image can be reliably displayed in the event of a malfunction of the detector 31.

First Embodiment

The following describes a naked-eye stereoscopic image display apparatus according to a first embodiment of the present invention.

The naked-eye stereoscopic image display apparatus according to the description of the underlying technique includes a relatively large number of the first transparent electrodes 23 extending in the vertical direction of the parallax-barrier shutter panel 21, the number being N/2 times as large as the number of wires extending in the vertical direction of the display panel 11. This configuration makes it difficult to employ the segment driving method in the parallax-barrier shutter panel 21. This configuration requires a larger number of points of junction with the flexible board circuit provided to apply a voltage from the outside, and thus, narrows the pitch of the junction portions, complicating the mounting work in some degree. This configuration also requires a larger number of driving ICs, resulting in an increase in component cost. If the observation distance is different from the design observation distance D, flickers would be noticeable due to the local luminance changes visually recognized as emission lines and dark lines.

The naked-eye stereoscopic image display apparatus according to the first embodiment of the present invention is capable of solving the above-mentioned problems. In the following description of the naked-eye stereoscopic image display apparatus according to the present embodiment, the constituent components identical or similar to those in the description of the underlying technique are denoted by the same reference signs and the distinctive features are mainly described.

Figure 21:
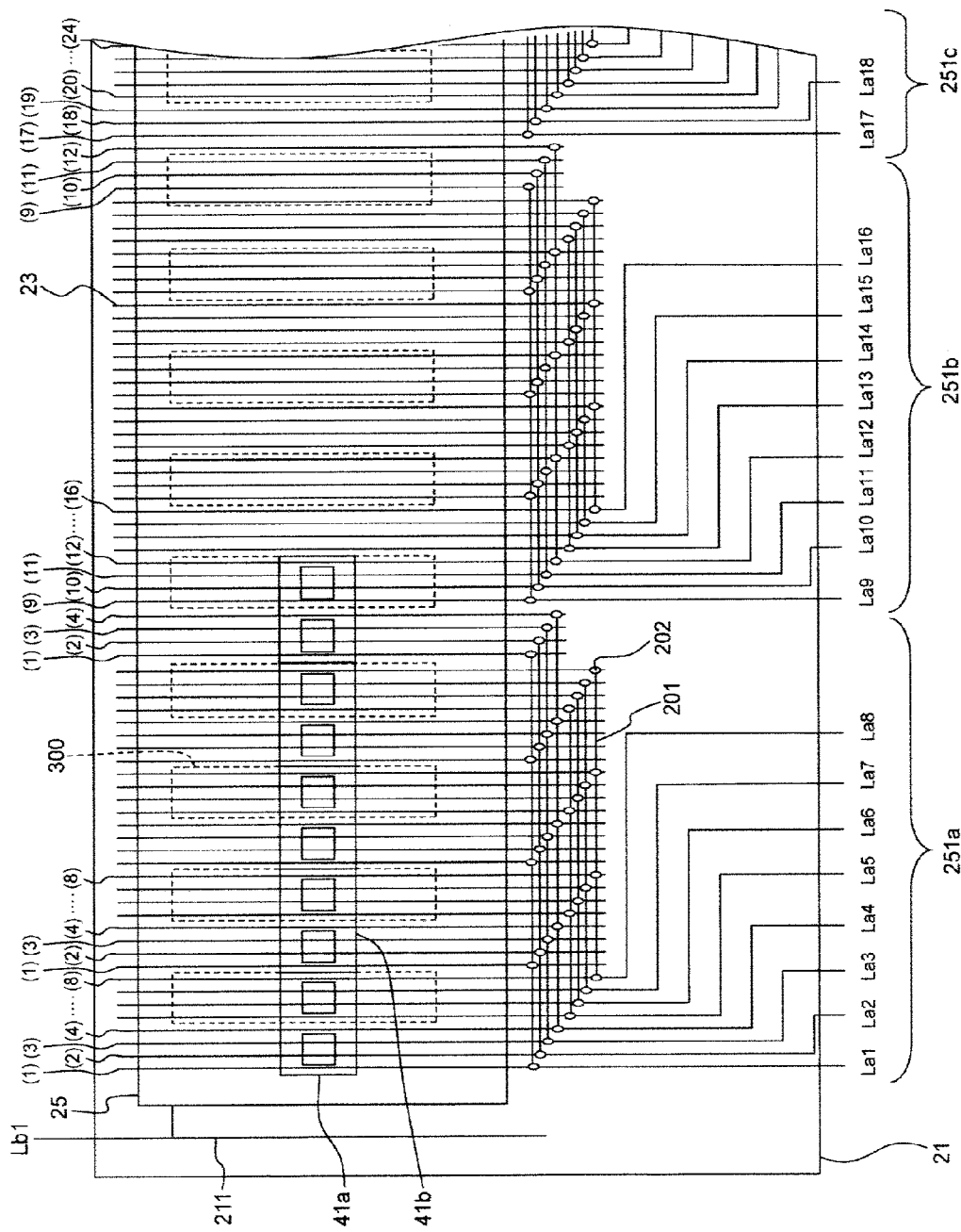
FIG. 21 A plan view illustrating a configuration of a display apparatus according to a first embodiment.

FIG. 21 is a plan connection diagram illustrating the configuration of the parallax-barrier shutter panel 21 of the naked-eye stereoscopic image display apparatus according to the present embodiment, the display apparatus being flipped 90 degrees. In the present embodiment, a first common driving area 251a and a second common driving area 251b are provided, these areas being obtained by dividing the display area of the parallax-barrier shutter panel 21 in the lateral direction (the superior-inferior direction in FIG. 21). Among a third common driving area 251c and a plurality of common driving areas 251, which are similarly provided on the right of the second common driving area 251b, only part of the second third common driving area 251c is illustrated in the drawing.

A first sub-pixel pair 41a and a second sub-pixel pair 41b located adjacent to each other in the lateral direction (the superior-inferior direction in FIG. 21) belong to one of the common driving areas 251. Although only five sub-pixel pairs 41 are shown in FIG. 21 for convenience in illustration, the sub-pixel pairs 41 are provided in the remaining regions in the same manner and thus the illustration thereof is omitted.

The first transparent electrodes 23 extend in the vertical direction (the horizontal direction in FIG. 21). The plurality of first transparent electrodes 23 are divided by an even-numbered N (N=8) in the reference parallax-barrier pitch P corresponding to the individual sub-pixel pair 41. That is, an even-numbered N (N=8 in this example) first transparent electrodes 23 are arranged in the lateral direction correspondently to the individual sub-pixel pair 41. The number of wires that form the integrated apertures 300 is N/2 (four in this example).

In the present embodiment, within one of the common driving areas 251, an even-numbered N (N=8) first transparent electrodes 23 for the first sub-pixel pair 41a are electrically connected with the corresponding ones of an even-numbered N (N=8) first transparent electrodes 23 for the second sub-pixel pair 41b correspondently to the positions of the sub apertures 210.

For example, through a common wire 201 and contact holes 202, the first transparent electrode 23 denoted by the number (1) for the first sub-pixel pair 41a is electrically connected with the first transparent electrode 23 that is the N-th (N=8) from the number (1) for the first sub-pixel pair 41a and that is denoted by the same number (1) for the second sub-pixel pair 41b. Similarly, through the common wires 201 and the contact holes 202, the first transparent electrodes 23 denoted by (2) to (N) (N=8 in this example) for the first sub-pixel pair 41a are electrically connected with the first transparent electrodes 23 (the first transparent electrodes 23 provided correspondently to the positions of the sub apertures 210) that are the N-th from the corresponding ones of the first transparent electrodes 23 and that are denoted by the same numbers (2) to (N) (N=8 in this example) for the second sub-pixel pair 41b. M (M being a positive integer, M=4 in this example) first transparent electrodes 23 (the first transparent electrodes 23 provided correspondently to the sub apertures 210) that are denoted by the same numbers in the sub-pixel pair 41 are electrically connected with one another through the common wire 201 and the contact holes 202. That is, in the first common driving area 251a, M first transparent electrodes 23 are connected with every N-th one of the first transparent electrodes 23 through the common wire 201 and the contact holes 202. The expression "the first transparent electrodes 23 are electrically connected with every N-th one of the first transparent electrodes" means that the first of the first transparent electrodes 23, the (N+1)th of the first transparent electrodes 23, the (N·2+1)th of the first transparent electrodes 23, the (N·3+1)th of the first transparent electrodes 23, ..., and (N·M+1)th of the first transparent electrodes 23 are electrically connected with one another. That is, the first transparent electrodes 23 are electrically connected with one another at intervals of N in such a manner that the first transparent electrodes 23 in electrical connection sandwich (N−1) first transparent electrodes 23 that are not in electrical connection.

On the right end of the first common driving area 251a, (N/2) first transparent electrodes 23 (four first transparent electrodes 23 in this example) denoted by the numbers (1) to (4) are additionally provided. Similarly, these four first transparent electrodes 23 are electrically connected with the corresponding ones of the first transparent electrodes 23 denoted by the same numbers through the common wires 201 and the contact holes 202. The relation remains the same in which the first transparent electrodes 23 are electrically connected with every N-th one of the first transparent electrodes 23 (at intervals of N, with (N−1) first transparent electrodes 23 being sandwiched in between) through the common wires 201 and the contract holes 202.

Eight common wires 201 connected with the first transparent electrodes 23 denoted by the numbers (1) to (8) are connected with the corresponding ones of eight terminals La1 to La8. The number of the first transparent electrodes 23 electrically connected with one another through the common wires 201 and the contact holes 202 is equal to (M+1) for the first transparent electrodes 23 denoted by the numbers (1) to (4) and is equal to M for the first transparent electrodes 23 denoted by the numbers (5) to (8). M is equal to N/2 (four in this example).

Similarly, in the second common driving area 251b, the first transparent electrodes 23 denoted by the numbers (9) to (16) are located next to the first transparent electrodes 23 denoted by the numbers (9) to (16). This arrangement is repeated M times. On the right end of the second common driving area 251b, (N/2) first transparent electrodes 23 (four first transparent electrodes 23 in this example) denoted by the numbers (9) to (12) are additionally provided. Similarly, these four first transparent electrodes 23 are electrically connected with the corresponding ones of the first transparent electrodes 23 denoted by the same numbers through the common wires 201 and the contact holes 202. The relation remains the same in which the first transparent electrodes 23 are electrically connected with every N-th one of the first transparent electrodes 23 (at intervals of N, with (N−1) first transparent electrodes 23 being sandwiched in between) through the common wires 201 and the contact holes 202. The eight common wires 201 connected with the first transparent electrodes 23 denoted by the numbers (9) to (16) are connected with the corresponding ones of eight terminals La9 to La16. Similarly, in the third common driving area 251c, the eight common wires 201 connected with the first transparent electrodes 23 denoted by the numbers (17) to (24) are connected with the corresponding ones of eight terminals La17 to La24.

In this display apparatus, a voltage is selectively applied to the terminals La1 to La8, so that the same voltage can be evenly applied to the first transparent electrodes 23 denoted by the same number in the first common driving area 251a and a different voltage can be applied to the first transparent electrodes 23 denoted by a different number. The same holds true for the other common driving areas 251.

The following describes the second transparent electrode 25. As illustrated in FIG. 21, the second transparent electrode 25 is a sheet of common electrode extending in the lateral direction and the vertical direction and is connected with a common wire 211 connected with a terminal Lb1.

The terminals La1 to La8 and the terminal Lb1 are joined with the flexible board circuit and the driving IC in the periphery outside the display region of the parallax-barrier shutter panel 21 and are provided with a voltage from the outside through the flexible board circuit and the driving IC. Such display apparatus eliminates the need for providing each of the transparent electrodes 23 with the terminal for controlling the sub apertures 210. For example, thirty-six terminals for the first transparent electrodes 23 have been typically necessary to drive the individual sub apertures 210 in one of the common driving areas 251 illustrated in FIG. 21. In the present embodiment, only eight terminals (the terminals La1 to La8) for the first transparent electrodes 23 are required. These terminals are smaller in number than nine sub-pixel transparent electrodes 12 of the display panel 11 in the corresponding breadth. This allows the use of the IC having the same terminal pitch as that of the IC for driving the display panel 11. The number of terminals can be further reduced by increasing the number M of the first transparent electrodes 23 electrically connected to one another through one common wire 201 and the contact holes 202.

As mentioned above, in the display apparatus according to the present embodiment, the transparent electrodes 23 for the first sub-pixel pair 41a are electrically connected with the first transparent electrodes 23 for the second sub-pixel pair 41b. Thus, the number of the first transparent electrodes 23 can be reduced, which facilitates the mounting work. The size of the substrate including the first transparent electrodes 23 can be also reduced. Moreover, the number of the driving ICs can be reduced, which can regulate the component cost.

The following describes the operation of the display apparatus having the above-mentioned configuration according to the present embodiment.

Figure 22:
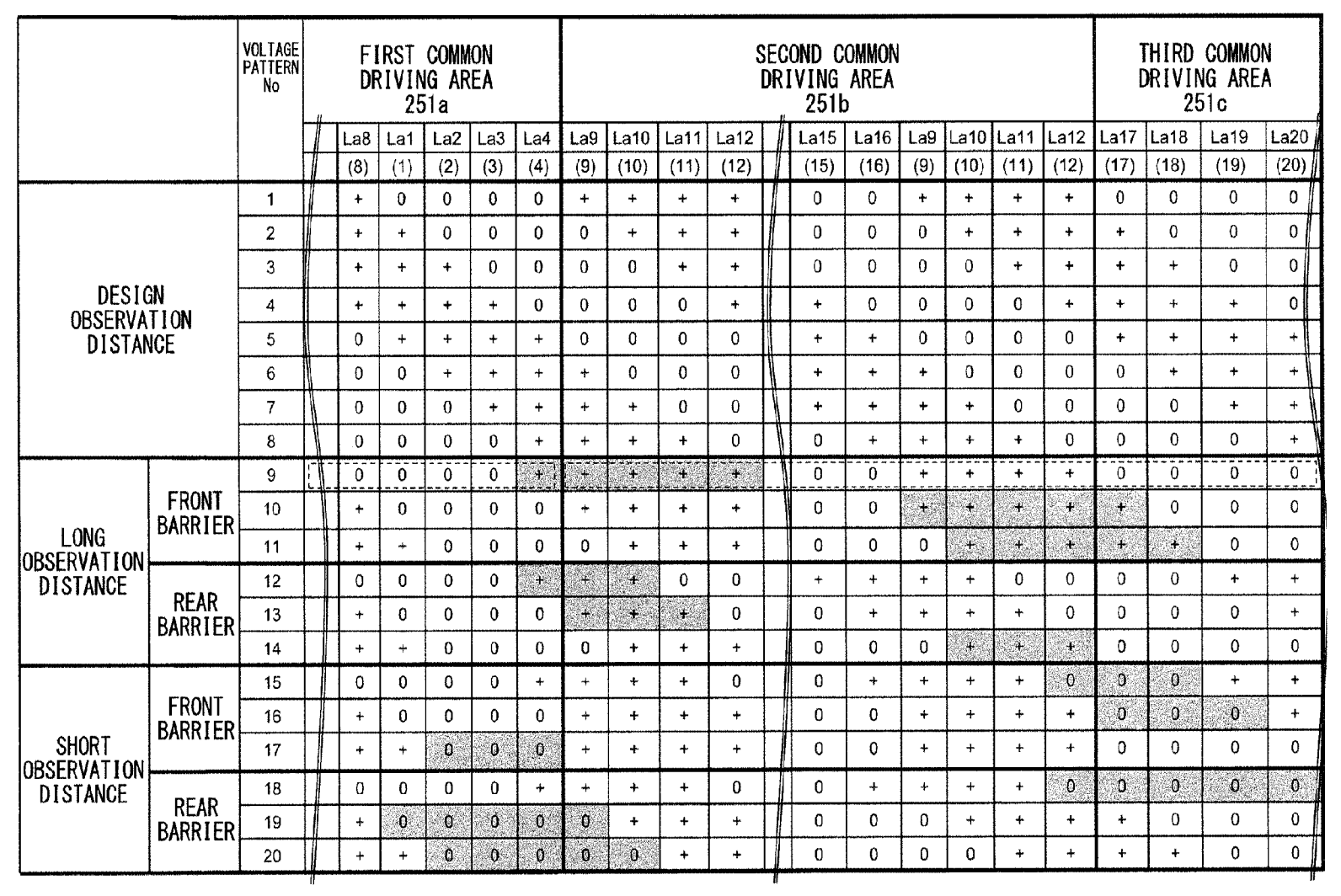

FIG. 22 shows the pattern of the voltage applied to the first transparent electrodes 23 denoted by the numbers (1) to (20) in the first to third common driving areas 251a to 251c of the parallax-barrier shutter panel 21 according to the present embodiment. FIG. 22 concentrates on the boundary between the common driving area 251a and the common driving area 251b and the boundary between the common driving area 251b and the common driving area 251c. In the present embodiment, it is assumed that the normally white twisted nematic (TN) mode is employed as the liquid crystal mode for the liquid crystal layer 24 of the parallax-barrier shutter panel 21. The number of the wires for forming the integrated aperture 300 is N/2 (four in this example). Zero voltage is applied to the terminal Lb1 for the second transparent electrode 25. With reference to FIG. 22, zero means that no voltage is applied and thus the sub apertures 210 are in the light-transmitting state and + means that a voltage is applied and thus the sub apertures 210 are in the light-blocking state.

The following describes the specific operation by taking a voltage pattern No1 illustrated in FIG. 22 as an example. The order of the application of a positive voltage and the application of zero voltage to the terminals is different for each of the common driving areas 251. For example, a positive voltage is applied to four consecutive terminals including the leftmost terminal in the second common driving area 251b, the four terminals being the terminals La9 to La12. Meanwhile, zero voltage is applied to four consecutive terminals including the leftmost terminal in the third common driving area 251c, the four terminals being the terminals La17 to La20. That is, with respect to the order of the terminals located in the individual common driving areas 251, the voltage value is shifted by four terminals between the common driving areas 251 adjacent to each other. A voltage is applied in such a manner that the same voltage is applied to one terminal in one common driving area 251 and to the (N/2)th (fourth in this example) terminal in the adjacent common driving area 251. Thus, the display apparatus in which (N·M+N/2) first transparent terminals 23 are connected with every N-th one of the first transparent electrodes 23 (at intervals of N, with (N−1) first transparent electrodes 23 being sandwiched in between) as illustrated in FIG. 21 can be provided with the voltage pattern in FIG. 22 (pattern of repetition of four first transparent electrodes 23 in the light-blocking state and four first transparent electrodes 23 in the light-transmitting state across the common driving areas 251a to 251c). According to the voltage pattern No1, in the first common driving area 251a, zero voltage is applied to the terminals La1 to La4 for the first transparent electrodes 23 and a positive voltage is applied to the terminals La5 to La8 for the first transparent electrodes 23. In the second common driving area 251b, a positive voltage is applied to the terminals La9 to La12 for the first transparent electrodes 23 and zero voltage is applied to the terminals La13 to La16 for the first transparent electrodes 23. In the third common driving area 251c, zero voltage is applied to the terminals La17 to La20 for the first transparent electrode and a positive voltage is applied to the terminals La21 to La24 for the first transparent electrodes 23. Thus, zero voltage or a positive voltage is applied to the corresponding ones of the first transparent electrodes 23 denoted by the same numbers, thereby providing the voltage pattern No1 in FIG. 22.

Figure 23:
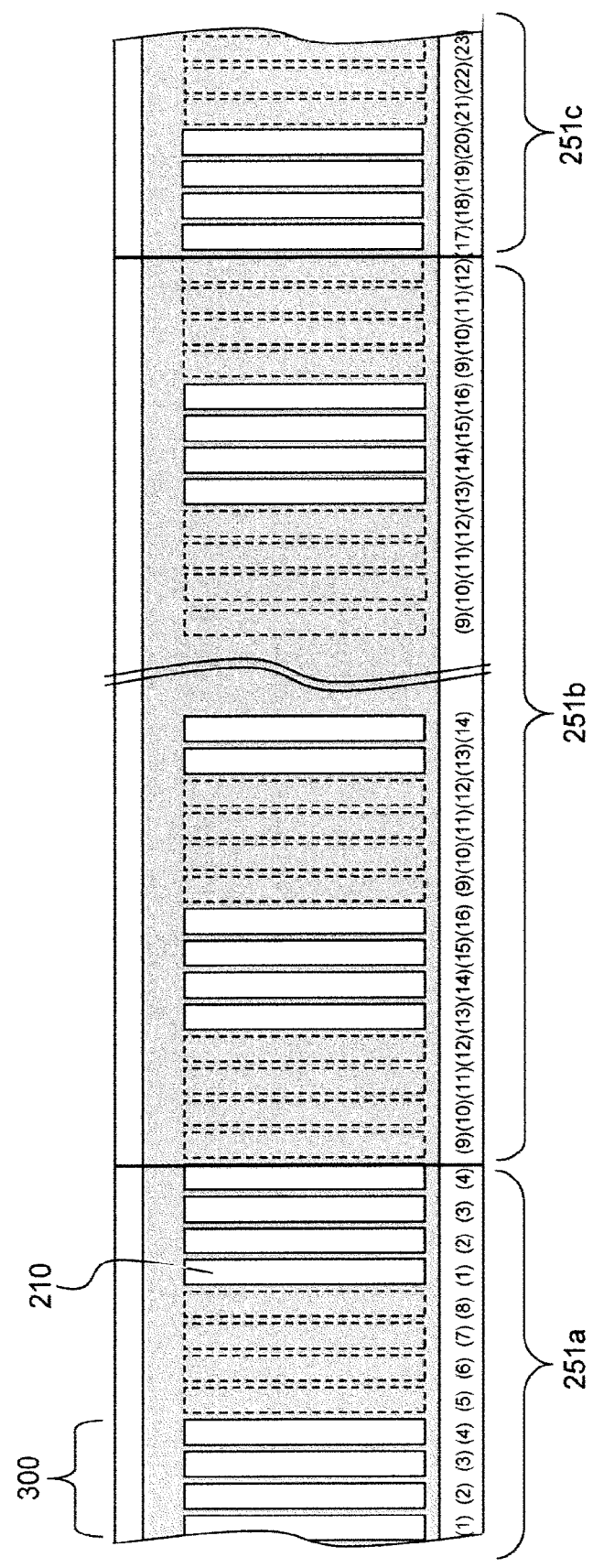
FIG. 23 A view illustrating integrated apertures of the display apparatus according to the first embodiment.

FIG. 23 illustrates the state in which the voltage in the voltage pattern No1 shown in FIG. 22 is applied to the first transparent electrode 23. The voltage pattern No1 is one of the voltage patterns applied in a case where the observation distance is equal to the design observation distance and is the pattern of regular repetition of (N/2) first transparent electrodes 23 in the light-blocking state and (N/2) first transparent electrodes 23 in the light-transmitting state across all of the common driving areas.

As illustrated in FIG. 23, according to the voltage pattern No1, four sub apertures 210 corresponding to the first transparent electrodes 23 marked with + are in the light-blocking state and four sub apertures 210 corresponding to the first transparent electrodes 23 marked with 0 are in the light-transmitting state. This provides the state substantially identical to the pattern 1 in FIG. 3 in which the integrated aperture 300 having a width being half the parallax-barrier pitch P is formed. As shown in voltage patterns No2 to No8 in FIG. 22, the terminals subjected to application of + are shifted on a one-by-one basis, thereby moving the position of the integrated aperture 300 at the sub-aperture pitch ΔSW as illustrated in FIGS. 4 to 10.

Figure 24:
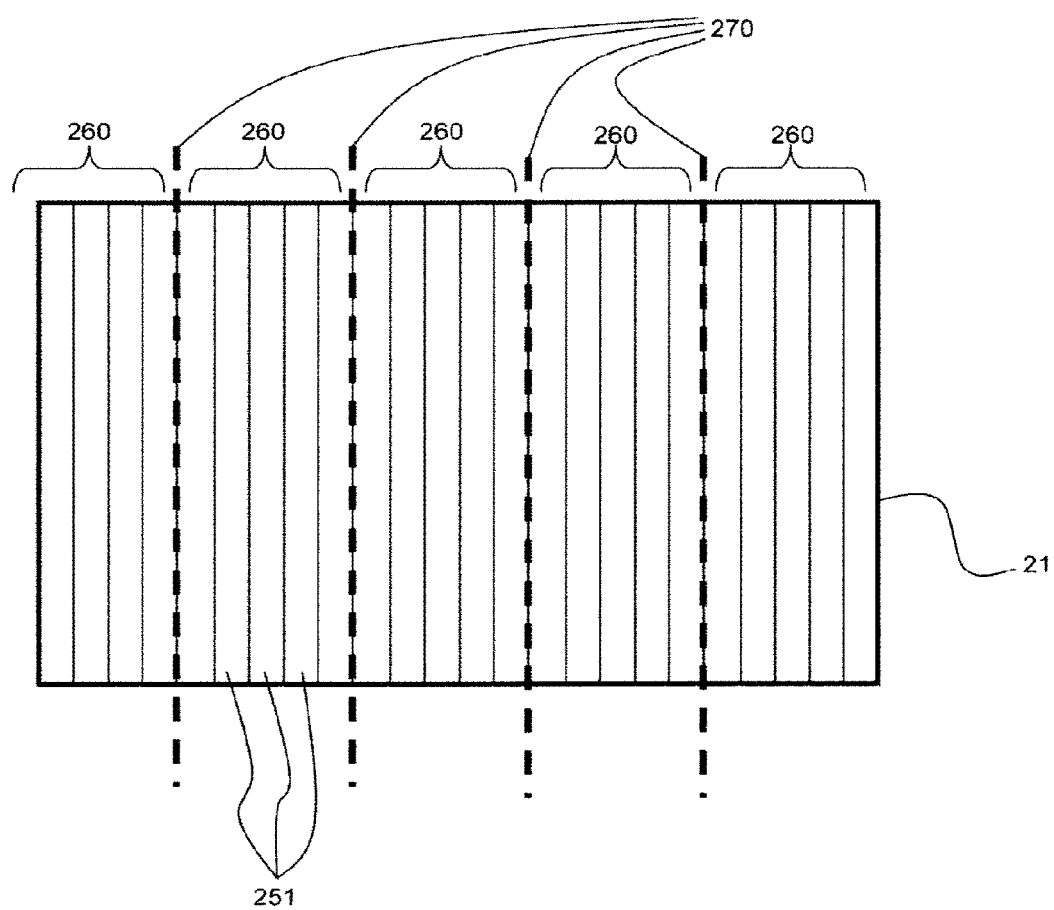
FIG. 24 A view illustrating a configuration of a parallax-barrier shutter panel of the display apparatus according to the first embodiment.

FIG. 24 is a plan view describing the operation state of the entirety of the parallax-barrier shutter panel 21. The plurality of common driving areas 251 are provided in the display surface of the parallax-barrier shutter panel 21. The voltage pattern is independently set for each common driving area 251 to control the width and the position of the integrated aperture 300. In the operation state illustrated in FIG. 24, five common barrier mode areas 260 are formed. In each of the common barrier mode areas 260, a voltage is applied to the plurality of consecutive common driving areas 251 in accordance with the same voltage pattern. In each common barrier mode area 260, the integrated apertures 300 having the same pitch and the same width are aligned in the horizontal direction. However, the phase of the integrated aperture 300 in one common barrier mode area 260 deviates from that of the integrated aperture 300 in the adjacent common barrier mode area 260. The phase deviation will be described later in detail. The position of a barrier mode shift boundary 270 that is the boundary between the common barrier mode areas 260 can be shifted by the width of the common driving area 251.

FIG. 25 is a plan view illustrating the arrangement state of the sub pixels 411 of the display panel 11 with respect to the integrated apertures 300 of the parallax-barrier shutter panel 21 in the naked-eye stereoscopic image display apparatus according to the present embodiment. With reference to FIG. 25, each pixel of the display panel 11 includes sub pixels 411 in the first primary color (white, W), the second primary color (green, G), the third primary color (red, R), and the fourth primary color (blue, B), these colors being stated in the descending order of brightness. Each of the sub pixel 411 has the same breadth. As for the first and third columns visible in the first observation direction in combination with the integrated apertures 300 of the parallax-barrier shutter panel 21 formed in vertical stripes, the sub pixels 411 on the first column to which the first primary color (W) and the second primary color (G) are allocated and the sub pixels 411 on the third column to which the second primary color (G) and the first primary color (W) are allocated are arranged in the same rows. As for the second and fourth columns visible in the second observation direction in the above-mentioned combination, the sub pixels 411 in the second column to which the first primary color (W) and the second primary color (G) are allocated and the sub pixels in the fourth column to which the second primary color (G) and the first primary color (W) are allocated are arranged in the same rows. The pixels are arranged in such a manner that the pixels in, for example, the first primary color (white, W) are diagonally aligned from the first column to the fourth column.

The plurality of first transparent electrodes 23 are divided by an even-numbered N (N=8) in the reference parallax-barrier pitch P in the lateral direction corresponding to two sub pixels 411. The number of wires that form the integrated aperture 300 is N/2 (four in this example). The positions of the integrated apertures 300 in the parallax-barrier shutter panel 21 are formed into vertical stripes.

Even if the integrated apertures 300 of the parallax-barrier shutter panel 21 are arranged in vertical stripes, this pixel configuration of the display panel 11 can eliminate or reduce degradation of resolution of an stereoscopic image during the monochromatic displaying. When the parallax-barrier shutter panel 21 is entirely transformed into the light-transmitting state, such pixel configuration can provide a two-dimensional image in smooth resolution.

<Description of Operation of Parallax-Barrier Shutter Panel Relative to Position of Observer>

Figure 26A:
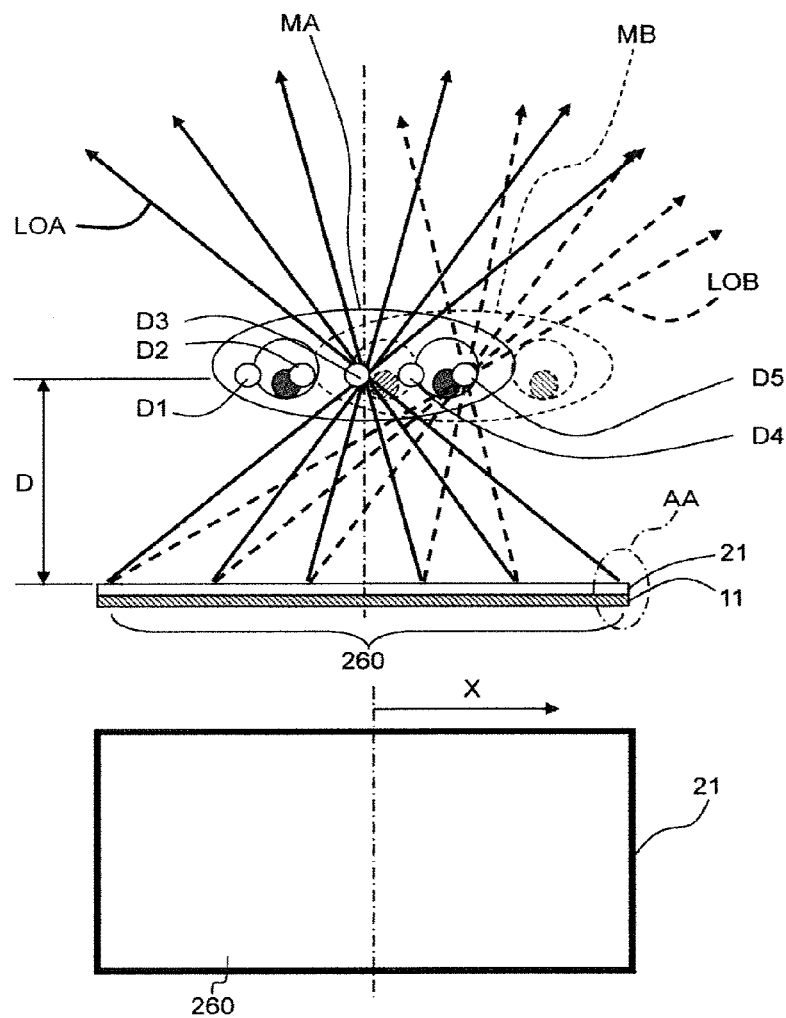
FIGS. 26A and 26B A view illustrating the operation of the display apparatus according to the first embodiment.
Figure 26B:
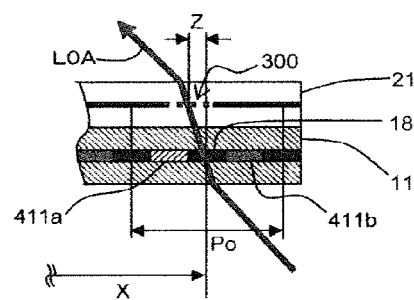

FIGS. 26A and 26B are schematic views illustrating the state in which the boundaries of the light radiated from the sub pixels 411a and 411b included in the sub-pixel pair 41 of the display panel 11 spread out from the positions on the display into the space in front of the screen according to the present embodiment of the invention. The light associated with the virtual radiation from the center of the light-blocking wall 18 between the sub pixel 411a and the sub pixel 411b agrees with the boundary lines. With reference to FIG. FIGS. 261 and 26B, the following describes the control over the parallax-barrier shutter panel 21 in the display apparatus according to the present embodiment.

With reference to FIG. 26A, arrows indicate, as an example, the boundary lines (the virtual rays) associated with six points aligned in the horizontal direction (the lateral direction) of the display surface of the naked-eye stereoscopic image display. FIG. 26A includes a plan view illustrating the state of in-plane operation of the parallax-barrier shutter panel 21 as a whole. FIG. 26B is an enlarged view of the portion enclosed by an ellipse AA indicated by the alternate long and short dash line on the right end of the naked-eye stereoscopic image display apparatus in FIG. 26A. FIG. 26B is an enlarged cross-sectional view describing the amount of the deviation of the integrated aperture 300 of the parallax-barrier shutter panel and the sub-pixel pair 41 defining the direction in which the virtual ray is radiated.

Boundary lines LOA indicated by the solid lines in FIG. 26A are virtual rays associated with the application of the voltage according to the same voltage pattern No3 to the electrode groups in all of the common driving areas 251 of the parallax-barrier shutter panel 21. The plurality of the common driving areas 251 are provided in the display surface of the parallax-barrier shutter panel 21. In the operation state illustrated in FIGS. 26A and 26B, the voltage according to the same voltage pattern is applied to the electrode groups in all of the common driving areas 251. With reference to FIG. 26A, one common barrier mode area 260 is formed. That is, the barrier mode shift boundary 270 that is the boundary between the common barrier mode areas 260 is not present.

As illustrated in FIG. 26A, the display apparatus according to the first embodiment is configured such that the boundary lines LOA of the individual common driving areas 251 converge to a light convergence point D3 indicated by an open circle in front of the center of the screen. This configuration is achieved if an optimal deviation amount Z provided between the central position of the light-blocking wall 18 and the central position of the integrated aperture 300 is set in accordance with Mathematical 1 below relative to a distance X from the center between the right and the left of the display panel 11 (the center of the display panel 11 in the lateral direction), the light-blocking wall 18 being located between the sub pixel 411a and the sub pixel 411b included in the sub-pixel pair 41.

$$Z = X \cdot T / (D \cdot n) \qquad \text{[Mathematical 1]}$$

The distance between the surface of the display panel 11 at the aperture and the surface of the parallax-barrier shutter panel 21 at the aperture is denoted by T. The refractive index of the object located between the surfaces is denoted by n. The design observation distance is denoted by D.

The reference parallax-barrier pitch P of the parallax-barrier panel 21 is set at a value expressed by Mathematical 2 below relative to a pitch Po of the sub-pixel pair of the display panel 11.

$$P=Po \cdot \{1-T/(D \cdot n)\} \qquad \text{[Mathematical 2]}$$

Boundary lines LOB indicated by broken lines in FIG. 26A indicate the boundary lines associated with the application of voltage in accordance with the voltage pattern No5 mentioned above to the electrode groups in all of the common driving areas 251 of the parallax-barrier shutter panel 21. In this case, as illustrated in FIG. 26A, the boundary lines LOB of the individual common driving areas 251 converge to a light convergence point D5 indicated by an open circle. Similarly, the boundary lines of the individual common driving areas 251 associated with the application of voltage in accordance with the voltage patterns No1, 2, and 4 to the electrode groups in the common driving areas 251 converge to light convergence points D1, D2, and D4 indicated by open circles.

In the present embodiment, the controller 32 determines, on the basis of the detection results obtained by the detector 31, the positions of the integrated apertures 300 in the parallax-barrier shutter panel 21 for each of the common driving areas 251. In particular, in a case where the controller 32 determines that, on the basis of the detection results obtained by the detector 31, the observer is located in the vicinity of the design observation distance D, the controller 32 controls the parallax-barrier shutter panel 21 to converge the boundary lines of the individual common driving areas 251 to one of the light convergence points D1 to D5. Consequently, the right eye of the observer is irradiated with the light from the sub pixels 411a for the right eye at all positions in the screen of the display panel 11 and the left eye of the observer is irradiated with the light from the sub pixels 411a for the left eye at all positions in the screen of the display panel 11, whereby the observer can visually recognize the stereoscopic image on the entire screen.

At this time, a voltage in the same voltage pattern is applied to the electrode groups in all of the common driving areas 251 of the parallax-barrier shutter panel 21, thereby providing one common barrier mode area 260 for the entire screen.

In particular, in a case where the observer is located at an observation point MA at the observation distance D from the naked-eye stereoscopic image display apparatus toward the front of the screen, a voltage is applied in accordance with the voltage pattern No3 to the electrode groups in the individual common driving areas 251, thereby converging the boundary lines from the individual common driving areas 251 to the light convergence point D3 located between the right eye and the left eye of the observer.

In this state, assume that the observer moves to an observation point MB, with one of the observer's eyes being located at the light convergence point D3. In this case, a voltage is applied in accordance with the voltage pattern No5 to the electrode groups in the individual common driving areas 251, thereby converging the boundary lines from the individual common driving areas 251 to the light convergence point D5 located between the right eye and the left eye of the observer.

In the display apparatus performing the above-mentioned operation according to the present embodiment, the boundary lines converge to one point between the right eye and the left eye. This allows the observer moving in the horizontal direction to observe an excellent stereoscopic image on the entire screen. At this time, in consideration of the typical presence of high levels of 3D crosstalk and great change in luminance around the boundary lines, the convergence point of the boundary lines is desirably located at or around the midpoint between the right eye and the left eye of the observer.

Figure 27:
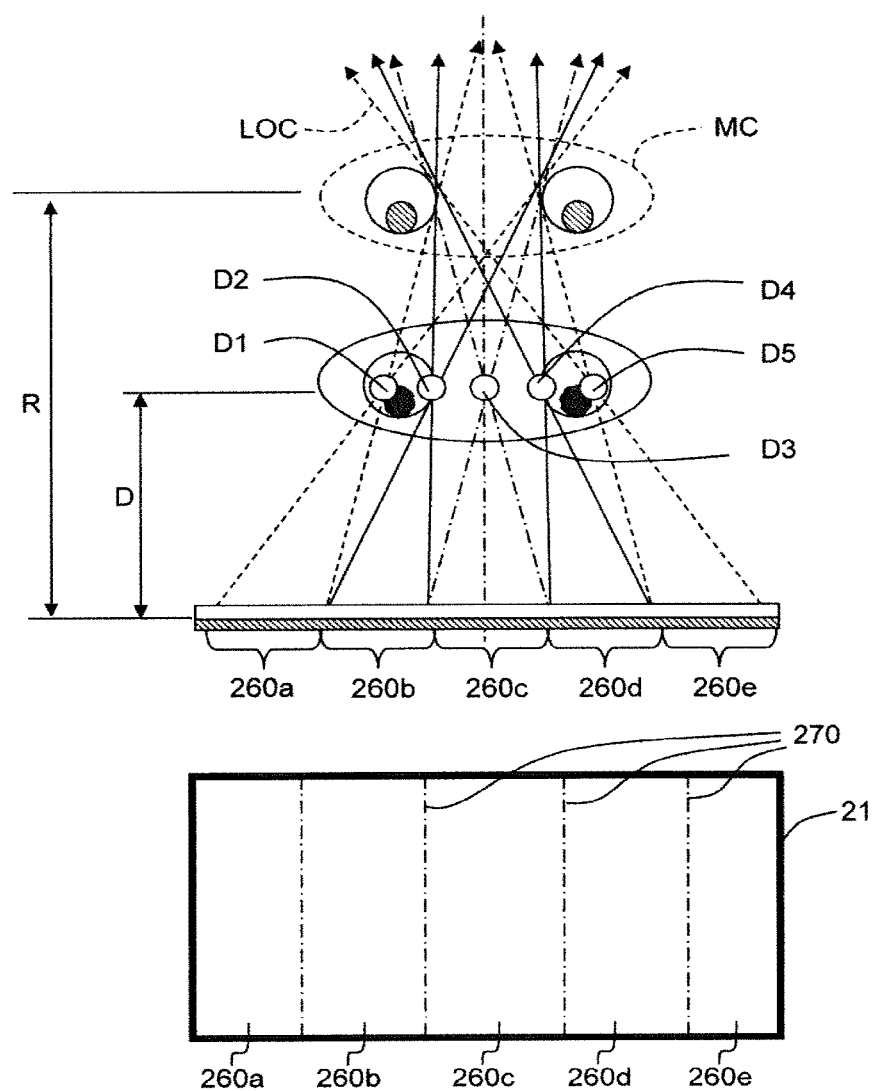
FIG. 27 A view illustrating the operation of the display apparatus according to the first embodiment.

Similarly to FIGS. 26A and 26B, FIG. 27 is a schematic view illustrating the boundary lines that agree with the virtual rays provided due to virtual radiation of light from the center of the light-blocking wall 18 between the sub pixel 411a and the sub pixel 411b included in the sub pixel pair 41. FIG. 27 illustrates the boundary lines assuming that the observer is located at an observation point MC at an actual observation distance R from the naked-eye stereoscopic image display apparatus, the actual observation distance R being greater than the design observation distance D. In particular, the arrows indicated by the broken lines are the boundary lines at and around the end portions of the display surface of the naked-eye stereoscopic apparatus and the arrows indicated by the long and short dash lines are the boundary lines at and around the center of the display surface of the naked-eye stereoscopic image display apparatus.

In a case where the controller 32 according to the present embodiment determines that, on the basis of the observation results obtained by the detector 31, the observer is located at a position farther from the design observation distance D, the controller 32 controls the parallax-barrier shutter panel 21 to converge the boundary lines from each of the common driving areas 251 to one of the different light convergence points D1 to D5 depending on the position in the display screen.

In particular, as illustrated in FIG. 27, five common barrier mode areas being common barrier mode areas 260a to 260e are formed assuming that the observer is located at the observation point MC. The controller 32 applies a voltage in accordance with the voltage pattern No3 to the electrode groups in the common driving areas 251 in the common barrier mode area 260c in the central part, thereby converging the boundary lines from the individual common driving areas 251 to the light convergence point D3. The controller 32 applies a voltage in accordance with the voltage pattern No1 to the electrode groups in the common driving areas 251 in the leftmost common barrier mode area 260a, thereby converging the boundary lines from the individual common driving areas 251 to the light convergence point D1. Similarly, the boundary lines from the common driving areas 251 in the remaining common barrier mode areas 260b, 260d, and 260e converge to the corresponding ones of the light convergence points D2, D4, and D5.

Although the individual boundary lines that have converged to the individual light convergence points D1 to D5 spread out again as the lines move away from the design observation distance D, all of these lines pass the space between the right eye and the left eye of the observer located at the observation point MC. This allows the observer located farther from the observation distance D to visually recognize the right-eye image through the right eye and the left-eye image through the left eye, and accordingly the observer can observe an excellent stereoscopic image on the entire screen.

The following describes the method for determining the positions of the barrier mode shift boundaries 270 of the common barrier mode areas 260.

Figure 28:
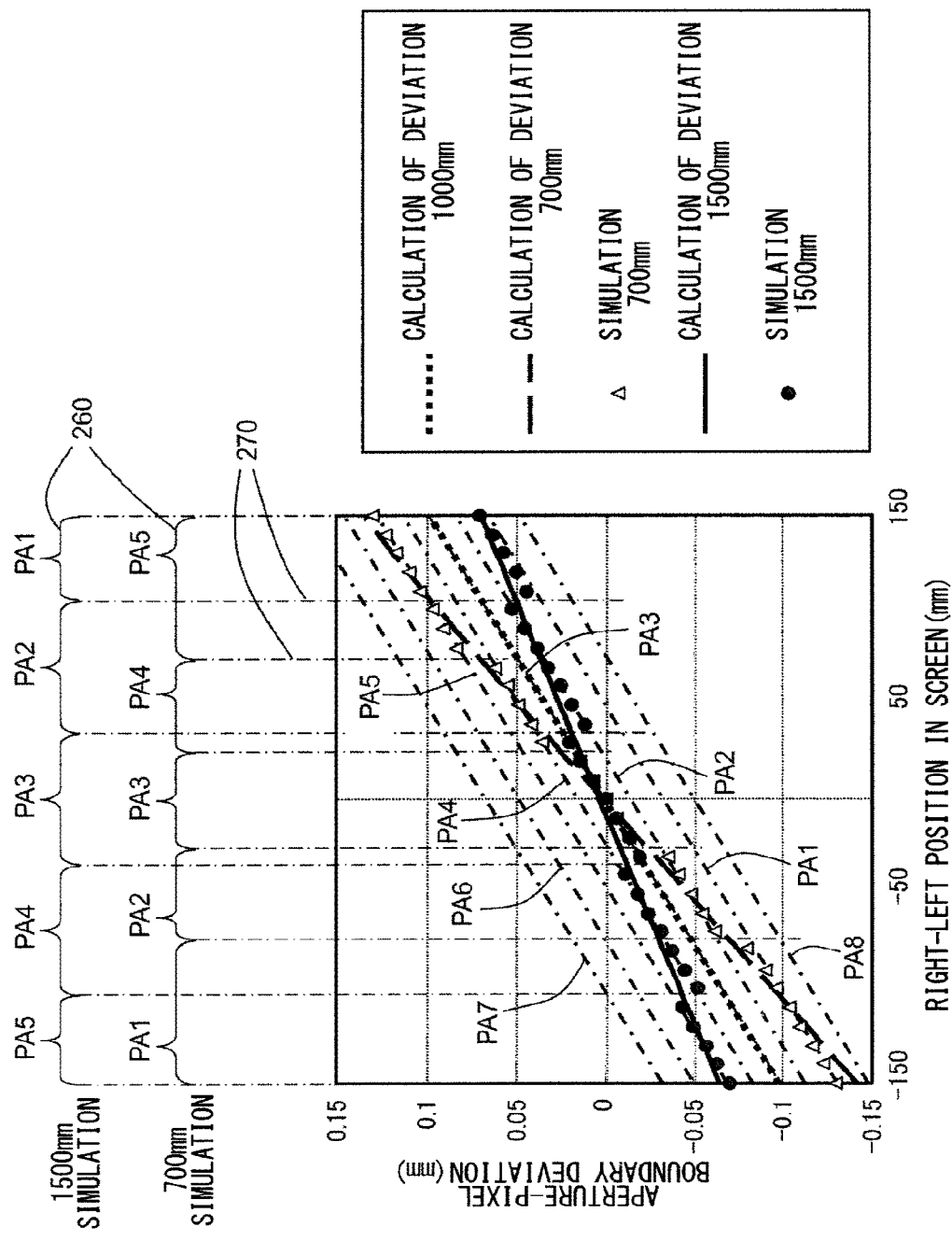
FIG. 28 A view illustrating the operation of the display apparatus according to the first embodiment.

FIG. 28 shows the results obtained, by calculating the optimal deviation amount between the central position of the light-blocking wall 18 and the central position of the integrated aperture 300, in order to allow the boundary lines from the entire screen to converge to one point between the right eye and the left eye of the observer, the light-blocking wall 18 being located between the sub pixel 411*a* and the sub pixel 411*b* included in the sub-pixel pair 41. The screen width of the display panel 11 is set at 300 mm. The pitch of the sub-pixel pairs 41 is set at 0.100 mm. The division number N for the reference parallax-barrier pitch P of the parallax-barrier shutter panel 21 is set at 8. The sub-aperture pitch ΔSW is set at 0.0125 mm. The design observation distance D is set at 1000 mm. The distance T between the surface of the display panel 11 at the aperture and the surface of the parallax-barrier shutter panel 21 at the aperture is set at 1.0 mm. The refractive index n is 1.5 times as great as that of glass.

The dotted line in the drawing indicates the change in the optimal deviation amount at the horizontal positions in the screen assuming that the observer is located in front of the screen at the design observation distance D of 1000 mm. As expressed by Mathematical 1, the dotted line is the positively sloped straight line. It is assumed that the parallax-barrier shutter panel 21 is located at one side of the display panel 11, and that the observer of the display panel 11 is at the one side. Thus, as expressed by Mathematical 2, the reference parallax-barrier pitch P is smaller than the pitch Po of the sub-pixel pair 41, with the ratio standing at 149.9/150.

Thick long and short dash lines PA1 to PA8 in FIG. 28 indicate the changes in the deviation amount between the central position of the sub-pixel pair 41 and the central position of the integrated aperture 300 in the display surface under the assumption that the voltage pattern applied to the common driving areas 251 is changed and the voltage pattern applied to the first transparent electrodes 23 ranges from the voltage patterns No1 to No8 in FIG. 22. The reference parallax-barrier pitch P of the parallax-barrier shutter panel 21 is designed assuming that the design observation distance D is set at 1000 mm, and therefore, the inclination of the thick long and short dash lines agrees with the inclination of the dotted line. The voltage pattern applied to the common driving areas 251 is changed, and accordingly, the deviation amount moves upward and downward at a pitch equal to the pitch ΔSW of the sub aperture 210. ΔSW stands at 0.0125 mm.

In a case where the observer moves rightward from the front of the screen at a design observation distance of 1000 mm, the dotted line indicating the optimal deviation amount accordingly moves rightward to a position parallel to itself. The optimal deviation amount can be obtained in a simulated manner by changing, as appropriate, the voltage pattern applied to the common driving areas 251 while the variation width falls within 0.0125 mm being the sub-aperture pitch ΔSW of the actually provided integrated aperture 300. The deviation amount regarded as the optimal deviation amount in a simulated manner in the entire screen can fall within an error of 0.00625 mm being equal to a half of ΔSW.

FIG. 28 also indicates the optimal deviation amount at the horizontal positions in the screen assuming that the observer is located at an observation distance of 700 mm and at an observation distance of 1500 mm. In a case where the observer is located at an observation distance of 700 mm and at an observation distance of 1500 mm, the optimal deviation amount obtained for each of the observation distances varies depending on the observation distance D as expressed by Mathematical 1. Thus, the optimal deviation amount linearly changes relative to the horizontal positions in the screen at an inclination which is not equal to the inclination for an observation distance of 1000 mm. As indicated by the filled circles and the open triangles in the drawing, the plurality of common barrier mode areas 260 each having different voltage patterns are provided in the screen, and the optimal deviation amount for each of the observation distances is calculated in a simulated manner.

In a case where the observation distance is set at 1500 mm, the graph indicating the calculation results of the optimal deviation amount is inclined, as indicated by the thick solid line, less steeply than the graph obtained for the design observation distance set at 1000 mm. The screen is divided into five common barrier mode areas 260 in the horizontal direction, and five different voltage patterns PA5, PA4, PA3, PA2, and PA1 are applied to the corresponding ones of the individual common barrier mode areas 260. For each of the common barrier mode areas 260, the voltage pattern is selected in such a manner that the feasible deviation amount closest to the optimal deviation amount at the relevant position is generated. The barrier mode shift boundary 270 is located at a position in which the difference between the optimal deviation amount for the observation distance at the relevant position and the feasible deviation amount provided in a simulated manner is half the maximum sub-aperture pitch ΔSW. Thus, the difference between the optimal deviation amount in the entire display screen and the actual deviation amount can be equal to or less than a half of the sub-aperture pitch ΔSW.

In a case where the observation distance is set at 700 mm, the graph indicating the calculation results of the optimal deviation amount is inclined, as indicated by the broken line, more steeply than the graph obtained for the design observation distance D set at 1000 mm. As in the above-mentioned case, the screen is divided into five common barrier mode areas 260 in the horizontal direction, and similarly, the five different voltage patterns PA1 PA2, PA3, PA4, and PA5 are applied. The barrier mode shift boundary 270 is located at a position in which the difference between the optimal deviation amount for the observation distance at the relevant position and the feasible deviation amount provided in a simulated manner is half the maximum sub-aperture pitch ΔSW. Thus, the difference between the optimal deviation amount in the entire display screen and the actual deviation amount can be equal to or less than a half of the sub-aperture pitch ΔSW.

Assume that M is increased, M being the number of the first transparent electrodes 23 electrically connected with one another through the common wire 201 and the contact holes 202. If the common driving area 251 is excessively wide, the difference between the optimal deviation amount and the actual deviation amount that is feasible becomes greater than a half of the sub-aperture pitch ΔSW. The width of the common barrier driving area 251 is therefore desirably minimized.

The following describes the voltage patterns to be applied to the first transparent electrodes 23 in the common driving areas 251 in the vicinity of the barrier mode shift boundary 270. It is assumed that the parallax-barrier shutter panel 21 is located at one side of the display panel 11, and that the observer of the display panel 11 is at the one side.

In this case, as expressed by Mathematical 2, the ideal parallax-barrier pitch is designed to be slightly smaller than the pitch of the sub-pixel pairs 41. The ideal parallax-barrier pitch increases with increasing observation distance, approaching the pitch of the sub-pixel pairs 41. As shown in FIG. 28, the graph indicating the calculation results of the optimal deviation amount obtained for the observation distance greater than the design observation distance D is inclined less steeply than the graph indicating the calculation results obtained for the design observation distance D. Conversely, the ideal parallax-barrier pitch decreases with decreasing observation distance, further differing from the pitch of the sub-pixel pairs 41. Consequently, as shown in FIG. 28, the graph indicating the calculation results of the optimal deviation mount obtained for the observation distance smaller than the design observation distance D is inclined more steeply than the graph indicating the calculation results obtained for the design observation distance D.

If the observation distance is greater than the design observation distance D and the average parallax-barrier pitch in the display surface needs to be increased accordingly, the local parallax-barrier pitch in the barrier mode shift boundary 270 needs to be increased by one, which is the equivalent of one sub aperture 210, the parallax-barrier pitch being the sum of the number of the sub apertures 210 in the transmitting state and the number of the sub apertures 210 in the light-blocking state. Conversely, if the observation distance is smaller than the design observation distance D and the average parallax-barrier pitch in the display surface needs to be reduced accordingly, the local parallax-barrier pitch in the barrier mode shift boundary 270 needs to be reduced by one, which is the equivalent of one sub aperture 210, the parallax-barrier pitch being the sum of the number of the sub apertures 210 in the transmitting state and the number of the sub apertures 210 in the light-blocking state.

The following specifically describes the method for driving the parallax-barrier shutter panel 21.

As mentioned above, if the observation distance is greater than the design observation distance D and the average parallax-barrier pitch in the display surface needs to be increased accordingly, the local parallax-barrier pitch in the barrier mode shift boundary 270 needs to be increased by one, which is the equivalent of one sub-aperture pitch, the parallax-barrier pitch being the sum of the number of the sub apertures 210 in the transmitting state and the number of the sub apertures 210 in the light-blocking state.

This can be achieved by increasing the number of the sub apertures 210 in the transmitting state and keeping the number of the sub apertures 210 in the light-blocking state unchanged, or by keeping the number of the sub apertures 210 in the transmitting state unchanged and increasing the number of the sub apertures 210 in the light-blocking state. As described below, it is preferable to keep the number of the sub apertures 210 in the transmitting state unchanged and increase the number of the sub apertures 210 in the light-blocking state because the luminance flickers can be less noticeable to the observer while he or she is moving rightward and leftward.

Figure 29:
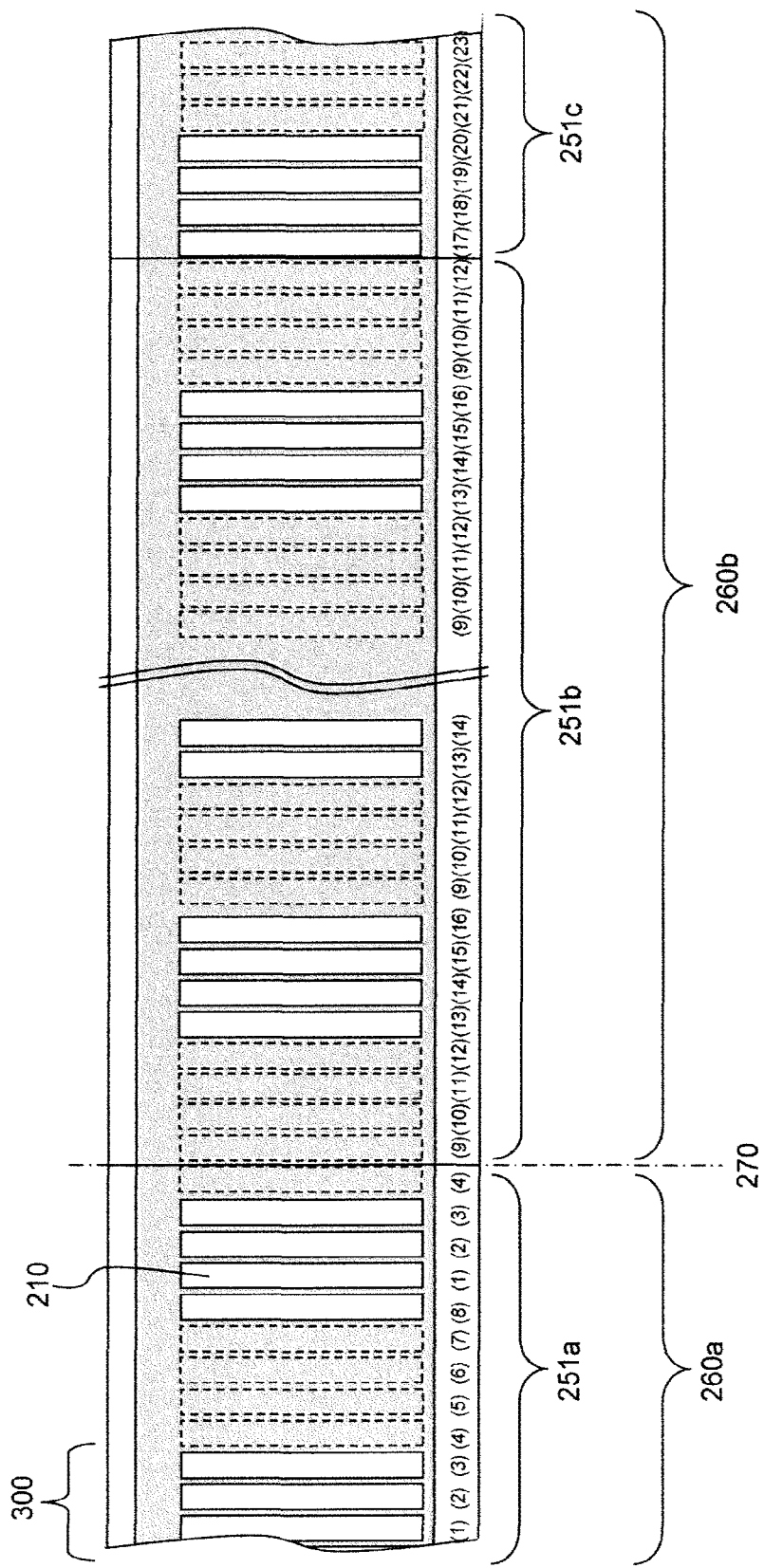
FIG. 29 A view illustrating integrated apertures of the display apparatus according to the first embodiment.

FIG. 29 illustrates the state in which a voltage is applied to the first transparent electrodes 23 in the vicinity of the barrier mode shift boundary 270. FIG. 29 illustrates the state in which the voltage in the voltage pattern No9 shown in FIG. 22 is applied. The voltage pattern No9 is the voltage pattern selected from the voltage patterns shown in FIG. 22 correspondently to the case in which the parallax-barrier shutter panel 21 is located anterior to the display panel 11 and the observation distance is a long viewing distance (observation distance>design observation distance D). Five first transparent electrodes 23 that are in the light-blocking state due to application of a positive voltage are located in the boundary portion between the first common driving area 251a and the second common driving area 251b. Except for the above boundary portion, the pitch is maintained with four electrodes in the transmitting state and four electrodes in the light-blocking state being located. In the boundary portion between the first common driving area 251a and the second common driving area 251b, the gap between the integrated apertures 300 is increased by an amount equivalent to one transparent electrode 23. That is, the barrier mode shift boundary 270 is formed in the boundary portion between the first common driving area 251a and the second common driving area 251b. In the barrier mode shift boundary 270, the number of the sub apertures 210 in the transmitting state is unchanged and the number of the sub apertures 210 in the light-blocking state is increased. Consequently, the local parallax-barrier pitch is increased by one, which is the equivalent of one first transparent electrode 23 (one sub-aperture pitch), the parallax-barrier pitch being the sum of the number of the sub apertures 210 in the transmitting state and the number of the sub apertures 210 in the light-blocking state. In other words, in the barrier mode shift boundary 270, the parallax-barrier pitch that is the sum of the number of the sub apertures 210 in the transmitting state and the number of the sub apertures 210 in the light-blocking state is locally increased by one, which is the equivalent of one first transparent electrode 23. With reference to FIG. 22, the rectangles shown by broken lines indicate the common barrier mode areas 260 that are separated from each other at the barrier mode shift boundary 270 and maintain the pitch of the integrated apertures 300.

In the state of the voltage pattern No10 shown in FIG. 22 as well, the integrated apertures 300 of the parallax-barrier shutter panel 21 move rightward correspondently to the rightward movement of the observer located at an observation distance greater than the design observation distance D. In this state, five first transparent electrodes 23 that are in the light-blocking state due to application of a positive voltage cannot be located in the boundary portion between the first common driving area 251a and the second common driving area 251b. Alternatively, five first transparent electrodes 23 that are in the light-blocking state due to application of a positive voltage are located in the boundary portion between the second common driving area 251b and the third common driving area 251c. Except for the above boundary portion, the pitch is maintained with four electrodes in the transmitting state and four electrodes in the light-blocking state being located. In the boundary portion between the second common driving area 251b and the third common driving area 251c, the gap between the integrated apertures 300 is increased by an amount equivalent to one transparent electrode 23. That is, the barrier mode shift boundary 270 is formed in the boundary portion between the second common driving area 251b and the third common driving area 251c. The number of the sub apertures 210 in the transmitting state is unchanged and the number of the sub apertures 210 in the light-blocking state is increased. Consequently, the local parallax-barrier pitch is increased by one, which is the equivalent of one first transparent electrode 23, the parallax-barrier pitch being the sum of the number of the sub apertures 210 in the transmitting state and the number of the sub apertures 210 in the light-blocking state.

The state of the voltage pattern No11 shown in FIG. 22 is substantially the same as the state of the voltage pattern No10. Five first transparent electrodes 23 in the light-blocking state due to application of a positive voltage are located in the boundary portion between the second common driving area 251b and the third common driving area 251c. Except for the above boundary portion, the pitch is maintained with four electrodes in the transmitting state and four electrodes in the light-blocking state being located. Consequently, in each of the common barrier mode areas 260 on both sides of the barrier mode shift boundary 270, the integrated apertures 300 are allowed to move rightward at the pitch of the first transparent electrode 23 correspondently to the rightward movement of the observer while keeping the same width and the same pitch.

This is possible owing to the configuration in which (N·M+N/2) first transparent electrodes 23 are located in the common driving area 251, N being an even number and representing the number of the first transparent electrodes 23 in the reference parallax-barrier pitch P. M is a given positive integer. In a case where the first transparent electrodes 23 are driven with the first transparent electrodes 23 in the transmitting state and the first transparent electrodes 23 in the light-blocking state being equal in number (N/2), there is a half-cycle difference between the phase of the integrated aperture 300 in the right end and the phase of the integrated aperture 300 in the left end of the common driving area 251. Thus, without exception, the first transparent electrode in the light-blocking state appears in one of the ends. Therefore, the number of the first transparent electrodes 23 in the light-blocking state can be increased by one in the right end or the left end of the common driving area 251. Consequently, one of the right end and the left end of the common driving area 251 becomes the barrier mode shift boundary 270.

With reference to FIG. 29, the following describes, in detail, the voltage applied to each of terminals La of the stereoscopic image display apparatus configured as illustrated in FIG. 21. With reference to FIG. 29, the barrier mode shift boundary 270 is formed in the boundary portion between the first common driving area 251a and the second common driving area 251b. This causes the phase deviation of the integrated aperture 300 in the right and the integrated aperture 300 in the left of the barrier mode shift boundary 270, the deviation being the equivalent of one sub aperture. In each of the common barrier mode areas 260, the integrated apertures 300 are kept constant in phase.

In the stereoscopic image display apparatus configured as illustrated in FIG. 21, (N·M+N/2) first transparent electrodes 23 included in the common driving area 251 are electrically connected with every N-th one of the first transparent electrodes 23 (at intervals of N, with (N−1) first transparent electrodes 23 being sandwiched in between). In order to keep the integrated apertures 300 constant in phase in the common barrier mode area 260, the voltage sequence provided in one common driving area 251 needs to be changed by N/2 in the adjacent common driving area 251. Specifically, in the second common driving area 251b, a positive voltage is applied to the terminals Lag to La12 and zero voltage is applied to the terminals La13 to La16. In the third common driving area 251c, zero voltage is applied to the terminals La17 to La20 and a positive voltage is applied to the terminals La21 to La24. Thus, the voltage sequence provided in one common driving area 251 is changed by N/2 in the adjacent common driving area 251, allowing the integrated apertures 300 in the common barrier mode area 260 to be kept constant in phase.

As mentioned above, if the observation distance is smaller than the design observation distance D and the average parallax-barrier pitch in the display surface needs to be reduced accordingly, the local parallax-barrier pitch in the barrier mode shift boundary 270 needs to be reduced by one, which is the equivalent of one sub aperture, the parallax-barrier pitch being the sum of the sub apertures 210 in the transmitting state and the number of the sub apertures 210 in the light-blocking state.

This can be achieved by decreasing the number of the sub apertures 210 in the transmitting state and keeping the number of the sub apertures 210 in the light-blocking state unchanged, or by keeping the number of the sub apertures 210 in the transmitting state unchanged and decreasing the number of the sub apertures 210 in the light-blocking state. As described later, it is preferable to decrease the number of the sub apertures 210 in the transmitting state and keep the number of the sub apertures 210 in the light-blocking state unchanged because the luminance flickers can be less noticeable.

Figure 30:
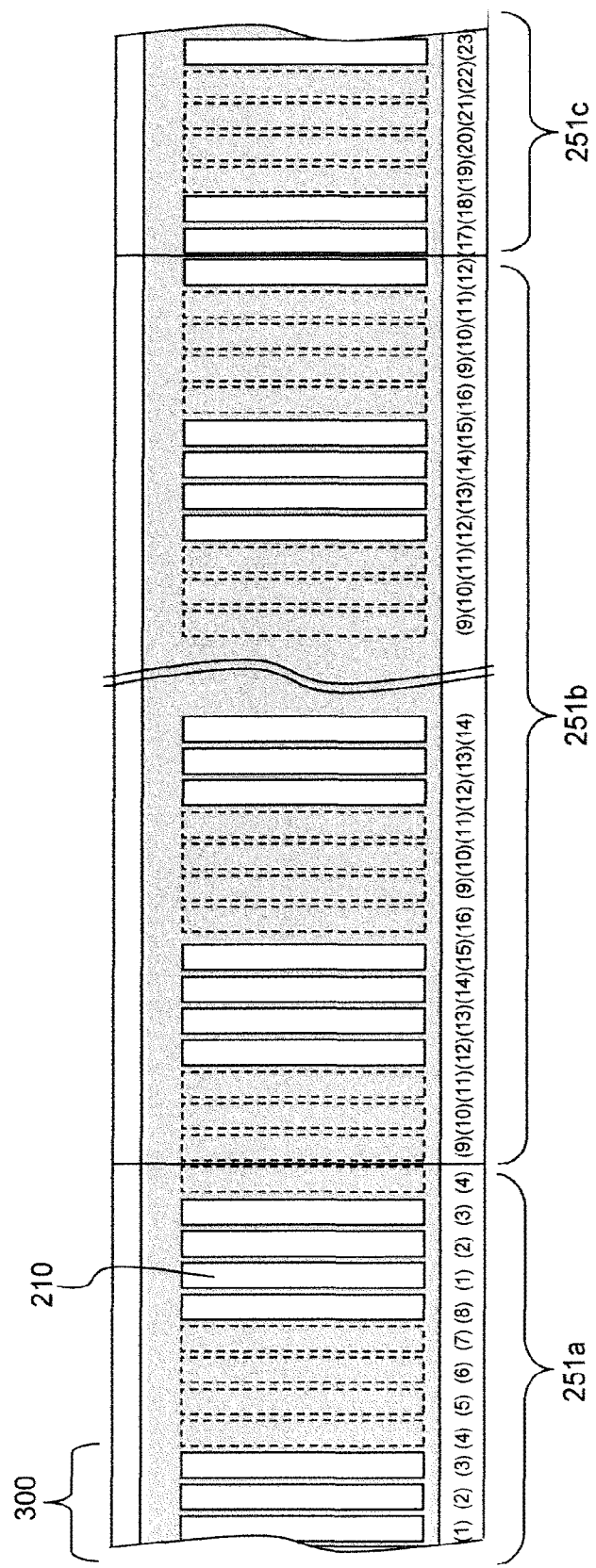
FIG. 30 A view illustrating integrated apertures of the display apparatus according to the first embodiment.

FIG. 30 illustrates the state in which a voltage is applied to the first transparent electrodes 23 in the vicinity of the barrier mode shift boundary 270. FIG. 30 illustrates the state in which the voltage in a voltage pattern No15 shown in FIG. 22 is applied. The voltage pattern No15 is the voltage pattern selected from the voltage patterns shown in FIG. 22 correspondently to the case in which the parallax-barrier shutter panel 21 is located anterior to the display panel 11 and the observation distance is a short viewing distance (observation distance<design observation distance D). Zero voltage is applied to the boundary portion between the second common driving area 251b and the third common driving area 251c and three first transparent electrodes 23 in the transmitting state are located in the boundary portion. Except for the above boundary portion, the arrangement is maintained with four electrodes in the transmitting state and four electrodes in the light-blocking state being located. In the boundary portion between the second common driving area 251b and the third common driving area 251c, the barrier mode shift boundary 270 is formed. In the barrier mode shift boundary 270, the number of the sub apertures 210 in the transmitting state is decreased while the number of the sub apertures 210 in the light-blocking state is unchanged. Consequently, the local parallax-barrier pitch is reduced by one, which is the equivalent of one sub-aperture pitch (one first transparent electrode 23), the parallax-barrier pitch being the sum of the number of the sub apertures 210 in the transmitting state and the number of the sub apertures 210 in the light-blocking state. In other words, in the barrier mode shift boundary 270, the parallax-barrier pitch that is the sum of the number of the sub apertures 210 in the transmitting state and the number of the sub apertures 210 in the light-blocking state is locally reduced by one, which is the equivalent of one first transparent electrode 23.

In the state of a voltage pattern No16 shown in FIG. 22 as well, the integrated apertures 300 of the parallax-barrier shutter panel 21 move rightward correspondently to the rightward movement of the observer located at an observation distance smaller than the design observation distance D. In this state as well, zero voltage is applied to the boundary portion between the second common driving area 251b and the third common driving area 251c and three first transparent electrodes 23 in the transmitting state are located in the boundary portion. Except for the above boundary portion, the arrangement is maintained with four electrodes in the transmitting state and four electrodes in the light-blocking state being located. The barrier mode shift boundary 270 is formed in the boundary portion between the second common driving area 251b and the third common driving area 251c. In the barrier mode shift boundary 270, the number of the sub apertures 210 in the transmitting state is decreased while the number of the sub apertures 210 in the light-blocking state is unchanged. Consequently, the local parallax-barrier pitch is reduced by one, which is the equivalent of one sub-aperture pitch, the parallax-barrier pitch being the sum of the number of the sub apertures 210 in the transmitting state and the number of the sub apertures 210 in the light-blocking state.

In the state of a voltage pattern No17 shown in FIG. 22, zero voltage is applied to the boundary portion between the first common driving area 251a and the second common driving area 251b and three first transparent electrodes 23 in the transmitting state are located in the boundary portion. Except for the above boundary portion, the pitch is maintained with four electrodes in the transmitting state and four electrodes in the light-blocking state being located. The barrier mode shift boundary 270 is formed in the boundary portion between the first common driving area 251a and the second common driving area 251b. In the barrier mode shift boundary 270, the number of the sub apertures 210 in the transmitting state is decreased while the number of the sub apertures 210 in the light-blocking state is unchanged. Consequently, the local parallax-barrier pitch is reduced by one, which is the equivalent of one sub-aperture pitch, the parallax-barrier pitch being the sum of the number of the sub apertures 210 in the transmitting state and the number of the sub apertures 210 in the light-blocking state.

Thus, if the observation distance is smaller than the design observation distance D, in each of the common barrier mode areas 260 on both sides of the barrier mode shift boundary 270, the integrated apertures 300 are allowed to move rightward at the pitch of the first transparent electrode 23 correspondently to the rightward movement of the observer while keeping the same width and the same pitch.

This is possible owing to the configuration in which (N·M+N/2) first transparent electrodes 23 are located in the common driving area 251, N being an even number and representing the number of the first transparent electrodes 23 in the reference parallax-barrier pitch P. M is a given positive integer. In a case where the first transparent electrodes 23 are driven with the first transparent electrodes 23 in the transmitting state and the first transparent electrodes 23 in the light-blocking state being equal in number (N/2), there is a half-cycle difference in the phase of the integrated aperture 300 in the right end and the phase of the integrated aperture 300 in the left end of the common driving area 251. Thus, without exception, the first transparent electrode in the light-transmitting state appears in one of the ends. Therefore, the number of the first transparent electrodes 23 in the light-transmitting state can be reduced by one in the right end or the left end of the common driving area 251. Consequently, one of the right end and the left end of the common driving area 251 becomes the barrier mode shift boundary 270.

The above description has been given assuming that (N·M+N/2) first transparent electrodes 23 are located in every one of the common driving areas 251, which is not limited thereto. Alternatively, some of the common driving areas 251 may each be provided with (N·M) first transparent electrodes 23. Although the common driving area 251 in which (N·M) first transparent electrodes 23 are located cannot be set as the barrier mode shift boundary 270, it would not be influenced strongly as long as the number of such common driving areas 251 is small.

<Relation Between Luminous Intensity Distribution Characteristics and Widths of Sub Aperture in Light-Blocking State and Sub Aperture in Transmitting State>

The following describes the luminous intensity distribution characteristics associated with changes in the number of the sub apertures in the light-blocking state and the number of the sub apertures in the transmitting state in the barrier mode shift boundary 270.

Figure 31:
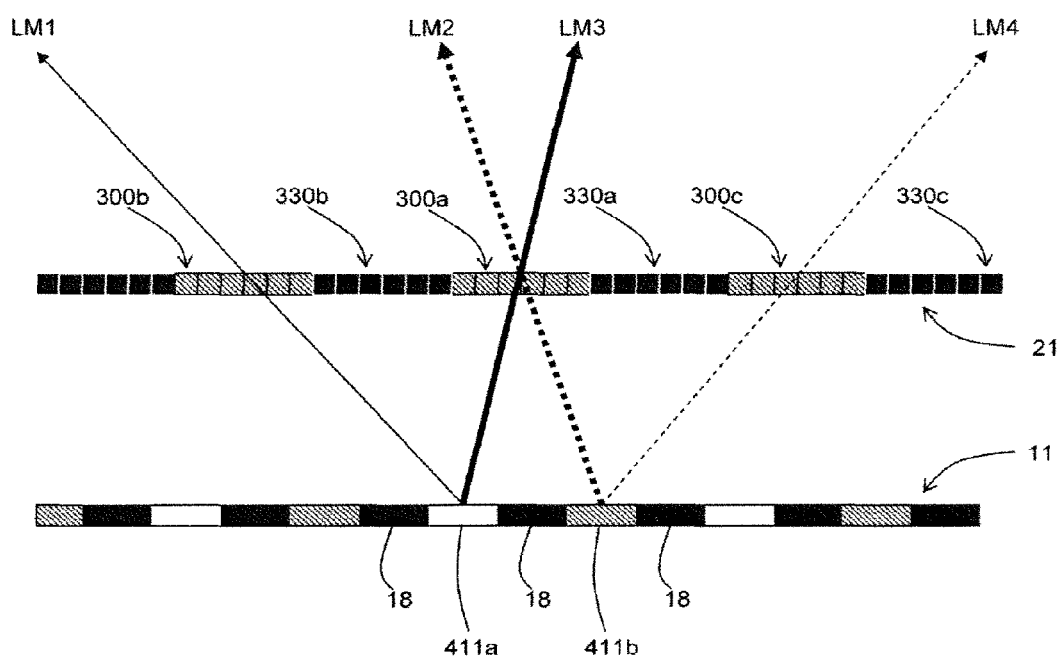
FIG. 31 A view illustrating a calculation model of the display apparatus according to the first embodiment.

The luminous intensity distribution characteristics were calculated based on geometrical optics for the model in FIG. 31 illustrating the sub pixels 411 of the display panel 11 and the integrated apertures 300 of the parallax-barrier shutter panel 21. With reference to FIG. 31, the central position of the light-blocking wall 18 between the sub pixel 411a in the left and the sub pixel 411b in the right corresponds to the central position of an integrated aperture 300a. An integrated aperture 300b is located on the left of the integrated aperture 300a and an integrated aperture 300c is located on the right of the integrated aperture 300a. The pitch of the sub-pixel pairs 41 is set at 0.12 mm. The distance between the surface of the display panel 11 at the aperture and the surface of the parallax-barrier shutter panel 21 at the aperture is set at 1 mm. The aperture width of the sub pixel is set at 0.03 mm. The design observation distance D is set at 800 mm. The number of the sub apertures 210 in the reference parallax-barrier pitch P is denoted by N which is an even number, and N stands at 12. In the parallax-barrier shutter panel 21, the number of the sub apertures 210 in the light-transmitting state is equal to the number of the sub apertures 210 in the light-blocking state, the number standing at N/2=6. The width of the integrated aperture 300 is equivalent to 50% of the reference parallax-barrier pitch. Each of integrated light-blocking portions 330 is formed of six sub apertures 210 in the light-blocking state.

Figure 32:
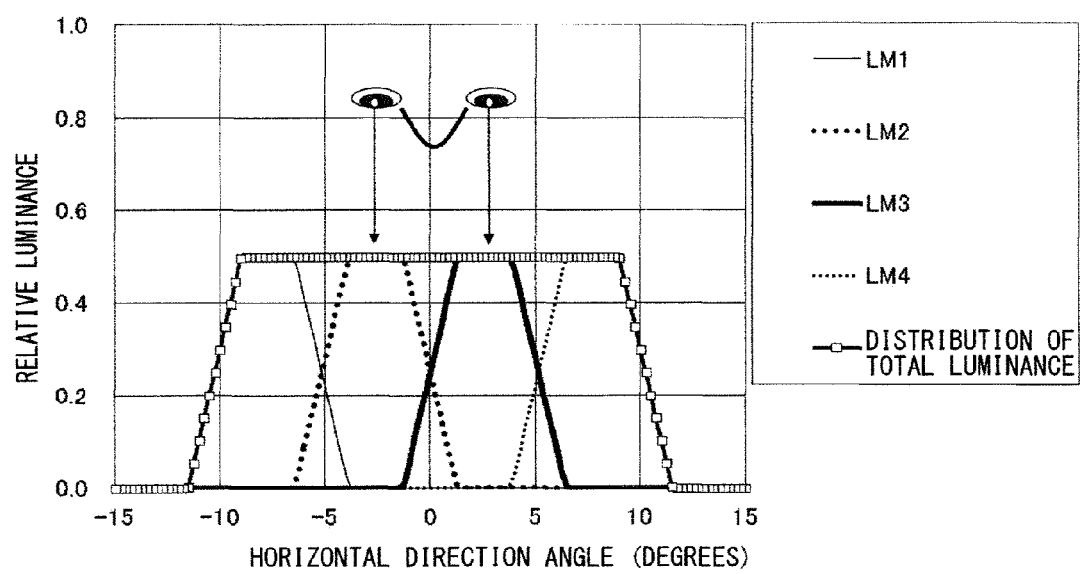
FIG. 32 A view illustrating calculation results associated with the display apparatus according to the first embodiment.

FIG. 32 shows the calculation results associated with the luminous intensity distribution characteristics assuming that the number of the sub apertures 210 in the transmitting state and the number of the sub apertures 210 in the light-blocking state each stand at N/2=6. This is based on the assumption that the barrier mode shift boundary 270 is not present in the display surface and the observation distance is equal to the design observation distance D. The lateral axis indicates angles in the horizontal direction, with the frontal direction relative to the display surface being set at 0 degree. The vertical axis indicates the relative luminance. As shown in FIG. 31, the calculations are associated with four rays including rays LM1, LM2, LM3, and LM4 that are emitted from the sub pixel 411a in the left and the sub pixel 411b in the right and pass through the integrated aperture 300b, the integrated aperture 300c, and the integrated aperture 300a located in between. This is because these four rays travel toward near the observer. The solid line having markers added thereto indicates the distribution of the total luminance associated with the white display provided on the sub pixel 411a in the left and the sub pixel 411b in the right.

Assuming that the interocular distance of the observer is equal to 65 mm, the interocular angle stands at 4.6 degrees. Each of the left and right eyes is located at the center of the peak of the luminous intensity distribution for the corresponding one of the rays LM2 and LM3 that have been emitted from the sub pixels 411a and 411b and passed through the integrated aperture 300a, the rays LM2 and LM3 being indicated by the thick dotted line and the thick solid line. The distribution of the total luminance is completely leveled in the wide angular range at and around the center. Thus, the flickers associated with changes in luminance are not noticeable to the observer moving rightward and leftward at an observation distance of 800 mm.

To make luminance flickers unnoticeable to the observer moving in the lateral direction, the following design is appropriate in which the width of the individual integrated aperture 300 of the parallax-barrier shutter panel 21 is equivalent to 50% of the reference parallax-barrier pitch P and the distance between the centers of the two sub apertures, being the sub aperture 411a and the sub aperture 411b, included in the sub pixel pair 41 of the display panel 11 is half the pitch Po of the sub pixel pair 41. Thus, it is appropriate that the number of the first transparent electrodes 23 in the light-transmitting state is equivalent to the number of the first transparent electrodes 23 in the light-blocking state, the number standing at N/2.

Next, assume that the observation distance is set at 1000 mm, which is greater than the design observation distance D. In this case, the local parallax-barrier pitch in the barrier mode shift boundary 270 needs to be increased by one, which is the equivalent of one sub-aperture pitch, the parallax-barrier pitch being the sum of the number of the sub apertures 210 in the transmitting state and the number of the sub apertures 210 in the light-blocking state. FIG. 33 is based on the assumption that the width of the integrated aperture 300a of the model in FIG. 31 is increased by an amount equivalent to one sub aperture 210, and therefore, the width is equivalent to seven apertures. The width of each of the integrated apertures 300b and 300c and the width of each of integrated light-blocking portions 330a, 330b, and 330c are unchanged, and therefore, each width is equivalent to six sub apertures 210. In this case, a mountain of luminance appears in the frontal direction. This mountain of luminance appears because the width of the integrated aperture 300a in the barrier mode shift boundary 270 is made equivalent to seven sub apertures, in other words, seven sub apertures 210 are in the transmitting state. The mountain of luminance is visually recognized as an emission line. Assuming that the interocular distance of the observer is equal to 65 mm, the interocular angle stands at 3.7 degrees, which is smaller than the interocular angle obtained at the design observation distance. As shown in FIG. 33, the interocular angle is smaller than the angle of the mountain of luminance. If the observer slightly moves rightward or leftward, the observer would notice luminous changes in the barrier mode shift boundary 270, the luminous changes being visually recognized as emission lines.

FIG. 34 is based on the following assumption. The width of the integrated aperture 300a in the model shown in FIG. 31 remains equivalent to six sub apertures, and the width of the integrated light-blocking portion 330a is increased by an amount equivalent to one sub aperture and is thus equivalent to seven apertures. The width of each of the integrated apertures 300b and 300c and the width of each of the integrated light-blocking portions 330b and 330c are unchanged, and therefore, each width is equivalent to six sub apertures 210. In this case, the luminance in the frontal direction is leveled and a valley of luminance appears on the right end. This valley of luminance appears because the width of the integrated light-blocking portion 330a in the barrier mode shift boundary 270 is made equivalent to seven sub apertures, in other words, seven sub apertures 210 are in the light-blocking state. The valley of luminance is visually recognized as a dark line. The thick broken line in the drawing indicates the light angular distribution calculated for three integrated apertures 300 including the integrated aperture 300c located in between. This distribution and the luminous intensity distribution calculated for the integrated apertures including the integrated aperture 300a located in between are mirror images of each other. The luminance-leveled portion appears in the central part of each of these luminous intensity distributions. If comparisons are made with the interocular angle of the observer, it is apparent that luminance differences in the barrier mode shift boundary 270 are unnoticeable in a certain region even if the observer slightly moves rightward or leftward, the luminance differences being otherwise recognized as dark lines.

In a case where the observation distance is greater than the design observation distance D, the interocular angle of the observer is small. Thus, the likelihood that the observer moving rightward or leftward notices luminance changes, which are visually recognized as emission lines or dark lines, in the barrier mode shift boundary 270 can be further reduced by increasing the number of the sub apertures 210 included in the integrated light-blocking portion 330 in the barrier mode shift boundary 270 than by increasing the number of the sub apertures 210 included in the integrated aperture 300.

Figure 35:
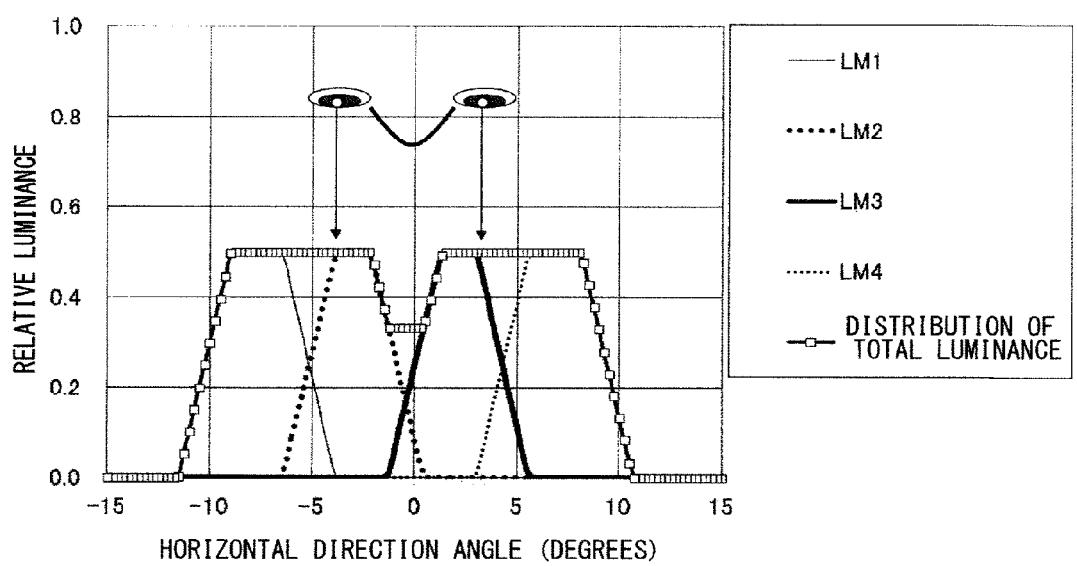
FIG. 35 A view illustrating calculation results associated with the display apparatus according to the first embodiment.

Next, assume that the observation distance is set at 600 mm, which is smaller than the design observation distance D. In this case, the local parallax-barrier pitch in the barrier mode shift boundary 270 needs to be reduced by one, which is equivalent of one sub aperture 210, the parallax-barrier pitch being the sum of the number of the sub apertures 210 in the transmitting state and the number of the sub apertures 210 in the light-blocking state. FIG. 35 is based on the assumption that the width of the integrated aperture 300a of the model in FIG. 31 is decreased by an amount equivalent to one sub aperture 210, and therefore, the width is equivalent to five apertures. The width of each of the integrated apertures 300b and 300c and the width of each of the integrated light-blocking portions 330a, 330b, and 330c are unchanged, and therefore, each width is equivalent to six sub apertures 210. In this case, a valley of luminance appears in the frontal direction. This valley of luminance appears because the width of the integrated aperture 300a in the barrier mode shift boundary 270 is made equivalent to five sub apertures, in other words, five sub apertures 210 are in the transmitting state. The valley of luminance is visually recognized as a dark line. Assuming that the interocular distance of the observer is equal to 65 mm, the interocular angle is wide, the angle standing at 6.2 degrees. As shown in FIG. 35, the interocular angle is wider than the angle of the valley of luminance. This allows the presence of the region in which luminance differences in the barrier mode shift boundary 270 are unnoticeable even if the observer slightly moves rightward or leftward, the luminance differences being otherwise recognized as dark lines.

Figure 36:
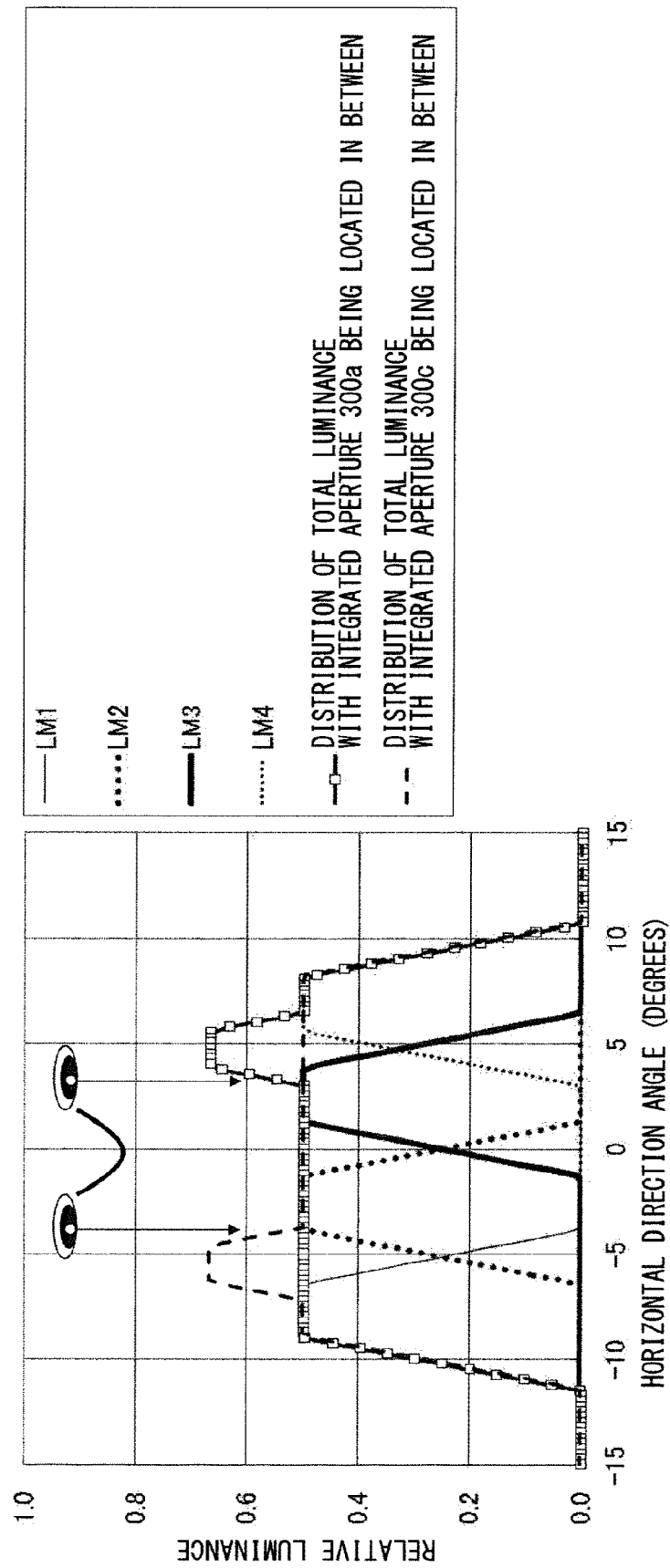
FIG. 36 A view illustrating calculation results associated with the display apparatus according to the first embodiment.

Meanwhile, FIG. 36 is based on the following assumption. The width of the integrated aperture 300a in the model shown in FIG. 31 remains equivalent to six sub apertures, and the width of the integrated light-blocking portion 330a is decreased by an amount equivalent to one sub aperture and is thus equivalent to five apertures. The width of each of the integrated apertures 300b and 300c and the width of each of the integrated light-blocking portions 330b and 330c are unchanged, and therefore, each width is equivalent to six sub apertures 210. In this case, the luminance in the frontal direction is leveled and a mountain of luminance appears on the right end. This mountain of luminance appears because the width of the integrated light-blocking portion 330a in the barrier mode shift boundary 270 is made equivalent to five sub apertures, in other words, five sub apertures 210 are in the light-blocking state. The mountain of luminance is visually recognized as an emission line. The thick broken line in the drawing indicates the light angular distribution calculated for three integrated apertures 300 including the integrated aperture 300c located in between. This distribution and the luminous intensity distribution calculated for the integrated apertures including the integrated aperture 300a located in between are mirror images of each other. The luminance-leveled portion appears in the central part of each of these luminous intensity distributions. If comparisons are made with the interocular angle of the observer, luminance differences in the barrier mode shift boundary 270 are likely to be noticeable if the observer slightly moves rightward or leftward, the luminance differences being recognized as emission lines associated with the mountains of luminance on the right and the left.

In a case where the observation distance is smaller than the design observation distance D, the interocular angle of the observer is wide. Thus, the likelihood that the observer moving rightward or leftward notices luminance changes, which are visually recognized as emission lines or dark lines, in the barrier mode shift boundary 270 can be further reduced by decreasing the number of the sub apertures 210 included in the integrated aperture 300 in the barrier mode shift boundary 270 than by decreasing the number of the sub apertures 210 included in the integrated light-blocking portion 330.

Thus, according to the first embodiment, assuming that it is detected that the observer is located at a distance which is smaller than the design observation distance, the number of the adjacent sub apertures in the light-transmitting state is set at (N/2−1) in at least one part in the lateral direction and the number of the adjacent sub apertures in the light-blocking state is set at (N/2) in every part. Consequently, even if the observer who is located at a distance smaller than the design observation distance moves in the horizontal direction, the observer can visually recognize a stereoscopic image without being aware of luminance changes, which are otherwise visually recognized as emission lines or dark lines, in the barrier mode shift boundary 270.

Further, according to the first embodiment, assuming that it is detected that the observer is located at a distance which is greater than the design observation distance, the number of the adjacent sub apertures in the light-transmitting state is set at (N/2+1) in at least one part in the lateral direction and the number of the adjacent sub apertures in the light-blocking state is set at (N/2) in every part. Consequently, even if the observer who is located at a distance greater than the design observation distance moves in the horizontal direction, the observer can visually recognize a stereoscopic image without being aware of luminance changes, which are otherwise visually recognized as emission lines or dark lines, in the barrier mode shift boundary 270.

Further, according to the first embodiment, (N·M+N/2) first transparent electrodes 23 (M being a positive integer) located in the common driving area 251 are electrically connected with every N-th one of the first transparent electrodes 23 (at intervals of N, with (N−1) first transparent electrodes 23 being sandwiched in between), whereby the number of wires is reduced.

In the first embodiment, the description has been given on the stereoscopic image display apparatus in which (N·M+N/2) first transparent electrodes 23 are electrically connected with every N-th one of the first transparent electrodes 23. Alternatively, each of the first transparent electrode 23 may be provided with the terminal La.

Optionally, the number of the adjacent sub apertures in the light-transmitting state may be changed only if it is detected that the observer is located at a distance smaller than the design observation distance or only if it is detected that the observer is located at a distance greater than the design observation distance.

Second Embodiment

The display apparatus according to the first embodiment has been described assuming that the parallax-barrier shutter panel 21 faces an observer of the display panel 11. The following describes the display apparatus which uses a transmissive liquid crystal panel as the display panel 11 and includes the parallax-barrier shutter panel 21 located between the liquid crystal panel as the display panel 11 and the backlight. The backlight is located at one side of the display panel 11. The one side is opposite to the other side of the display panel 11, an observer of the display panel 11 being at the other side.

This configuration is achieved if the optimal deviation amount Z provided between the central position of the light-blocking wall 18 and the central position of the integrated aperture 300 is set in accordance with Mathematical 3 below relative to the distance X from the center between the right and the left of the display panel 11 (the center of the display panel 11 in the lateral direction), the light-blocking wall 18 being located between the sub pixel 411$a$ and the sub pixel 411$b$ included in the sub-pixel pair 41.

$$Z=-X \cdot T/(D \cdot n) \quad \text{[Mathematical 3]}$$

The distance between the surface of the display panel 11 at the aperture and the surface of the parallax-barrier shutter panel 21 at the aperture is denoted by T. The refractive index of the object located between the surfaces is denoted by n. The design observation distance is denoted by D. Mathematical 1 and Mathematical 3 are of opposite sign.

The reference parallax-barrier pitch P of the parallax-barrier shutter panel 21 is set in accordance with Mathematical 4 below relative to the pitch Po of the sub-pixel pair of the display panel 11.

$$P=Po \cdot \{1+T/(D \cdot n)\} \quad \text{[Mathematical 4]}$$

In this case, the reference parallax-barrier pitch P is designed to be slightly greater than the pitch Po of the sub-pixel pair 41.

The ideal parallax-barrier pitch decreases with increasing observation distance as expressed by Mathematical 4, approaching the pitch Po of the sub-pixel pair 41. Conversely, the ideal parallax-barrier pitch increases with decreasing observation distance.

If the observation distance is greater than the design observation distance D and the average parallax-barrier pitch in the display surface needs to be reduced accordingly, the local parallax-barrier pitch in the barrier mode shift boundary 270 needs to be reduced by one, which is the equivalent of one sub-aperture pitch ΔSW, the parallax-barrier pitch being the sum of the number of the sub apertures 210 in the transmitting state and the number of the sub apertures 210 in the light-blocking state.

Conversely, if the observation distance is smaller than the design observation distance D and the average parallax-barrier pitch in the display surface needs to be increased accordingly, the local parallax-barrier pitch in the barrier mode shift boundary 270 needs to be increased by one, which is the equivalent of one sub-aperture pitch ΔSW, the parallax-barrier pitch being the sum of the number of the sub apertures 210 in the transmitting state and the number of the sub apertures 210 in the light-blocking state.

The following specifically describes the method for driving the barrier. As mentioned above, if the observation distance is greater than the design observation distance D and the average parallax-barrier pitch in the display surface needs to be reduced accordingly, the local parallax-barrier pitch in the barrier mode shift boundary 270 needs to be reduced by one, which is the equivalent of one sub-aperture pitch ΔSW, the parallax-barrier pitch being the sum of the number of the sub apertures 210 in the transmitting state and the number of the sub apertures 210 in the light-blocking state. The distance between the integrated apertures 300 can be reduced by the space equivalent to one sub-aperture pitch by decreasing the number of the sub apertures 210 in the light-transmitting state and keeping the number of the sub apertures 210 in the light-blocking state unchanged, or by keeping the number of the sub apertures 210 in the light-transmitting state unchanged and decreasing the number of the sub apertures 210 in the light-blocking state. As described below, it is preferable to keep the number of the sub apertures 210 in the light-transmitting state unchanged and decrease the number of the sub apertures 210 in the light-blocking state because the luminance flickers can be less noticeable to the observer while he or she is moving rightward and leftward.

Figure 37:
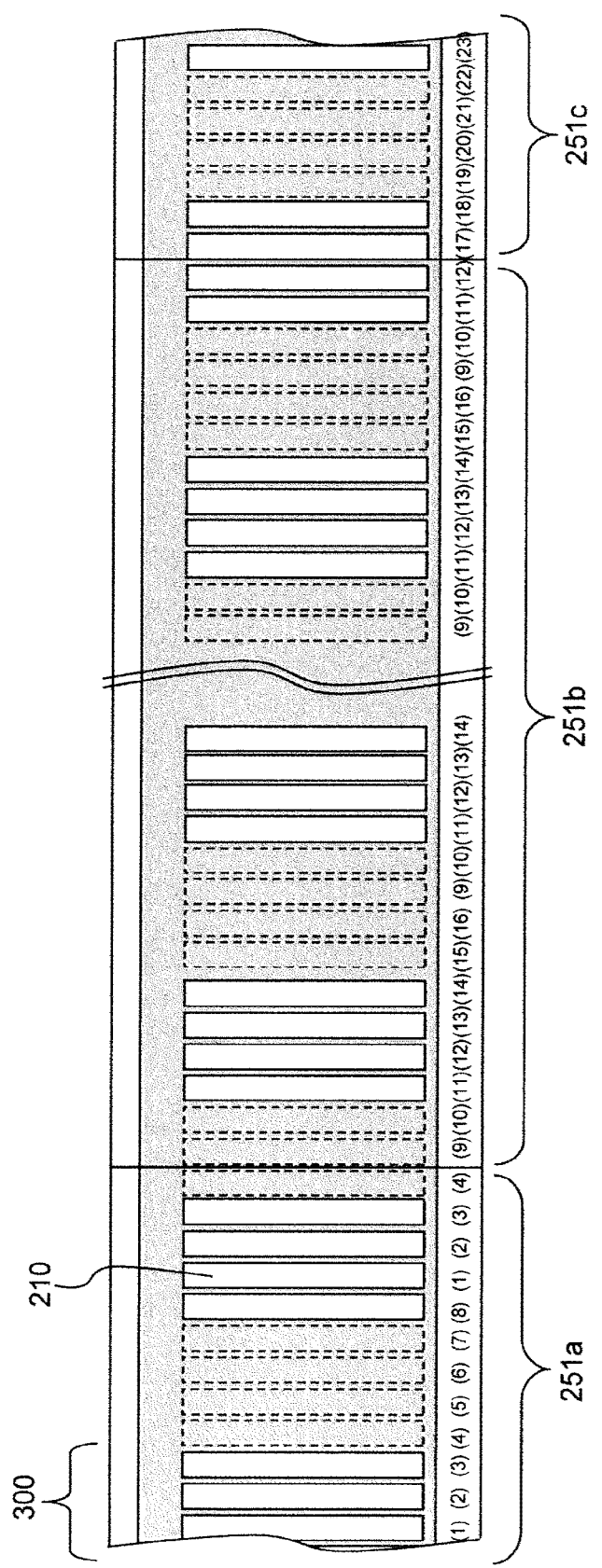
FIG. 37 A view illustrating integrated apertures of a display apparatus according to a second embodiment.

FIG. 37 illustrates the state in which a voltage is applied to the first transparent electrodes 23 in the vicinity of the barrier mode shift boundary 270. FIG. 37 illustrates the state in which the voltage in the voltage pattern No12 shown in FIG. 22 is applied. The voltage pattern No12 is the voltage pattern selected from the voltage patterns shown in FIG. 22 correspondently to the case in which the parallax-barrier shutter panel 21 is located posterior to the display panel 11 and the observation distance is a long viewing distance (observation distance>design observation distance D). Three first transparent electrodes 23 that are in the light-blocking state due to application of a positive voltage are located in the boundary portion between the first common driving area 251a and the second common driving area 251b. Except for the above boundary portion, the pitch is maintained with four electrodes in the transmitting state and four electrodes in the light-blocking state being located. The barrier mode shift boundary 270 is located in the boundary portion between the first common driving area 251a and the second common driving area 251b. The number of the sub apertures 210 in the light-transmitting state is unchanged and the number of the sub apertures 210 in the light-blocking state is decreased. Consequently, the local parallax-barrier pitch is reduced by one, which is the equivalent of one sub-aperture pitch ΔSW, the parallax-barrier pitch being the sum of the number of the sub apertures 210 in the light-transmitting state and the number of the sub apertures 210 in the light-blocking state.

In the state of the voltage pattern No13 shown in FIG. 22 as well, the integrated apertures 300 of the parallax-barrier shutter panel 21 move rightward correspondently to the leftward movement of the observer located at an observation distance greater than the design observation distance D. In this state as well, three first transparent electrodes 23 that are in the light-blocking state due to application of a positive voltage are located in the boundary portion between the first common driving area 251a and the second common driving area 251b. Except for the above boundary portion, the pitch is maintained with four electrodes in the transmitting state and four electrodes in the light-blocking state being located. The barrier mode shift boundary 270 is formed in the boundary portion between the first common driving area 251a and the second common driving area 251b. The number of the sub apertures 210 in the light-transmitting state is unchanged and the number of the sub apertures 210 in the light-blocking state is decreased. Consequently, the local parallax-barrier pitch is reduced by one, which is the equivalent of one sub-aperture pitch ΔSW, the parallax-barrier pitch being the sum of the number of the sub apertures 210 in the light-transmitting state and the number of the sub apertures 210 in the light-blocking state.

In the state of the voltage pattern No14 shown in FIG. 22, three first transparent electrodes 23 that are in the light-blocking state due to application of a positive voltage cannot be located in the boundary portion between the first common driving area 251a and the second common driving area 251b. Alternatively, three first transparent electrodes 23 that are in the light-blocking state due to application of a positive voltage are located in the boundary portion between the second common driving area 251b and the third common driving area 251c. Except for the above boundary portion, the pitch is maintained with four electrodes in the transmitting state and four electrodes in the light-blocking state being located. Consequently, in the first common driving area 251a (the first common barrier mode area 260) and the third common driving area 251c (the second common barrier mode area 260), the integrated apertures 300 are allowed to move rightward at the pitch of the first transparent electrode 23 while keeping the same width and the same pitch.

This is possible owing to the configuration in which (N·M+N/2) first transparent electrodes 23 are located in the common driving area 251, N being an even number and representing the number of the first transparent electrodes 23 in the reference parallax-barrier pitch P. M is a given positive integer. In a case where the first transparent electrodes 23 are driven with the first transparent electrodes 23 in the transmitting state and the first transparent electrodes 23 in the light-blocking state being equal in number (N/2), there is a half-cycle difference between the phase of the integrated aperture 300 in the right end and the phase of the integrated aperture 300 in the left end of the common driving area 251. Thus, without exception, the first transparent electrode in the light-blocking state appears in one of the ends. Therefore, the number of the first transparent electrodes 23 in the light-blocking state can be decreased by one in the right end or the left end of the common driving area 251. Consequently, one of the right end and the left end of the common driving area 251 becomes the barrier mode shift boundary 270.

Next, as mentioned above, if the observation distance is smaller than the design observation distance D and the average parallax-barrier pitch in the display surface needs to be increased accordingly, the local parallax-barrier pitch in the barrier mode shift boundary 270 needs to be increased by one, which is the equivalent of one sub aperture pitch, the parallax-barrier pitch being the sum of the sub apertures 210 in the light-transmitting state and the number of the sub apertures 210 in the light-blocking state.

The width of the common driving area 251 can be increased by the space equivalent to one sub-aperture pitch by increasing the number of the sub apertures 210 in the light-transmitting state and keeping the number of the sub apertures 210 in the light-blocking state unchanged, or by keeping the number of the sub apertures 210 in the light-transmitting state unchanged and increasing the number of the sub apertures 210 in the light-blocking state. As described below, it is preferable to increase the number of the sub apertures 210 in the light-transmitting state and keep the number of the sub apertures 210 in the light-blocking state unchanged because the luminance flickers can be less noticeable to the observer while he or she is moving.

Figure 38:
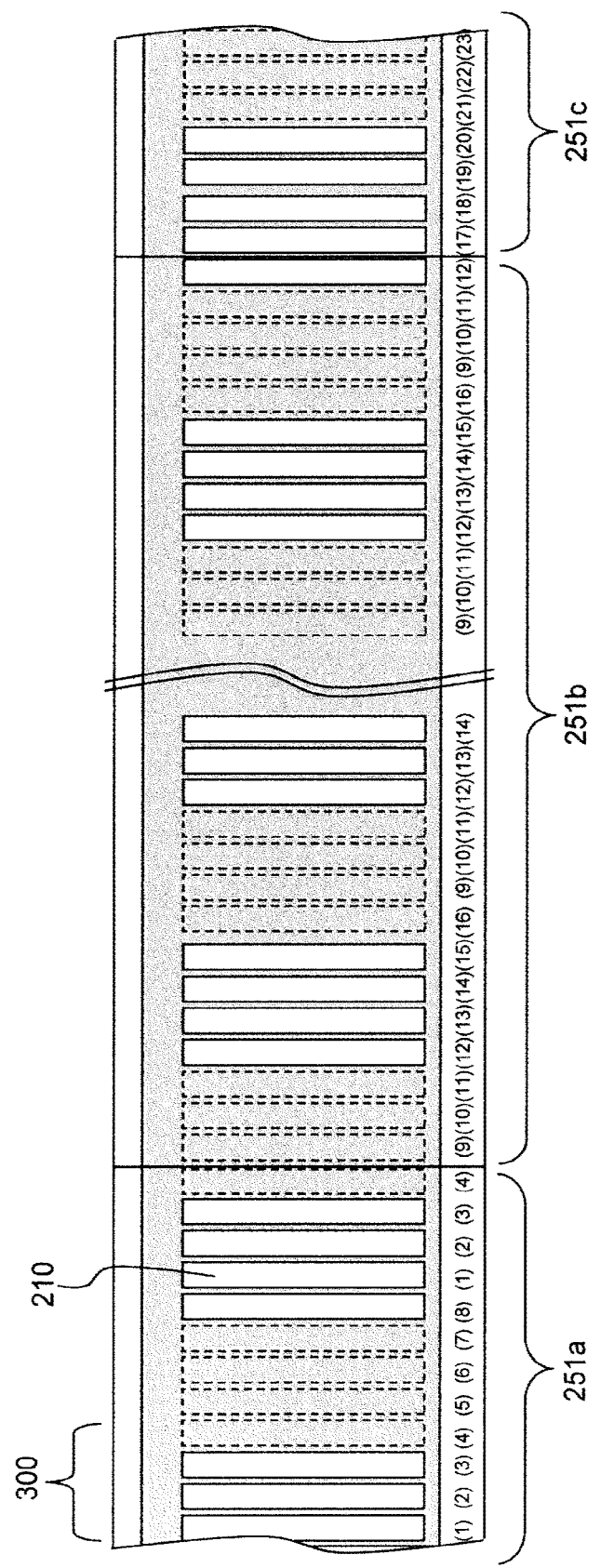
FIG. 38 A view illustrating integrated apertures of the display apparatus according to the second embodiment.

FIG. 38 illustrates the state in which a voltage is applied to the first transparent electrodes 23 in the vicinity of the barrier mode shift boundary 270. FIG. 38 illustrates the state in which the voltage in a voltage pattern No18 shown in FIG. 22 is applied. The voltage pattern No18 is the voltage pattern selected from the voltage patterns shown in FIG. 22 correspondently to the case in which the parallax-barrier shutter panel 21 is located posterior to the display panel 11 and the observation distance is a short viewing distance (observation distance<design observation distance D). Five first transparent electrodes 23 that are in the transmitting state due to application of zero voltage are located in the boundary portion between the second common driving area 251b and the third common driving area 251c. Except for the above boundary portion, the pitch is maintained with four electrodes in the transmitting state and four electrodes in the light-blocking state being located. In the boundary portion between the second common driving area 251b and the third common driving area 251c, the barrier mode shift boundary 270 is formed and the number of the sub apertures 210 in the light-transmitting state is increased while the number of the sub apertures 210 in the light-blocking state is unchanged. Consequently, the local parallax-barrier pitch is increased by one, which is the equivalent of one sub-aperture pitch, the parallax-barrier pitch being the sum of the number of the sub apertures 210 in the light-transmitting state and the number of the sub apertures 210 in the light-blocking state.

In the state of a voltage pattern No19 shown in FIG. 22 as well, the integrated apertures 300 of the parallax-barrier shutter panel 21 move rightward correspondently to the leftward movement of the observer located at an observation distance smaller than the design observation distance D. In this state, five first transparent electrodes 23 that are in the transmitting state due to application of zero voltage are located in the boundary portion between the first common driving area 251a and the second common driving area 251b. Except for the above boundary portion, the pitch is maintained with four electrodes in the transmitting state and four electrodes in the light-blocking state being located. In the boundary portion between the first common driving area 251a and the second common driving area 251b, the barrier mode shift boundary 270 is formed and the number of the sub apertures 210 in the light-transmitting state is increased while the number of the sub apertures 210 in the light-blocking state is unchanged. Consequently, the local parallax-barrier pitch is increased by one, which is the equivalent of one sub-aperture pitch, the parallax-barrier pitch being the sum of the number of the sub apertures 210 in the light-transmitting state and the number of the sub apertures 210 in the light-blocking state.

In the state of a voltage pattern No20 shown in FIG. 22 as well, five first transparent electrodes 23 that are in the transmitting state due to application of zero voltage are located in the boundary portion between the first common driving area 251a and the second common driving area 251b. Except for the above boundary portion, the pitch is maintained with four electrodes in the transmitting state and four electrodes in the light-blocking state being located. In the boundary portion between the first common driving area 251a and the second common driving area 251b, the barrier mode shift boundary 270 is formed and the number of the sub apertures 210 in the light-transmitting state is increased while the number of the sub apertures 210 in the light-blocking state is unchanged. Consequently, the local parallax-barrier pitch is increased by one, which is the equivalent of one sub-aperture pitch, the parallax-barrier pitch being the sum of the number of the sub apertures 210 in the light-transmitting state and the number of the sub apertures 210 in the light-blocking state.

Thus, in a case where the observation distance is smaller than the design observation distance D as well, the integrated apertures 300 are allowed to move rightward in the first common driving area 251a (the first common barrier mode area) and the third common driving area 251c (the second common barrier mode area) at the pitch ΔSW of the first transparent electrode 23 correspondently to the rightward movement of the observer while keeping the same width and the same pitch.

This is possible owing to the configuration in which (N·M+N/2) first transparent electrodes 23 are located in the common driving area 251, N being an even number and representing the number of the first transparent electrodes 23 in the reference parallax-barrier pitch P. M is a given positive integer. In a case where the first transparent electrodes 23 are driven with the first transparent electrodes 23 in the transmitting state and the first transparent electrodes 23 in the light-blocking state being equal in number (N/2), there is a half-cycle difference between the phase of the integrated aperture 300 in the right end and the phase of the integrated aperture 300 in the left end of the common driving area 251. Thus, without exception, the first transparent electrode in the light-transmitting state appears in one of the ends. Therefore, the number of the first transparent electrodes 23 in the light-transmitting state can be increased by one in the right end or the left end of the common driving area 251. Consequently, one of the right end and the left end of the common driving area 251 becomes the barrier mode shift boundary 270.

<Relation Between Luminous Intensity Distribution Characteristics and Widths of Sub Aperture in Light-Blocking State and Sub Aperture in Transmitting State>

The following describes the calculation results regarding the luminous intensity distribution characteristics associated with changes in the number of the sub apertures in the light-blocking state and the number of the sub apertures in the transmitting state in the barrier mode shift boundary.

Figure 39:
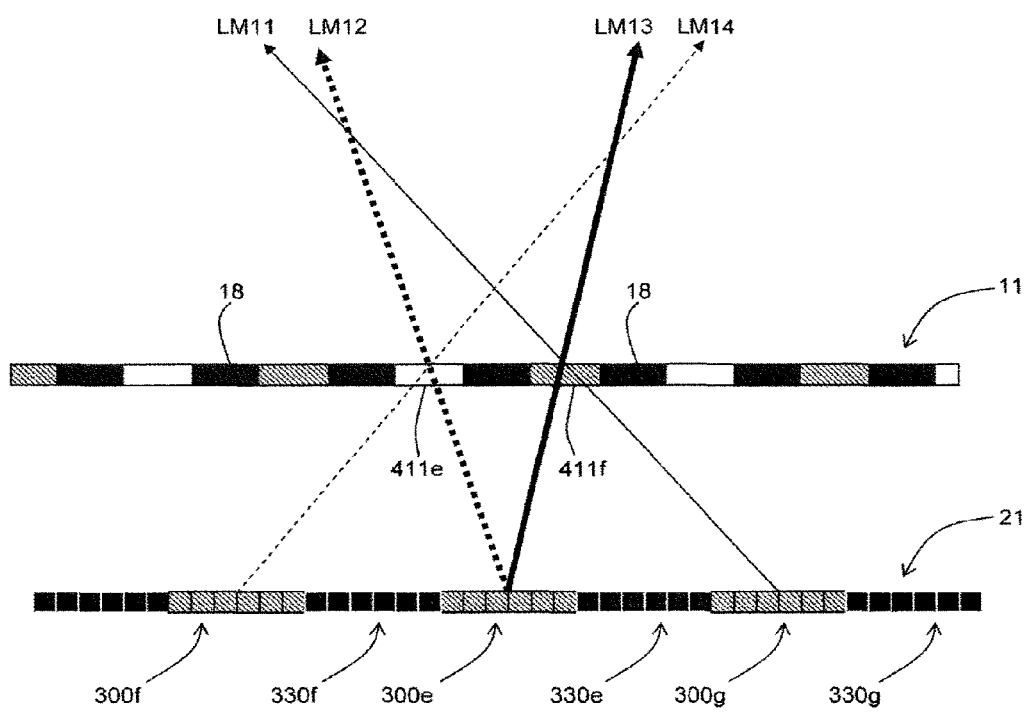
FIG. 39 A view illustrating a calculation model of the display apparatus according to the second embodiment.

The following description is based on the model in FIG. 39 illustrating the sub pixels 411 of the display panel 11 and the integrated apertures 300 of the parallax-barrier shutter panel 21. With reference to FIG. 39, the central position of the light-blocking wall 18 between a sub pixel 411e in the left and a sub pixel 411f in the right corresponds to the central position of an integrated aperture 300e. An integrated aperture 300f is located on the left of the integrated aperture 300e and an integrated aperture 300g is located on the right of the integrated aperture 300e. FIG. 39 illustrates the model in which the display panel 11 located below and the parallax-barrier shutter panel 21 located above in FIG. 31 change places. The pitch of the sub-pixel pairs 41 is set at 0.12 mm. The pixel-barrier distance is set at 1 mm. The aperture width of the sub pixel is set at 0.03 mm. The design observation distance D is set at 800 mm. The number of the first transparent electrodes 23 in the reference parallax-barrier pitch P is denoted by N which is an even number, and N stands at 12. According to calculations based on geometrical optics, the luminous intensity distribution characteristics are precisely identical to the results obtained for the model in FIG. 31.

Figure 40:
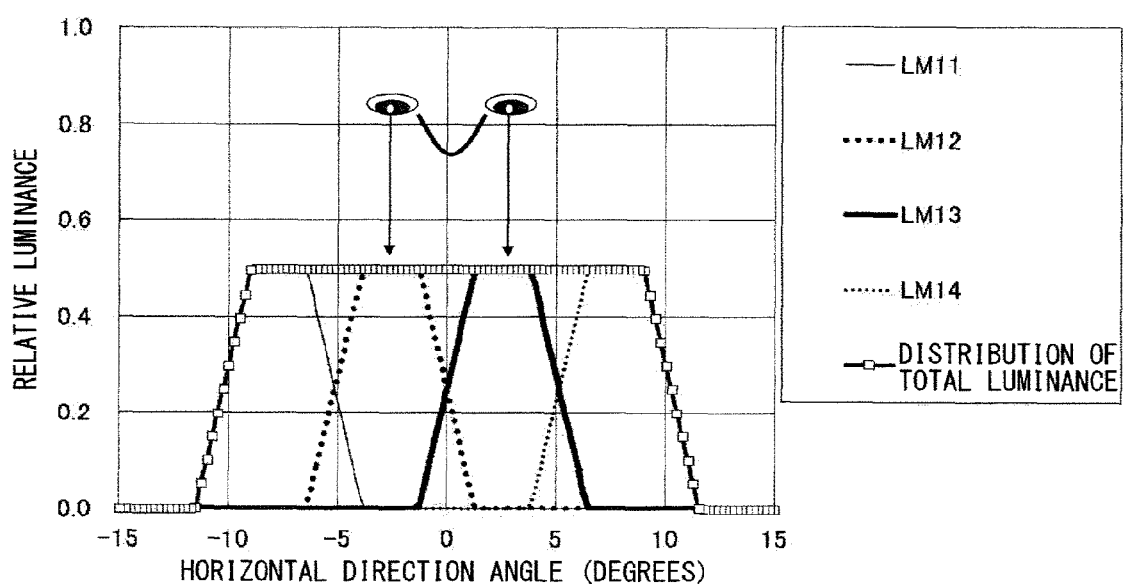
FIG. 40 A view illustrating calculation results associated with the display apparatus according to the second embodiment.

FIG. 40 shows the calculation results associated with the luminous intensity distribution characteristics assuming that the number of the sub apertures 210 in the transmitting state and the number of the sub apertures 210 in the light-blocking state each stand at N/2=6. This is based on the assumption that the barrier mode shift boundary 270 is not present in the display surface and the observation distance is equal to the design observation distance D. The lateral axis indicates angles in the horizontal direction, with the frontal direction relative to the display surface being set at 0 degree. The vertical axis indicates the relative luminance. As shown in FIG. 39, the calculations are associated with four rays including rays LM11, LM12, LM13, and LM14 that pass through the integrated aperture 300f, the integrated aperture 300g, and the integrated aperture 300e located in between, and are emitted from the sub pixel 411e in the left and the sub pixel 411f in the right. This is because these four rays travel toward near the observer. The solid line having markers added thereto indicates the distribution of the total luminance associated with the white display provided on the sub pixel 411e in the left and the sub pixel 411f in the right. This result is precisely identical to the luminous intensity distribution in FIG. 32.

Assuming that the interocular distance of the observer is equal to 65 mm, the interocular angle stands at 4.6 degrees. Each of the left and right eyes is located at the center of the peak of the luminous intensity distribution for the corresponding one of the rays LM12 and LM13 that have been emitted from the integrated aperture 300e and passed through the sub pixels 411e and 411f, the rays LM12 and LM13 being indicated by the thick dotted line and the thick solid line. The distribution of the total luminance is completely leveled in the wide angular range at and around the center. Thus, the flickers associated with changes in luminance are not noticeable to the observer moving rightward and leftward at an observation distance of 800 mm.

To make luminance flickers unnoticeable to the observer moving in the lateral direction, the following design is appropriate in which the width of the individual integrated aperture 300 of the parallax-barrier shutter panel 21 is equivalent to 50% of the reference parallax-barrier pitch P and the distance between the centers of the two sub apertures, being the sub aperture 411e and the sub aperture 411f, included in the sub pixel pair 41 of the display panel 11 is half the pitch Po of the sub pixel pair 41. Thus, it is appropriate that the number of the first transparent electrodes 23 in the light-transmitting state is equivalent to the number of the first transparent electrodes 23, the number standing at N/2.

Next, assume that the observation distance is set at 1000 mm, which is greater than the design observation distance. In this case, the local parallax-barrier pitch in the barrier mode shift boundary 270 needs to be reduced by one, which is the equivalent of one sub-aperture pitch, the parallax-barrier pitch being the sum of the number of the sub apertures 210 in the light-transmitting state and the number of the sub apertures 210 in the light-blocking state. FIG. 41 is based on the assumption that the width of the integrated aperture 300e of the model in FIG. 39 is reduced by an amount equivalent to one sub aperture, and therefore, the width is equivalent to five sub apertures. The width of each of the integrated apertures 300f and 300g and the width of each of integrated light-blocking portions 330e, 330f, and 330g are unchanged, and therefore, each width is equivalent to six sub apertures. In this case, a valley of luminance appears in the frontal direction. This valley of luminance appears because the width of the integrated aperture 300e in the barrier mode shift boundary 270 is made equivalent to five sub apertures, in other words, five sub apertures 210 are in the transmitting state. The valley of luminance is visually recognized as a dark line. Assuming that the interocular distance of the observer is equal to 65 mm, the interocular angle is narrow, the angle standing at 3.7 degrees. As shown in FIG. 41, the interocular angle is smaller than the angle of the valley of luminance. If the observer slightly moves rightward or leftward, the observer would notice luminous changes in the barrier mode shift boundary 270, the luminous changes being visually recognized as dark lines.

Figure 42:
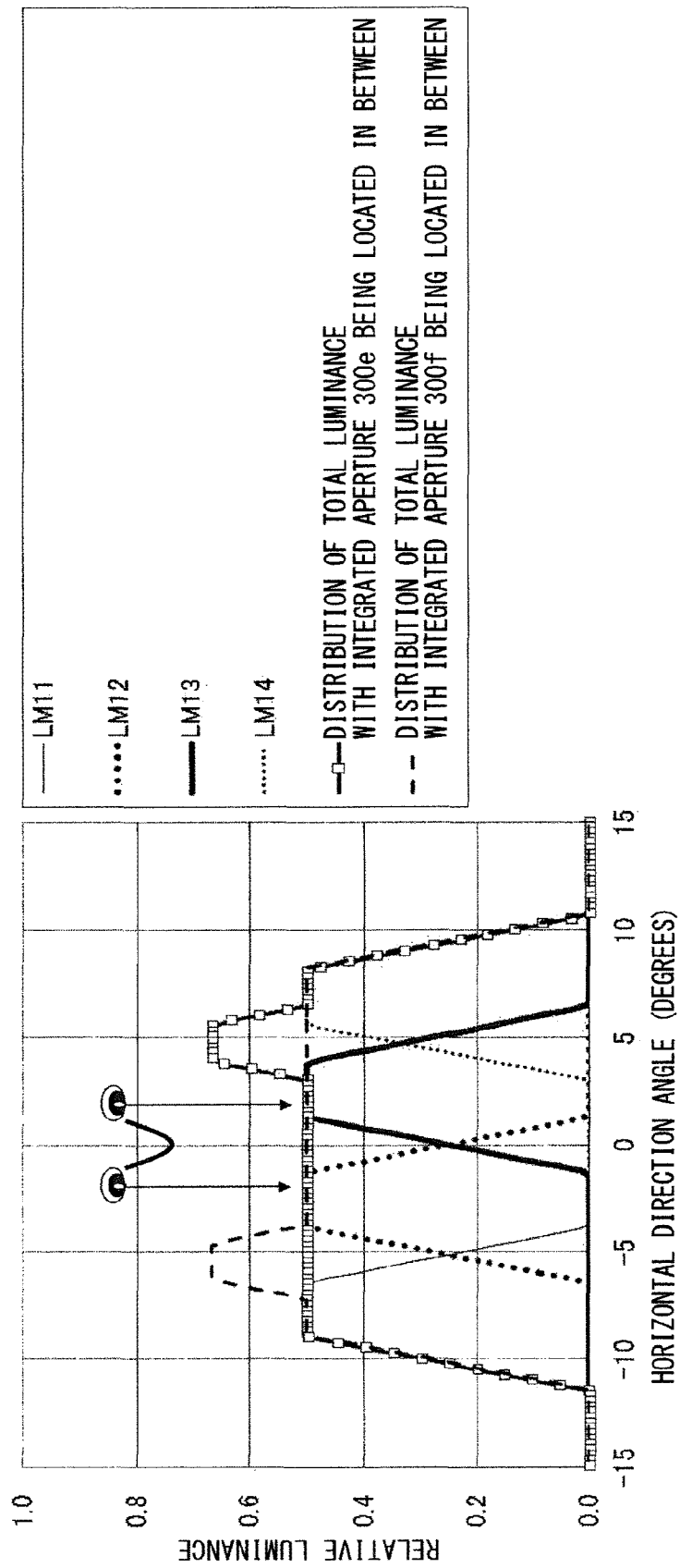
FIG. 42 A view illustrating calculation results associated with the display apparatus according to the second embodiment.

Meanwhile, FIG. 42 is based on the following assumption. The width of the integrated aperture 300e in the model shown in FIG. 39 remains equivalent to six sub apertures, and the width of the integrated light-blocking portion 330f is decreased by an amount equivalent to one sub aperture 210 and is thus equivalent to five sub apertures. In this case, the luminance in the frontal direction is leveled and a mountain of luminance appears on the right end. This mountain of luminance appears because the width of the integrated light-blocking portion 330f in the barrier mode shift boundary 270 is made equivalent to five sub apertures, in other words, five sub apertures 210 are in the light-blocking state. The mountain of luminance is visually recognized as an emission line. The thick broken line in the drawing indicates the light angular distribution calculated for the integrated apertures including the integrated aperture 300f located in between. This distribution and the luminous intensity distribution calculated for the integrated apertures including the integrated aperture 300e located in between are mirror images of each other. The luminance-leveled portion appears in the central part of each of these luminous intensity distributions. If comparisons are made with the interocular angle of the observer, it is apparent that luminance differences in the barrier mode shift boundary 270 are unnoticeable in a certain region even if the observer slightly moves rightward or leftward, the luminance differences being otherwise recognized as emission lines.

In a case where the observation distance is greater than the design observation distance D, the interocular angle of the observer is small. Thus, the likelihood that the observer moving rightward or leftward notices luminance changes, which are visually recognized as emission lines or dark lines, in the barrier mode shift boundary 270 can be further reduced by decreasing the number of the sub apertures 210 included in the integrated light-blocking portion 330 in the barrier mode shift boundary 270 than by decreasing the number of the sub apertures 210 included in the integrated aperture 300.

Next, assume that the observation distance is set at 600 mm, which is smaller than the design observation distance D. In this case, the local parallax-barrier pitch in the barrier mode shift boundary 270 needs to be increased by one, which is the equivalent of one sub aperture pitch, the parallax-barrier pitch being the sum of the number of the sub apertures 210 in the light-transmitting state and the number of the sub apertures 210 in the light-blocking state. FIG. 43 is based on the assumption that the width of the integrated aperture 300e of the model in FIG. 39 is increased by an amount equivalent to one sub aperture 210, and therefore, the width is equivalent to seven apertures. The width of each of the integrated apertures 300f and 300g and the width of each of the integrated light-blocking portions 330e, 330f, and 330g are unchanged, and therefore, each width is equivalent to six sub apertures. In this case, a mountain of luminance appears in the frontal direction. This mountain of luminance appears because the width of the integrated aperture 300e in the barrier mode shift boundary 270 is made equivalent to seven sub apertures, in other words, seven sub apertures 210 are in the transmitting state. The mountain of luminance is visually recognized as an emission line. Assuming that the interocular distance of the observer is equal to 65 mm, the interocular angle is wide, the angle standing at 6.2 degrees. As shown in FIG. 43, the interocular angle is wider than the angle of the mountain of luminance. This allows the presence of the region in which luminance differences in the barrier mode shift boundary 270 are unnoticeable even if the observer slightly moves rightward or leftward, the luminance differences being otherwise recognized as emission lines.

Figure 44:
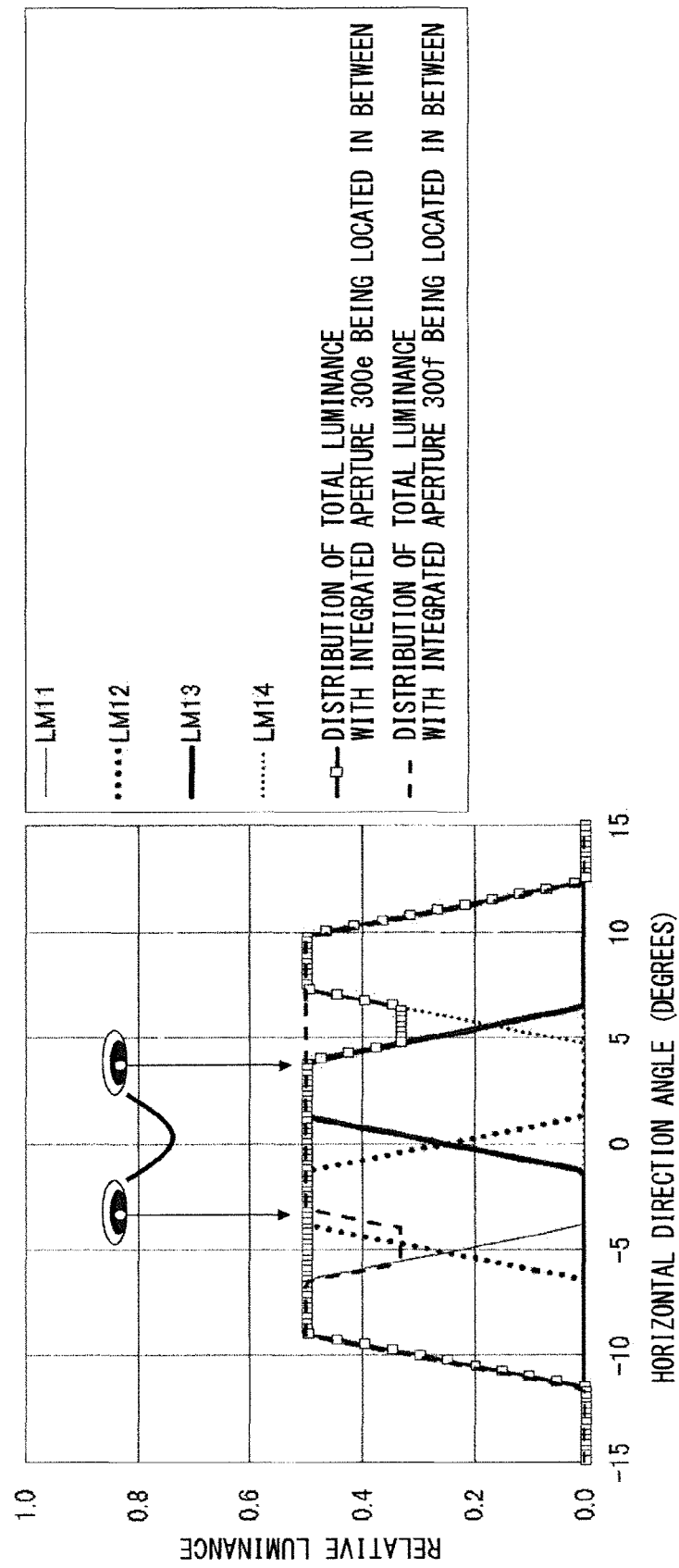
FIG. 44 A view illustrating calculation results associated with the display apparatus according to the second embodiment.

Meanwhile, FIG. 44 is based on the following assumption. The width of the integrated aperture 300e in the model shown in FIG. 39 remains equivalent to six sub apertures, and the width of the integrated light-blocking portion 330f is increased by an amount equivalent to one sub aperture and is thus equivalent to seven apertures. The width of each of the integrated apertures 300f and 300g and the width of each of the integrated light-blocking portions 330e and 330g are unchanged, and therefore, each width is equivalent to six sub apertures. In this case, the luminance in the frontal direction is leveled and a valley of luminance appears on the right end. This valley of luminance appears because the width of the integrated light-blocking portion 330f in the barrier mode shift boundary 270 is made equivalent to seven apertures, in other words, seven sub apertures 210 are in the light-blocking state. The valley of luminance is visually recognized as a dark line. The thick broken line in the drawing indicates the light angular distribution calculated for the integrated apertures including the integrated aperture 300f located in between. This distribution and the luminous intensity distribution calculated for the integrated apertures including the integrated aperture 300e located in between are mirror images of each other. The luminance-leveled portion appears in the central part of each of these luminous intensity distributions. If comparisons are made with the interocular angle of the observer, luminance differences in the barrier mode shift boundary 270 are likely to be noticeable if the observer slightly moves rightward or leftward, the luminance differences being recognized as dark lines associated with the valleys of luminance on the right and the left.

In a case where the observation distance is smaller than the design observation distance, the interocular angle of the observer is wide. Thus, the likelihood that the observer moving rightward or leftward notices luminance changes, which are visually recognized as emission lines or dark lines, in the barrier mode shift boundary 270 can be further reduced by increasing the number of the sub apertures 210 included in the integrated aperture 300 in the barrier mode shift boundary 270 than by increasing the number of the sub apertures 210 included in the integrated light-blocking portion 330.

In the present invention, the above embodiments can be arbitrarily combined, or each embodiment can be appropriately varied or omitted within the scope of the invention.

EXPLANATION OF REFERENCE SIGNS

11 display panel, 21 parallax-barrier shutter panel, 22 first transparent substrate, 23 first transparent electrode, 24 liquid crystal layer, 25 second transparent electrode, 26 second transparent substrate, 31 detector, 32 controller, 41 sub-pixel pair, 210 sub aperture, 251 common driving area, 260 common barrier mode area, 300 integrated aperture, 330 integrated light-blocking portion, 411 sub pixel, P reference parallax-barrier pitch, Po pitch of sub-pixel pair, ΔSW sub-aperture pitch.

The invention claimed is:

1. A method for driving a stereoscopic image display apparatus, said stereoscopic image display apparatus including:
   a display panel including a plurality of sub-pixel pairs arranged in a lateral direction at a predetermined pitch, each of said plurality of sub-pixel pairs including two sub pixels, one of said sub pixels displaying an image for a right eye and the other one of said sub pixels displaying an image for a left eye; and
   a parallax-barrier shutter panel that is located between said display panel and a backlight, said backlight being located at one side of said display panel, said one side being opposite to the other side of said display panel, an observer of said display panel being at said other side, said parallax-barrier shutter panel including a plurality of sub apertures capable of electrically switching a light-transmitting state and a light-blocking state and arranged in a lateral direction at a pitch obtained by dividing a reference parallax-barrier pitch by N (N being an even number equal to or greater than four), said reference parallax-barrier pitch being determined on the basis of a predetermined design observation distance and the pitch of said sub-pixel pairs, said method comprising:
   forming an integrated aperture by transforming (N/2) pieces of said sub apertures adjacent to each other into said light-transmitting state and transforming (N/2) pieces of said sub apertures adjacent to each other into said light-blocking state in a case where said observer is located at a distance equal to said design observation distance;
   providing, in said lateral direction, at least one part in which (N/2+1) pieces of said sub apertures adjacent to each other are transformed into said light-transmitting state and transforming (N/2) pieces of said sub apertures adjacent each other into said light-blocking state in a case where the observer is located at a distance smaller than said design observation distance; and
   providing, in said lateral direction, at least one part in which (N/2−1) pieces of said sub apertures adjacent to each other are transformed into said light-transmitting state and transforming (N/2) pieces of said sub apertures adjacent to each other into said light-blocking state in a case where the observer is located at a distance greater than said design observation distance.

2. A method for driving a stereoscopic image display apparatus, said stereoscopic image display apparatus including:
   a display panel including a plurality of sub-pixel pairs arranged in a lateral direction at a predetermined pitch, each of said plurality of sub-pixel pairs including two sub pixels, one of said sub pixels displaying an image for a right eye and the other one of said sub pixels displaying an image for a left eye; and
   a parallax-barrier shutter panel that is located at one side of said display panel, an observer of said display panel being at said one side, said parallax-barrier shutter panel including a plurality of sub apertures capable of electrically switching a light-transmitting state and a light-blocking state and arranged in a lateral direction at a pitch obtained by dividing a reference parallax-barrier pitch by N (N being an even number equal to or greater than four), said reference parallax-barrier pitch being determined on the basis of a predetermined design observation distance and the pitch of said sub-pixel pairs,
   said method comprising:
   forming an integrated aperture by transforming (N/2) pieces of said sub apertures adjacent to each other into said light-transmitting state and transforming (N/2) pieces of said sub apertures adjacent to each other into said light-blocking state in a case where said observer is located at a distance equal to said design observation distance;
   providing, in said lateral direction, at least one part in which (N/2−1) pieces of said sub apertures adjacent to each other are transformed into said light-transmitting state and transforming (N/2) pieces of said sub apertures adjacent each other into said light-blocking state in a case where said observer is located at a distance smaller than said design observation distance; and providing, in said lateral direction, at least one part in which (N/2+1) pieces of said sub apertures adjacent to each other are transformed into said light-transmitting state and transforming (N/2) pieces of said sub apertures adjacent to each other into said light-blocking state in a case where the observer is located at a distance greater than said design observation distance.

3. A stereoscopic image display apparatus comprising:
a display panel including a plurality of sub-pixel pairs arranged in a lateral direction at a predetermined pitch, each of said plurality of sub-pixel pairs including two sub pixels, one of said sub pixels displaying an image for a right eye and the other one of said sub pixels displaying an image for a left eye; and
a parallax-barrier shutter panel including a plurality of sub apertures capable of electrically switching a light-transmitting state and a light-blocking state by driving a liquid crystal layer held between two transparent substrates with transparent electrodes extending in a vertical direction, said plurality of sub apertures being arranged in a lateral direction at a pitch obtained by dividing a reference parallax-barrier pitch by N (N being an even number equal to or greater than four), said reference parallax-barrier pitch being determined on the basis of a predetermined design observation distance and the pitch of said sub-pixel pairs, wherein
said parallax-barrier shutter panel includes a plurality of common driving areas obtained by dividing a display area in said lateral direction,
(N·M+N/2) pieces of said transparent electrodes (M being a positive integer) arranged in each of said common driving areas are electrically connected with every N-th one of said transparent electrodes, and
(N·M+N/2) pieces of said transparent electrodes arranged in each of said common driving areas include transparent electrodes that are arranged side by side on an end of the common driving area, each of the relevant transparent electrodes being electrically connected with M pieces of said transparent electrodes other than the relevant transparent electrodes.

4. The stereoscopic image display apparatus according to claim 3, wherein
said parallax-barrier shutter panel is located between said display panel and a backlight, said backlight being located at one side of said display panel, said one side being opposite to the other side of said display panel, an observer of the display panel being at said other side,
said display apparatus drives, in a case where the observer is located at a distance equal to said design observation distance, the transparent electrodes so as to form an integrated aperture by transforming (N/2) pieces of sub apertures adjacent to each other into said light-transmitting state and transforming (N/2) pieces of said sub apertures adjacent to each other into said light-blocking state,
said display apparatus drives, in a case where said observer is located at a distance smaller than said design observation distance, said transparent electrodes so as to transform, in at least one of boundaries between the common driving areas adjacent to each other, (N/2+1) pieces of said sub apertures adjacent to each other into said light-transmitting state and transform (N/2) pieces of said sub apertures adjacent each other into said light-blocking state, and
said display apparatus drives, in a case where said observer is located at a distance greater than said design observation distance, said transparent electrodes so as to transform, in at least one of the boundaries between said common driving areas adjacent to each other, (N/2−1) pieces of said sub apertures adjacent to each other into said light-transmitting state and transform (N/2) pieces of said sub apertures adjacent to each other into said light-blocking state.

5. The stereoscopic image display apparatus according to claim 3, wherein
said parallax-barrier shutter panel is located at one side of the display panel, an observer of the display panel being at said one side,
said display apparatus drives, in a case where said observer is located at a distance equal to said design observation distance, the transparent electrodes so as to form an integrated aperture by transforming (N/2) pieces of said sub apertures adjacent to each other into said light-transmitting state and transforming (N/2) pieces of said sub apertures adjacent to each other into said light-blocking state,
said display apparatus drives, in a case where said observer is located at a distance smaller than said design observation distance, said transparent electrodes so as to transform, in at least one of boundaries between the common driving areas adjacent to each other, (N/2−1) pieces of said sub apertures adjacent to each other into said light-transmitting state and transform (N/2) pieces of said sub apertures adjacent each other into said light-blocking state, and
said display apparatus drives, in a case where said observer is located at a distance greater than said design observation distance, said transparent electrodes so as to transform, in at least one of the boundaries between the common driving areas adjacent to each other, (N/2+1) pieces of said sub apertures adjacent to each other into said light-transmitting state and transform (N/2) pieces of said sub apertures adjacent to each other into said light-blocking state.

* * * * *